United States Patent [19]

Nakahira et al.

[11] Patent Number: 5,636,327
[45] Date of Patent: Jun. 3, 1997

[54] NEURAL NETWORK CIRCUIT

[75] Inventors: Hiroyuki Nakahira; Shiro Sakiyama; Masakatsu Maruyama; Susumu Maruno, all of Osaka, Japan

[73] Assignee: Matsushita Electric Industrial Co., Ltd., Osaka, Japan

[21] Appl. No.: 409,949

[22] Filed: Mar. 23, 1995

Related U.S. Application Data

[63] Continuation-in-part of Ser. No. 945,946, Sep. 17, 1992, abandoned.

[30] Foreign Application Priority Data

| Sep. 18, 1991 | [JP] | Japan | 3-237674 |
| Sep. 18, 1991 | [JP] | Japan | 3-237675 |
| Jun. 10, 1992 | [JP] | Japan | 4-150921 |
| Sep. 11, 1992 | [JP] | Japan | 4-242878 |

[51] Int. Cl.$^6$ ............................................. G06F 15/18
[52] U.S. Cl. ......................... 395/27; 395/23; 364/276.7; 364/276.9; 382/158
[58] Field of Search ..................... 395/22, 23, 24, 395/26, 27, 425; 364/513; 341/163

[56] References Cited

U.S. PATENT DOCUMENTS

| 4,006,314 | 2/1977 | Condon et al. | 370/100.1 |
| 4,590,582 | 5/1986 | Umemura | 364/413.13 |
| 4,670,793 | 6/1987 | Yamoda et al. | 358/166 |
| 4,825,440 | 4/1989 | Heitmann et al. | 371/31 |
| 5,157,399 | 10/1992 | Kobayashi et al. | 341/155 |
| 5,165,009 | 11/1992 | Watanabe et al. | 395/27 |
| 5,165,010 | 11/1992 | Masuda et al. | 395/27 |

OTHER PUBLICATIONS

Maruno, "Multi-Functional Layered Network Using Quantizer Neurons", Int'l Symposium, Computer World 90, pp. 202–209 Nov., 1990.

*Character Recognition System Using Network Comprising Layers By Function*, Preliminary Material for Image Electronic Communication Society's National Conference, pp. 77–80 Dec. 30, 1990.

Yestrebsky et al., *Neural Bit–Slice Computing Element*, Proc. 1990 Summer Computer Simulation Conference, pp. 787–790 (Jul. 1990).

Washburne et al., *The Lockheed Probabilistic Neural Network Processor*, Proc. International Joint Conference on Neural Networks, pp. 513–518 (Jul. 1991).

*Primary Examiner*—Robert W. Downs
*Assistant Examiner*—Ji-Yong D. Chung
*Attorney, Agent, or Firm*—McDermott, Will & Emery

[57] ABSTRACT

In a multilayered neural network for recognizing and processing characteristic data of images and the like by carrying out network arithmetical operations, characteristic data memories store the characteristic data of the layers. Coefficient memories store respective coupling coefficients of the layers other than the last layer. A weight memory stores weights of neurons of the last layer. Address converters carry out arithmetical operations to find out addresses of nets of the network whose coupling coefficients are significant. A table memory outputs a total coupling coefficient obtained by inter-multiplying the significant coupling coefficients read out from the coefficient memories of the layers. A cumulative operation unit performs cumulative additions of the product of the total coupling coefficient times the weight of the weight memory. Arithmetical operations are carried out only on particular nets with a significant coupling coefficient value. The speed of operation and recognition can be improved.

11 Claims, 29 Drawing Sheets

| ADDRESS | DATA |
|---|---|
| 0 | ✗ |
| 1 | 30 |
| 2 | 60 |
| 3 | 90 |
| 4 | 120 |
| 5 | 150 |
| 6 | 180 |
| 7 | 210 |
| 8 | ✗ |
| 9 | 25 |
| 10 | 50 |
| 11 | 75 |
| 12 | 100 |
| 13 | 125 |
| 14 | 150 |
| 15 | 175 |
| 16 | ✗ |
| 17 | 55 |
| 18 | 80 |
| 19 | 105 |
| 20 | 130 |
| 21 | 155 |
| 22 | 180 |
| 23 | 205 |
| 24 | ✗ |
| 25 | 45 |
| 26 | 75 |
| 27 | 105 |
| 28 | 140 |
| 29 | 175 |
| 30 | 205 |
| 31 | 235 |
| 32 | ✗ |
| ⋮ | 200 |
| 511 | 230 |

FIG. 28

| A | B | C | D |
|---|---|---|---|
| m=0 | m=1 | m=2 | m=3 |

NEURAL NETWORK CIRCUIT

This is a continuation-in-part of application Ser. No. 07/945,946 filed Sep. 17, 1992.

BACKGROUND OF THE INVENTION

This invention relates to an improved neural network circuit for image recognition processing or the like.

Neural networks have been noted in recent years in the field of data processing which are modeled on the neural signal processing of living systems of a human body. Various neural networks have been proposed currently. Among them, a network of quantized neurons is known. Image recognition by means of such a network is disclosed in the papers, "Character Recognition System Using Network Comprising Layers By Function (Preliminary Material for Image Electronic Communication Society's National Conference 1990, pages 77–80) and "Multi-Functional Layered Network Using Quantizer Neurons (Computer World '90, November).

FIG. 21 shows a quantized neuron network. This network comprises first (lowermost) to fifth (uppermost) layers. The quantized neurons of the first, second and third layers designated by circles are interconnected in a multi-layer network-like form. The fourth layer serves as a supervisor input layer. The fifth layer, or last layer comprises conventional artificial neurons of a "multi-input-and-single-output" type. Characteristic data are supplied to the first to third layers respectively. For example, 64 pixel values of 8×8 segments of an image, lateral differential values among the 64 pixel values, and vertical differential values among the 64 pixel values are supplied to these layers. As shown in FIG. 21, the first layer is made up of 64 quantized neurons corresponding to the number of pixels (=8×8 pixels). As shown in FIG. 22, the quantized neurons of the first layer are provided with quantization signal input terminals S through which the pixel values, serving as characteristic data, are supplied. The quantization signal input terminals S of the quantized neurons of the second layer are supplied with the lateral differential values. The quantization signal input terminals S of the quantized neurons of the third layer are supplied with the vertical differential values. The fourth layer (i.e., the supervisor input layer) modifies the coupling coefficient of a synapse between neurons of the last layer by means of supervisor input. The last layer is a solution output layer. If such a solution is for 62 alphanumeric characters, the last layer will comprise 62 conventional artificial neurons of "multi-input-and-single-output" type.

As shown in FIG. 25, in the neuron of the output layer, each data input thereto is multiplied by a weight Wn ("n" represents an input number) determined through learning, and the sum of the results (products) is output.

As shown in FIG. 22, the quantized neurons (quantized cells) of the first to third layers further include selective signal input terminals R and a plurality of outputs, in addition to the quantization signal input terminals S. A signal input through the selective signal input terminal R is multiplied by each of weights τ according to Formula (1), by an input value x supplied from the quantization signal input terminal S, and then the results are output to the respective outputs.

$$\tau j = 1 - \beta(|j-x|) \quad (1),$$

where $|j-x|$=absolute value of j–x; j=quantized neuron output number.

For the quantized neuron of FIG. 22, the number of input levels of the characteristic data supplied through the quantization signal input terminal S is eight, and the number of outputs thereof is eight. For instance, supposing that the function of (1–β) is one as shown in FIG. 24, the value that will appear at each of the eight outputs of the quantized neuron can be found by multiplying the value supplied to the selective signal input terminal R by the coupling coefficient of FIG. 23(a), when the value supplied from the quantization signal input terminal S is 0. Irrespective of the values fed to the selective signal input terminal R, if the input value of the quantization signal input terminal S is 3, each coupling coefficient will be obtained by sliding each of the coupling coefficients of FIG. 23(a) three positions to the right, as shown in FIG. 23(b). In other words, in the event that the input value of the quantization signal=3, each coupling coefficient can be found by adding 3 to each output number of FIG. 23(a). However, in the event that the sum goes beyond 7, an additional subtraction (the sum–8) is required.

The input supplied to the selective signal input terminal R of the quantized neuron of the first layer is given a maximum value. Supposing that 8-bit arithmetical operations are performed in the quantized neuron, that the coupling coefficients of the first layer are ones as shown in FIG. 23(a), and that the level of a value given to the quantization signal input terminal S is 0, the following are found, that is, the selective signal input=FF, the output number 0=FF, the output number 1=7F, the output number 2=0, the output number 3=0, the output number 4=0, the output number 5=0, the output number 6=0, and the output number 7=7F (hexadecimal notation).

For the network made up of quantized neurons of FIG. 22 each having the quantization signal input terminal S to which the input are supplied at different eight levels, and the eight outputs, the eight outputs of the quantized neuron of the first layer are connected to the selective signal input terminals R of the quantized neurons of the second layer. Similarly, the eight outputs of the quantized neuron of the second layer are connected to the selective signal input terminals R of the quantized neurons of the third layer. In this network, a single quantized neuron of the first layer branches off upwardly in a tree-like form through the second layer to the third layer. The number of outputs of the quantized neurons of the third layer totals up to 512.

Eight quantized neurons of the second layer connected to the eight outputs of the quantized neuron of the first layer, and eight quantized neurons of the third layer connected to the eight outputs of the quantized neuron of the second layer are supplied with, as quantization signal input, lateral differential values and vertical differential values, respectively, both the lateral differential values and vertical differential values locating at the same positions as the pixel values fed to the quantization signal input terminals S of the quantized neurons of the first layer as characteristic data, respectively.

The signals to be input to the selective signal input terminals R of the quantized neurons of the second layer are the outputs of the quantized neurons of the first layer. The signals to be input to the selective signal input terminals R of the quantized neurons of the third layer are the outputs of the quantized neurons of the second layer.

Therefore, the output of the quantized neuron of the third layer is obtained by a multiplication (that is, the coupling coefficient of the neuron of the first layer×the coupling coefficient of the neuron of the second layer×the coupling coefficient of the neuron of the third layer×the input value of the selective signal of the quantized neuron of the first layer).

A single neuron of a "multi-input-and-single-output" type of the last layer is supplied with a product of 64×512 outputs of the quantized neurons of the third layer times the coupling coefficients of the fourth layer (supervisor input layer) given to these outputs respectively.

Many of the arithmetical operations in a neural network are realized by conventional yon Neumann-type computers. For example, since the amount of operation of the network of FIG. 21 per input is expressed by Formula (2):

Multiplication : 8×8×8=512

Product-Sum Operation: 8×8×8×62=31744+tm (2)

Formula (3) holds for an input image of 8×8 segments.

Multiplication : 512×64=32768

Product-Sum Operation: 31744×64=2031616+tm (3)

However, many of the neuro-computers carry out every network arithmetical operation with the help of digital computers of yon Neumann-type in a sequential, serial manner, as a result of which a high processing speed may not be achieved if the amount of operation is great.

There is a method for accomplishing high processing speed which utilizes many operation units which operate in parallel processing to simultaneously perform a plurality of arithmetical operations, however, such a method requires very large-scale circuit which is costly.

SUMMARY OF THE INVENTION

In view of the foregoing disadvantages, it is a principal object of the present invention to provide an improved neural network circuit which can be comprised of small-scale hardware. Additionally, even in the aspect of throughput, the neural network circuit of the invention can achieve a higher processing speed than conventional ones. To achieve the object above described, the following are provided.

A multi-layer neural network circuit for recognizing and processing characteristic data by the execution of network arithmetical operations is provided which comprises: (a) an address generator or an address converter which outputs only an address of a net having a significant coupling coefficient value in a network, on the basis of the characteristic data, (b) a coefficient memory which outputs a total coupling coefficient obtained by multiplying coupling coefficients among layers corresponding to the address of the address generator or the address converter, (c) a weight memory which outputs a weight of a neuron of the last layer corresponding to the address of the address generator or the address converter, and (d) a cumulative operation unit which performs cumulative additions of the product of the total coupling coefficient output from the coefficient memory times the weight of the neuron of the last layer output from the weight memory, wherein arithmetical operation is performed only on a particular network having a non-zero coupling coefficient value.

Another multi-layer neural network circuit for recognizing and processing characteristic data by the execution of network arithmetical operations Is provided which comprises: (a) a plurality of table memories which store coupling coefficients of neurons among layers which are variable according to the characteristic data, and data of the coupling coefficients among the layers including a last layer, and read data of the coupling coefficient corresponding to the characteristic data, (b) an address generator which outputs only an address of a net having a non-zero coupling coefficient value in a network using the data read out from the table memory, and reads the corresponding coupling coefficient from the table memory by the address, (c) a coefficient memory which stores a total coupling coefficient obtained by multiplying the coupling coefficients of the neurons among the layers other than the last layer, and takes the coupling coefficients among the layers read out, by the address output from the address generator, from the table memory as addresses to output the total coupling coefficients corresponding to the addresses, (d) a weight memory which stores a weight of a neuron of the last layer, and takes the address of the address generator and the address of the characteristic data which is supplied to the table memory as an address to output the weight of the neuron of the last layer corresponding to both the addresses, and (e) a cumulative operation unit which performs cumulative additions of the product of the output of the coefficient memory times the output of the weight memory, wherein arithmetical operation is performed only on a particular network having a non-zero coupling coefficient value.

Still another multi-layer neural network circuit for recognizing and processing characteristic data by the execution of network arithmetical operations is provided which comprises: (a) a control circuit which outputs a number of times of a network to be calculated, (b) an address generator which subsequently counts the number of times of the network to be calculated, by the output of the control circuit, (c) a plurality of characteristic data memories which store the characteristic data, and subsequently read the characteristic data as the address generator counts, (d) a weight memory which stores weights of neurons of the last layer, (e) a plurality of coefficient memories which store coupling coefficients of the layers other than the last layer, (f) a plurality of address converters which calculate only addresses of nets of having a non-zero coupling coefficient value in a network on the basis of the outputs of the address generator, the characteristic data memories and the control circuit, to supply the addresses thus calculated to the coefficient memories while at the same time calculating addresses to be output to the weight memory, (g) a table memory which takes the coupling coefficients read out from the coefficient memories corresponding to the addresses output from the address converter as addresses to output total coupling coefficients obtained by multiplying the coupling coefficients of the layers corresponding to the addresses, (h) a cumulative operation unit which performs cumulative additions of the product of the output of the table memory times the output of the weight memory, and (i) an output memory which holds results produced by the cumulative operation unit at the addresses output from the address generator, wherein arithmetical operation is performed only on a particular network having a non-zero coupling coefficient value.

A further neural network circuit in accordance with the above-described neural network circuit is provided which further includes a weight update unit which is supplied with the weight of the neuron of the last layer output from the weight memory to assign a predetermined set update value to the weight, wherein the learning of recognition and process of the characteristic data is done by updating the weight of the neuron of the last layer.

A still further neural network circuit in accordance with the above-described neural network circuit is provided which further includes a shifter which is supplied with the total coupling coefficient output from the table memory to output an updated value according to the total coupling coefficient, and a weight update unit which is supplied with the update value output from the shifter and with the weight of the neuron of the last layer output from the weight memory to update the weight by adding the updated value thereto, wherein the learning of recognition and process of the characteristic data is done by updating the weight of the neuron of the last layer using a value according to the amount of fire of the neuron.

Another neural network circuit in accordance with the above-described neural network circuit is provided which further includes a weight update unit which updates the value of the weight of the neuron of the last layer output from the weight memory so as to temporarily determines a new value of the weight, and reduces all values of the weights stored in the weight memory at the same ratio if the updated value of the neuron of the last layer overflows, wherein the learning of avoiding the overflow of the value of the neuron of the last layer by updating thereof is done.

A further neural network circuit in accordance with the above-described neural network circuit is provided which further includes a look-up table which nonlinear converts and stores the characteristic data in the characteristic data memory, taking the characteristic data as an address, wherein the characteristic data to be supplied to the characteristic data memories are in advance nonlinear converted.

A still further neural network circuit in accordance with the above-described neural network circuit is provided wherein the address converter, which outputs a control signal, modifies the contents of the control signal depending on whether an address of a non-zero coupling coefficient and an address of a greatest non-zero coupling coefficient are in series, and a multiplexer, which is supplied with the control signal from the address converter, outputs a 0 to the table memory when the addresses are not in series, or selects and outputs the coupling coefficient from the coefficient memory to the table memory when the addresses are in series.

A neural network circuit in accordance with the above-described neural network circuit is provided which further includes a quantization conversion circuit which quantizes a plurality of characteristic data. The quantization conversion circuit comprises: (a) a quantization conversion threshold memory which holds a plurality of quantization conversion thresholds for every characteristic data, (b) a comparator which compares input characteristic data with the threshold read out from the quantization conversion threshold memory, (c) an adder which calculates an address of the threshold of the quantization conversion threshold memory to be compared with on the basis of the output of the comparator, (d) a register which holds the output of the adder and gives the address to the quantization conversion threshold memory, and (e) a 2-input multiplexer which is supplied with the input and output of the register, and outputs either the input or the output of the register on the basis of comparison results of the comparator as a quantization conversion solution, wherein the characteristic data memory stores the characteristic data quantized by the quantization conversion circuit and the input characteristic data are quantization converted with different thresholds.

Another neural network in accordance with the above described neural network is provided which further include: (a) a plurality of initial learning characteristic data memories in which plural items of the characteristic data are prestored for initial learning, (b) a comparator which is supplied with supervisor data and compares the recognition results of the characteristic data read out of the initial learning characteristic data memories with the supervisor data, and (c) a weight update unit which is supplied with weights of neurons of the last layer output from the weight memory and updates the weights on the basis of the comparison results produced by the comparator, wherein the recognition processing learning of the characteristic data by updating the weights of the neurons of the last layer is performed by referring to the plural items of the characteristic data prestored in the initial learning characteristic data memories.

According to the present invention, the following advantages over the prior art are obtained.

When the characteristic data are supplied to the neural network circuit of the invention, the address generator (address converter) outputs only an address of a particular net having a non-zero coupling coefficient of a network on the basis of the characteristic data input. A total coupling coefficient and a weigh of a neuron of a last layer both corresponding to the address output from the address generator (address converter) are output from the coefficient memory and the weight memory respectively. The cumulative operation unit performs cumulative additions of the product of the total coupling coefficient times the weight. Accordingly, arithmetical operations are performed only on nets whose coupling coefficients have other values other than 0 (that is, a net for which an arithmetical operation produces other results other than 0). Thus, the speed of image recognition or the like is improved.

In the invention, when the characteristic data are fed to the neural network circuit, the data for the coupling coefficient corresponding to the input characteristic data is read out from the table memory. The address generator outputs only an address of a particular net having a non-zero coupling coefficient in the network. The table memory outputs only a non-zero coupling coefficient corresponding to the address output from the address generator. Further, the coefficient memory, taking the non-zero coupling coefficient output from the table memory as an address, outputs a total coupling coefficient obtained by multiplying the coupling coefficients. The weight memory outputs a weight of a neuron of the last layer corresponding to the address output from the address generator. The cumulative operation unit performs cumulative additions of the product of the total coupling coefficient times the weight of the neuron of the last layer. Since arithmetical operations are performed only on nets whose coupling coefficients have other values other than 0 (that is, a net for which an arithmetical operation produces other results other than 0). Thus, the speed of image recognition or the like is improved. In addition to this, since the provision of a single coefficient memory for every layer for storing coupling coefficients is sufficient, this achieves small-scale hardware and provides a neural network with superior processing capabilities.

In the present invention, the address converter calculates only an address of a net having a non-zero coupling coefficient in the network and outputs the address calculated on the basis of the respective outputs of the characteristic data memory, the control circuit, and the address generator. The coefficient memory outputs the coupling coefficient of each layer corresponding to the address output from the address generator. The weight memory outputs the weight of the neuron of the last layer corresponding to the address output from the address generator. The table memory outputs the total coupling coefficient obtained by inter-multiplying the coupling coefficients. Then the cumulative operation unit performs cumulative additions of the product of the total coupling coefficient times the weight of the neuron of the last layer, the results of which are held in the output memory. Since arithmetical operations are performed only on nets whose coupling coefficients have other values other than 0 (that is, a net for which an arithmetical operation produces other results other than 0). Thus, the speed of image recognition or the like is improved. In addition to this, since the provision of a single coefficient memory for every layer for storing coupling coefficients is sufficient, this achieves small-scale hardware and provides a neural network with superior processing capabilities.

Further, in the present invention, the weight of the neuron of the last layer corresponding to the address of net having a non-zero coupling coefficient is read out by the weight memory on the basis of the input characteristic data. The weight thus read out is added by a set update value by the weight update unit to update and make it heavier. Thus, the recognition rate of characteristic data is gradually improved.

Additionally, in the present invention, the address of a net having a non-zero coupling coefficient in the network is output on the basis of the input characteristic data. The total coupling coefficient obtained by multiplying the coupling coefficients among the layer each corresponding to the address is output from the table memory. After the weight of the neuron of the last layer corresponding to the address is read out from the weight memory, an updated value corresponding to the total coupling coefficient (i.e., an updated value corresponding to the amount of fire of the neuron) is output from the shifter. The weight of the neuron of the last layer is updated by adding the updated value thereto by the weight update unit. The weight of the neuron of the last layer is updated according to the amount of fire of the neuron, so that the recognition rate of characteristic data can be improved in short time.

Further, in the invention, if overflow occurs due to the update of the neuron of the last layer stored in the weight memory, every weight stored in the weight memory is reduced at the same ratio. Thus, the overflow can be prevented, and the update of weights is properly carried out. The recognition rate of characteristic data can be improved effectively with small-scale hardware.

Additionally, in the present invention, the characteristic data first are nonlinear converted by the look-up table and thereafter stored in the characteristic data memory, which produces the same effect as the contract between images. Accordingly, even if the characteristic data do not carry thereon a clear difference between images, the image recognition rate can be improved.

Further, in the present invention, the multiplexer outputs a coupling coefficient with a value of 0 instead of a non-zero coupling coefficient if such a non-zero coupling coefficient is not in a series relationship with a greatest non-zero coupling coefficient. For such non-zero coupling coefficients, no arithmetical operations using them will not be carried out. Thus, any arithmetical operation through which the right side of a pixel comes to have a series relationship with another pixel on its right side is avoided. The recognition rate of characteristic data is improved.

Furthermore, in the present invention, the characteristic data supplied to the circuit is compared with one of the plural thresholds in the quantization conversion threshold memory corresponding to the characteristic data. In addition, another threshold to be compared with next is specified by the adder and the register which is then compared with the characteristic data by the comparator. The 2-input multiplexer selects an address of the threshold in close proximity to the value of the characteristic data from among the thresholds utilized in comparison. The address thus selected is a quantization conversion solution of the characteristic data. Accordingly, since it is possible to separately quantization convert the characteristic data with different thresholds, this eliminates the need to provide a quantization conversion memory for every quantized neuron. As a result, the neural network circuit can be made up of small-scale hardware.

Still further, in the present invention, reference is made to the plural items of the characteristic data stored in the initial learning characteristic data memories during the initial learning, and the recognition and the learning of recognition and processing, of such data is done. Accordingly, in referring to the same characteristic data a plural number of times until the end of the learning, there is no need to load such characteristic data to the memory every time the reference thereto is required. This allows the initial learning on the characteristic data to be performed at high-speed. In other words, the initial learning is finished in a short time.

BRIEF DESCRIPTION OF THE DRAWINGS

The above-described objects and additional advantages of the present invention are described in and will be apparent from the detailed description of the invention and from the drawings of preferred embodiments of the invention.

FIG. 6 is an output timing chart of the address generator and an address converter of the second embodiment.

FIG. 20 illustrates the contents of the quantization conversion threshold memory of the eighth embodiment.

FIG. 28 is a diagram showing initial learning characteristic data.

DESCRIPTION OF THE PREFERRED EMBODIMENTS FIRST EMBODIMENT

Preferred embodiments of the present invention are described with reference to the drawings.

Figure 1:
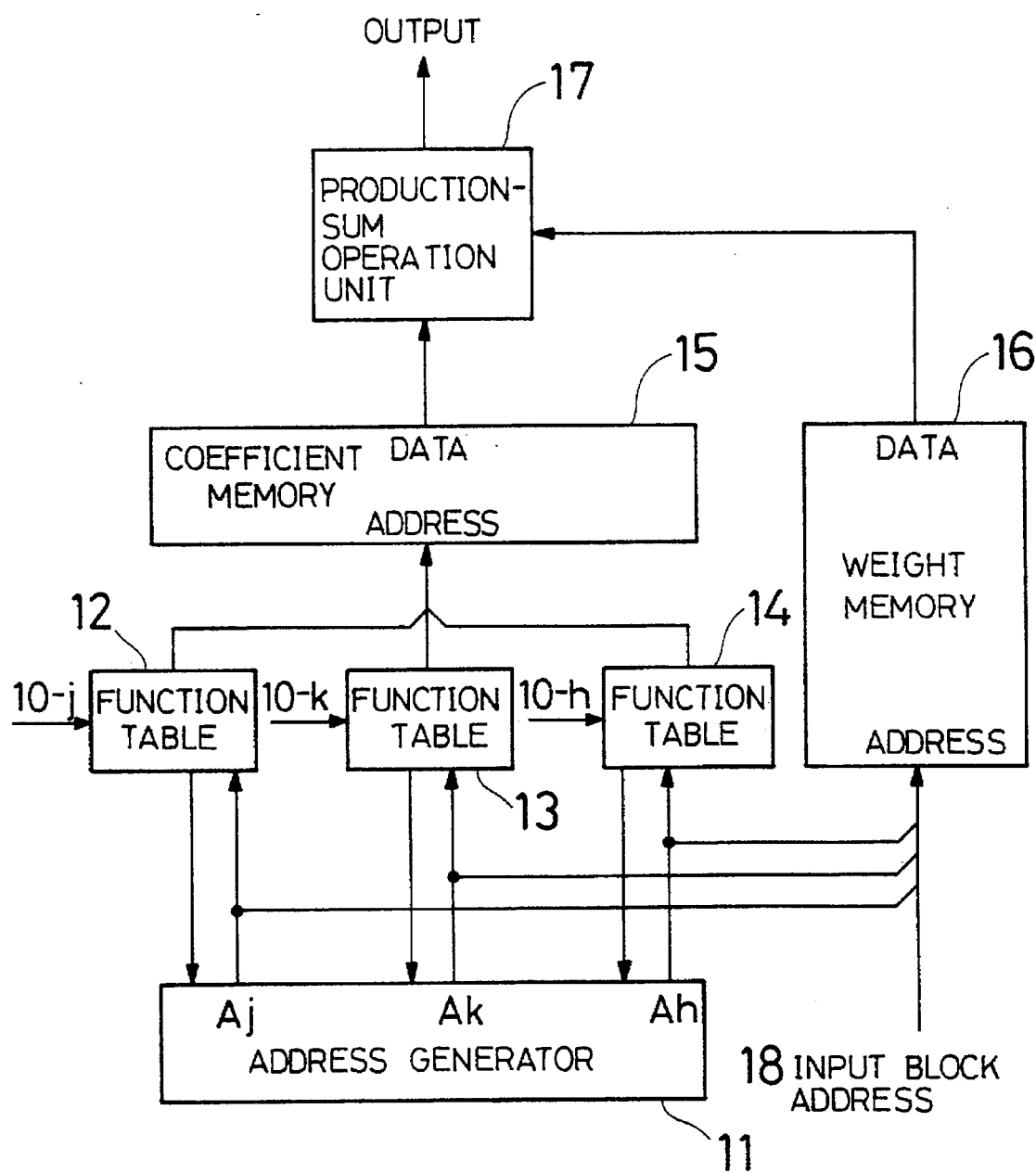
FIG. 1 is a diagram showing the organization of a neural network circuit of a first embodiment of the invention.

FIG. 1 illustrates a first embodiment of the invention. In FIG. 1, characteristic data 10-$j$, 10-$k$ and 10-$h$ are quantization signals, and are supplied to the quantization signal input terminals S of the quantized neurons of the first, second and third layers of the network of FIG. 21. An address generator 11 outputs addresses for access only to significant portions (i.e., portions having other values other than a value of 0) of a coupling coefficient between quantized neurons. Function tables 12, 13 and 14 store output levels corresponding to coupling coefficients of quantized neurons. The function tables 12, 13 and 14 correspond to the first, second and third layers of the network, and take the characteristic data 10-$j$, $k$ and $h$ and the outputs of the address generator 11 as their addresses. A coefficient memory 1S takes the data output from the function tables 12, 13 and 14 as its address, and further takes the output values of the third layer of the neural network as internally stored data. In the coefficient memory 15, as seen from FIG. 21, the selective input signal of the quantized neuron of the second layer is the output of the quantized neuron of the first layer, while the selective input is signal of the quantized neuron of the third layer the view output of the quantized neuron of the second layer. In of this, the output of the quantized neuron of the third layer is a product obtained by a multiplication: the coupling coefficient of the neuron of the first layer×the coupling coefficient of the neuron of the second layer×the coupling coefficient of the neuron of the third layer×the value of the selective input signal of the first layer. Since such a product obtained above is stored in the coefficient memory 15, this eliminates the need to carry out multiplication operations on the layers except for the last layer.

Next, a way of skipping insignificant portions (that is, portions having a value of 0) of a coupling coefficient is described below. There is a reason for taking such a way. As seen from the function of FIG. 2, the coupling coefficient does not comprise non-zero portions only, that is, some portions thereof are non-zero, whereas the other portions are insignificant (that is, having a value of 0). If a coefficient has a value of 0, there is no need to perform multiplications on the grounds that the results of such multiplication always come to zero. In view of this, processing time can be shortened considerably.

Figure 2:
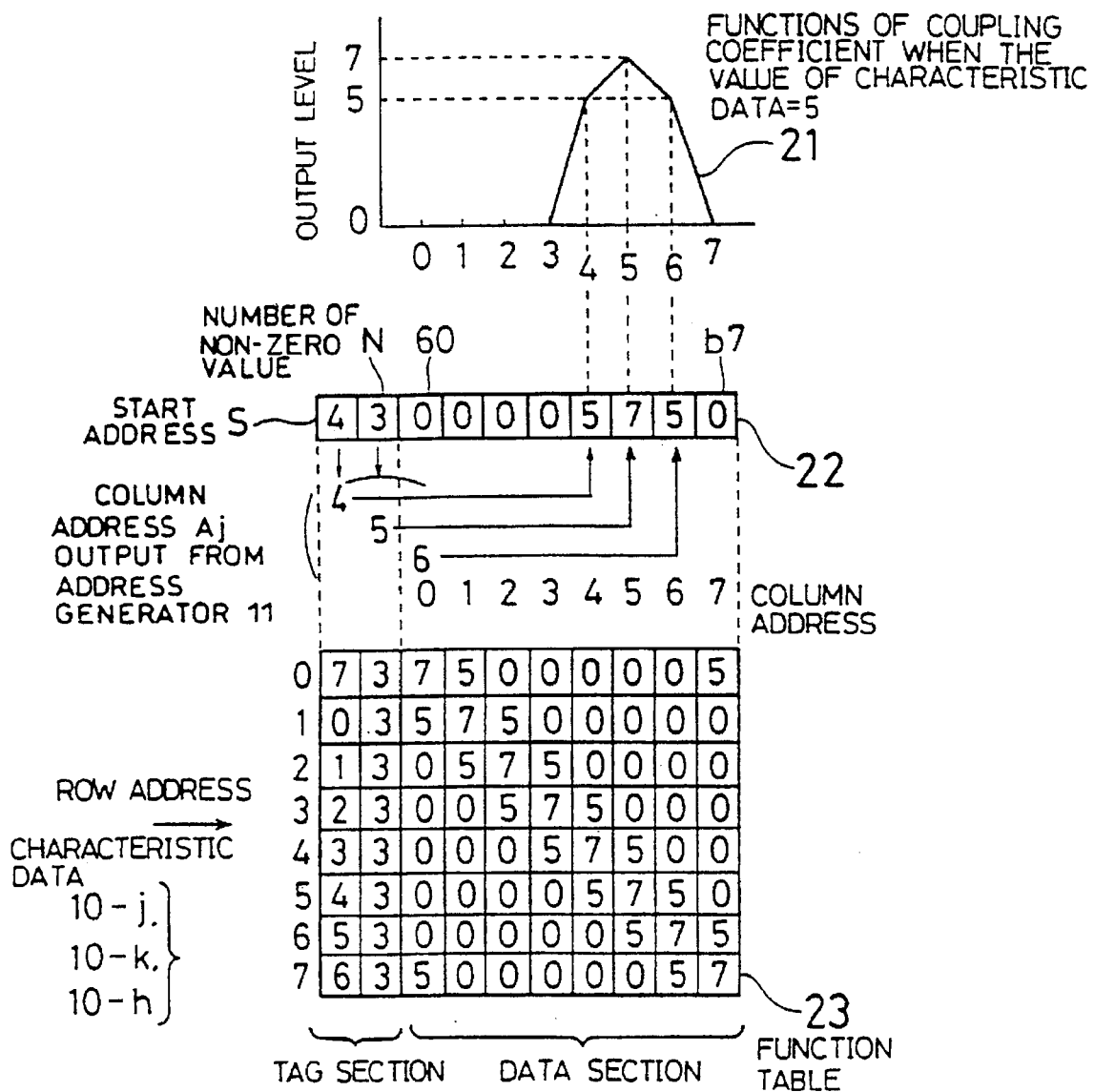
FIG. 2 is a diagram showing the organization of a function table of the first embodiment.

First, as the initialization, the levels of the coupling coefficients corresponding to the layers are written to the function tables 12, 13 and 14. However, what are actually written to the tables are not the values of the coupling coefficients in themselves but the relative values for the eight output levels, which is illustrated in FIG. 2. The reference numeral 21 is a function of a coupling coefficient. The reference numeral 22 is the function 21 in the form of numerical value data. The reference numeral 23 is a function table. The numerical value data 22 is written to the layer of the network having the function 21. Each function is subject to the foregoing Formula (1), and all $\beta$'s are the same. For example, the coupling coefficient at the column address 3 is a coupling coefficient which can be obtained by shifting the coupling coefficient at the column address 1 two positions to the right. Each coupling coefficient is assigned a tag comprised of S and N. The address at which the coupling coefficient first takes other values other than a value of 0 is represented by S, whereas N shows the number of non-zero values. For the function 21, S=4 and N=3.

Figure 3:
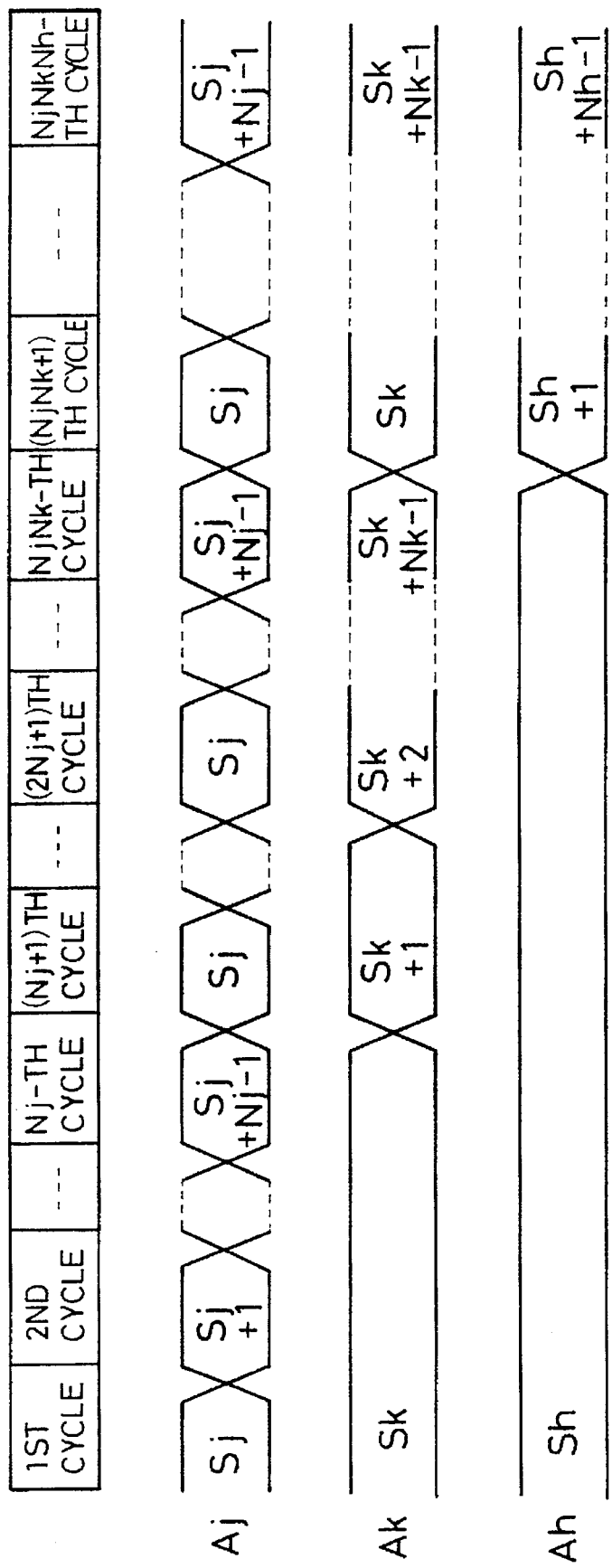
FIG. 3 is a timing chart of an address generator of the first embodiment.

The function tables 12, 13 and 14 have tags, Sj, Sk, Sh, Nj, Nk, and Nh. The address generator 11 sends out address signals Aj, Ak and Ah to the function tables 12, 13 and 14. FIG. 3 shows a timing chart of the address generator 11.

At the first cycle, the characteristic data 10-$j$, 10-$k$ and 10-$h$ are fed to the function tables 12, 13 and 14 so that respective column addresses are determined. Then the tags Sj, Sk, Sh, Nj, Nk and Nh are supplied from the function tables 12, 13 and 14 to the address generator 11. As the initial values of the address signals Aj, Ak and Ah, the address generator 11 sets the addresses Sj, Sk and Sk at which the coupling coefficients first take other values other than zero, to Aj=Sj, Ak=Sk and Ah=Sh.

At the second cycle, Sj is added by 1 so that Aj=Sj+1, which is output. The same addition is repeated Nj times (=a number of times corresponding to the number of non-zero values). From the (Nj+1)th cycle to the (Nj×Nk)th cycle, the same operations as the first cycle to the Nj-th cycle are repeated Nk times. At the (Nj×Nk+1)th cycle where Aj=Sj and Ak=Sk, and Ah=Sh+1 which is output. From the (Nj× Nk+1)th cycle to the (Nj×Nk×Nh)th cycle, the same operations as the first cycle to the (Nj×Nk)th cycle are repeated Nh times. Thus, the address generator 11 can access to only particular nets of the three-layered network having a coupling coefficient with other values other than 0.

The address signals Aj, Ak and Ah of the address generator 11 are supplied to the respective function tables 12, 13 and 14. Data Dj, Dk and Dh of the function tables accessed by the address signals Aj, Ak and Ah are read out. The data Dj, Dk and Dh, serving as high-order bits, medium-order bits and low-order bits respectively, serve as the address of the coefficient memory 15.

The coefficient memory 15 holds the output values from the third layer of the network. If the number of outputs of a quantized neuron is eight, the number of the output values from the third layer can be found by 8×8×8 (=512). As seen from Formula (1), the coupling coefficient τ takes 1 as its maximum value, and 0 as its minimum value. Therefore, if the coupling coefficient has eight levels, the number of output values that the coupling coefficient τ can take is limited to 512, regardless of the value of β. The coefficient memory 15 may be either a ROM or a RAM.

In FIG. 1, the reference numeral 16 denotes a weight memory. The weight memory 16 stores weight values for coupling between the output of the third layer and the input of the neuron of the last layer. An input block address 18 shows the addresses for access to respective blocks resulting from division of the data to be processed into N×N. The weight memory 16 is supplied with an address signal of the address generator 11 and with an address signal of the input block address 18, and takes a weight value which is accessed by a synthesized address of the two addresses and corresponds to a signal of a neuron at the synthesized address, as its own data. A neural network having learning capabilities can be realized by making up the weight memory 16 of a RAM.

The reference numeral 17 denotes a production-sum operation unit. On a single neuron of the last layer, the production-sum operation unit 17 repeatedly carries out multiplication the number of times corresponding to the number of inputs connected to such a neuron of the last layer, taking the output of the coefficient memory 15 (i.e., the coupling coefficient π ijkh from the network) and the output of the weight memory 16, as a multiplier and a multiplicand respectively. Then the production-sum operation unit 17 accumulates the results one by one.

In conventional sequential computers of yon-Neumann type, if the number of input blocks (or pixels) is sixty-four (64), 32768 (64×8×8×8) product-sum operations at the maximum are required to determine the output values of the output neurons of the last layer with the results thereof. On the contrary, the present invention requires only 64×3 ×4×3 operations if the coupling coefficients of the quantized neurons of the first to third layers have three, four and three non-zero portions, respectively. Thus, the invention reduces the amount of operation by $^{36}/_{512}$, which allows the operation to be carried out at higher speed.

SECOND EMBODIMENT

Figure 4:
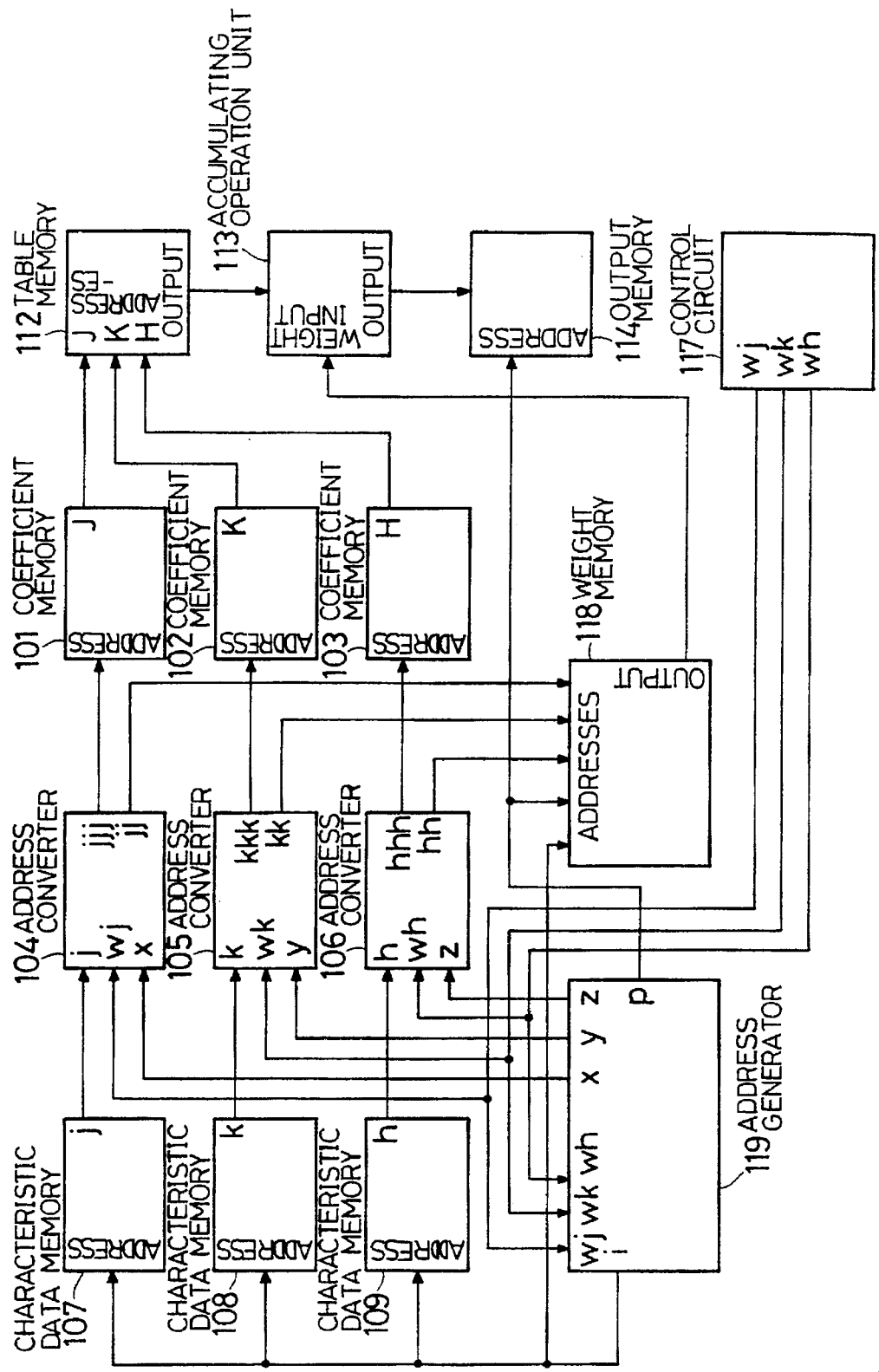
FIG. 4 is a diagram showing the organization of a neural network circuit of a second embodiment of the invention.

FIG. 4 shows a second embodiment of the present invention. Characteristic data memories 107, 108 and 109 are supplied with characteristic data of an image to be recognized. Network operations are carried out on the characteristic data to recognize the image.

Figure 31:
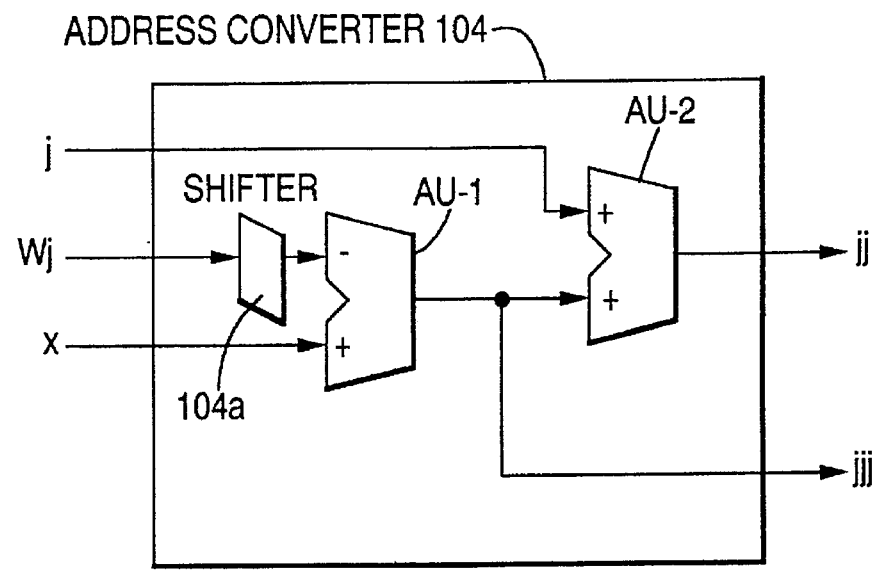
FIG. 31 is a diagram illustrating one embodiment of the address converter of the present invention.
Figure 32:
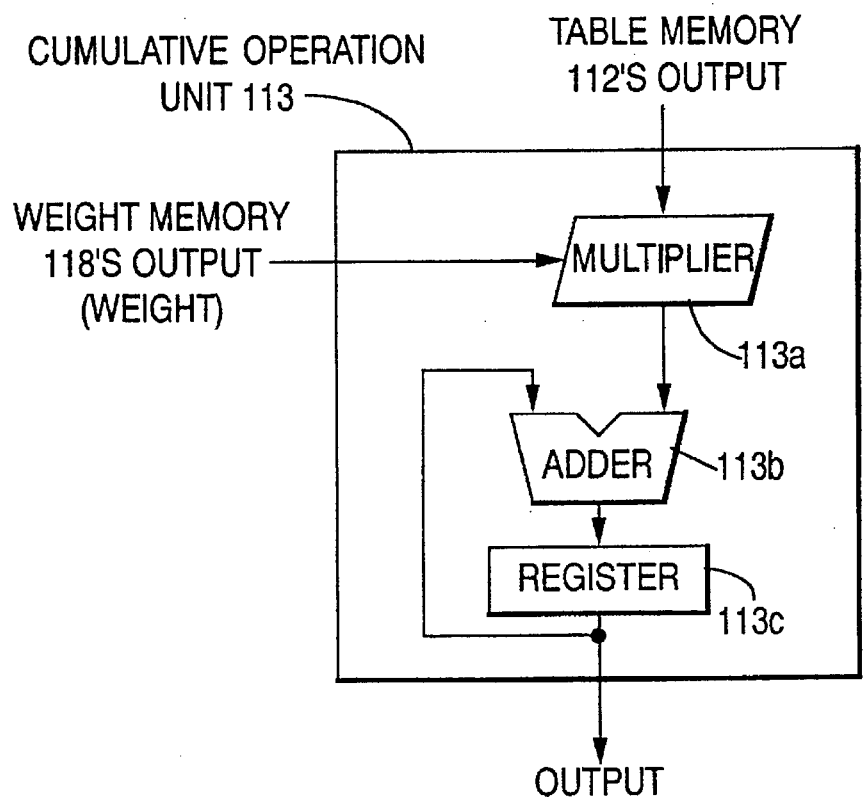
FIG. 32 is a diagram illustrating one embodiment of the cumulative operation unit of the present invention.
Figure 33:
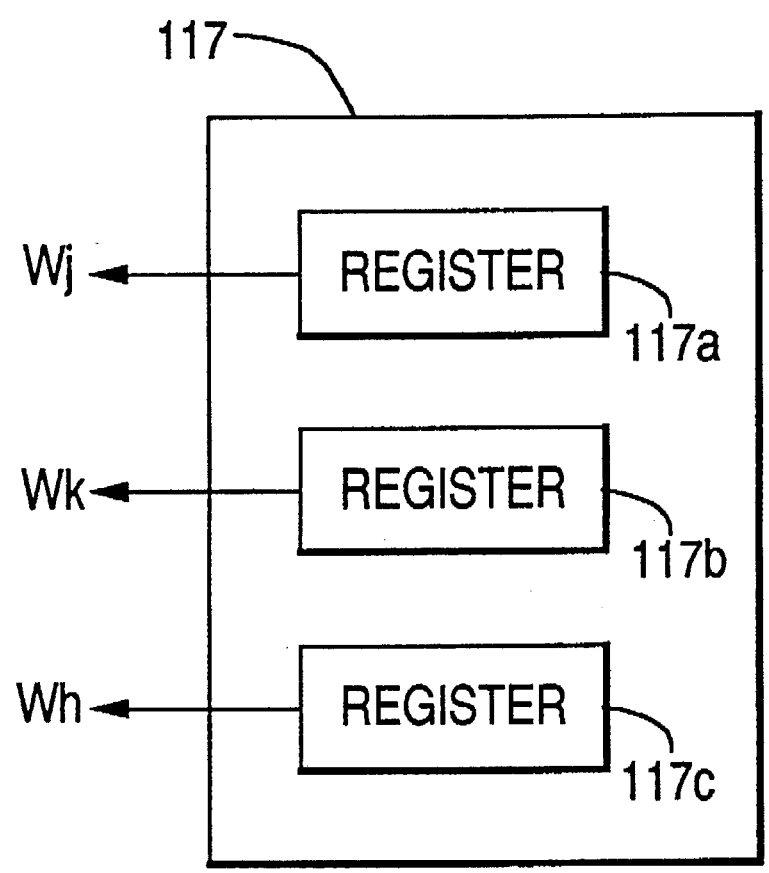
FIG. 33 is a diagram illustrating one embodiment of the control circuit of the present invention.

The characteristic data memories 107, 108 and 109 hold therein the image characteristic data to be supplied to the quantization signal input terminals S of the quantized neurons of the first, second and third layers. Coefficient memories 101, 102 and 103 hold the coupling coefficients of the quantized neurons of the first, second and third layers. A table memory 112 has the same functions as the coefficient memory of the first embodiment. The table memory 112 is supplied with outputs J, K and H of the coefficient memories 101, 102 and 103, and outputs a value obtained by multiplying the outputs J, K and H one another. A weight memory 118 holds the weights of the neurons of the last layer. A cumulative operation unit 113 is supplied with the output of the table memory 112 and with the output of the weight memory 118, and performs cumulative additions of the product obtained by multiplying both outputs. The cumulative operation unit 113 can be implemented in hardware, as shown for example in FIG. 32. Specifically, FIG. 32 illustrates a cumulative operation unit comprising a multiplier 113a which receives an output of a table memory 112 and an output of a weight memory 118 and multiplies these inputs; an adder 113b for accumulating outputs of the multiplier 113a, and a register 113c for storing an accumulated result of the adder 113b. The output of the cumulative operation unit 113 is the value of the register 113c. A control circuit 117 sends to an address generator 119 and address converters 104, 105 and 106 the signals of data counts Wj, Wk and Wh (the numbers of data having other values other than zero of the coupling coefficients of the first, second and third layers). The address converters 104, 105 and 106 receive data from the address generator 119 and from the characteristic data memories 107, 108 and 109, and convert the data into the addresses of the coefficient memories 101 to 103 and the weight memory 118. The control circuit 117 can be implemented in hardware, as shown for example in FIG. 33. Specifically, FIG. 33 illustrates a control circuit comprising three registers 117a, 117b, 117c, which store values Wj, Wk, Wh, respectively. In addition, the address converters 104, 105 and 106 can also be implemented in hardware. Specifically, FIG. 31 illustrates a single address converter comprising a shifter 104a for obtaining Wj/2 by shifting the value of Wj to the right by one bit; an arithmetic unit AU-1 for calculating −Wj/2+X, which receives the result of the shifter 104a and a output X of an address generator 119 as inputs; and an arithmetic unit AU-2 for calculating j−Wj/2+X, which receives the output of the arithmetic unit AU-1 and a characteristic data j of a first layer from a characteristic data memory 107 so as to execute the equations jjj=−Wj/2+X and jj=j−Wj/2+X (in the second embodiment). Result jjj indicates the output of the arithmetic unit AU-1, and result jj indicates the output of the arithmetic unit AU-2. Address converters 105 and 106 have the same construction.

Figure 5:
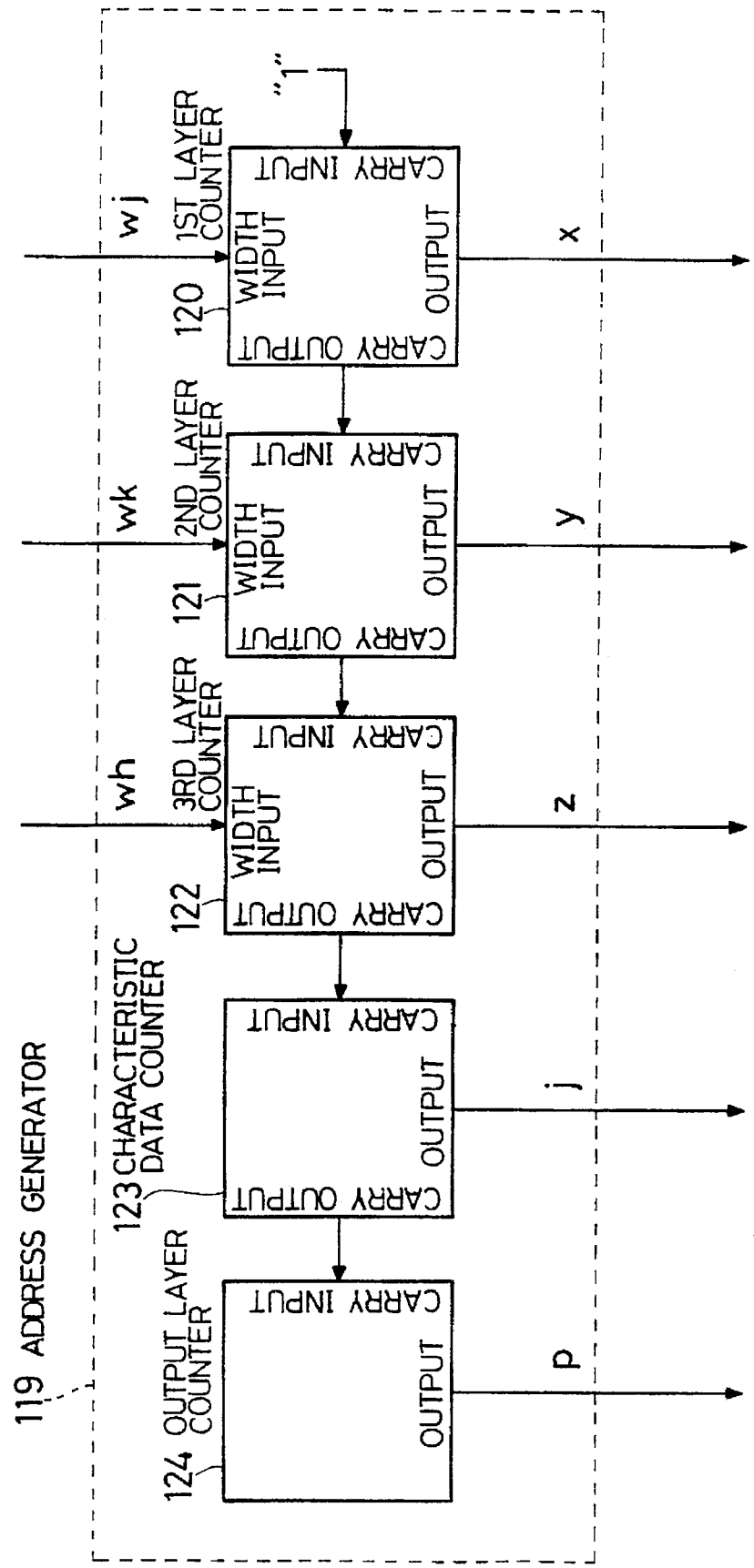
FIG. 5 is a diagram showing the organization of an address generator of the second embodiment.
Figure 6:
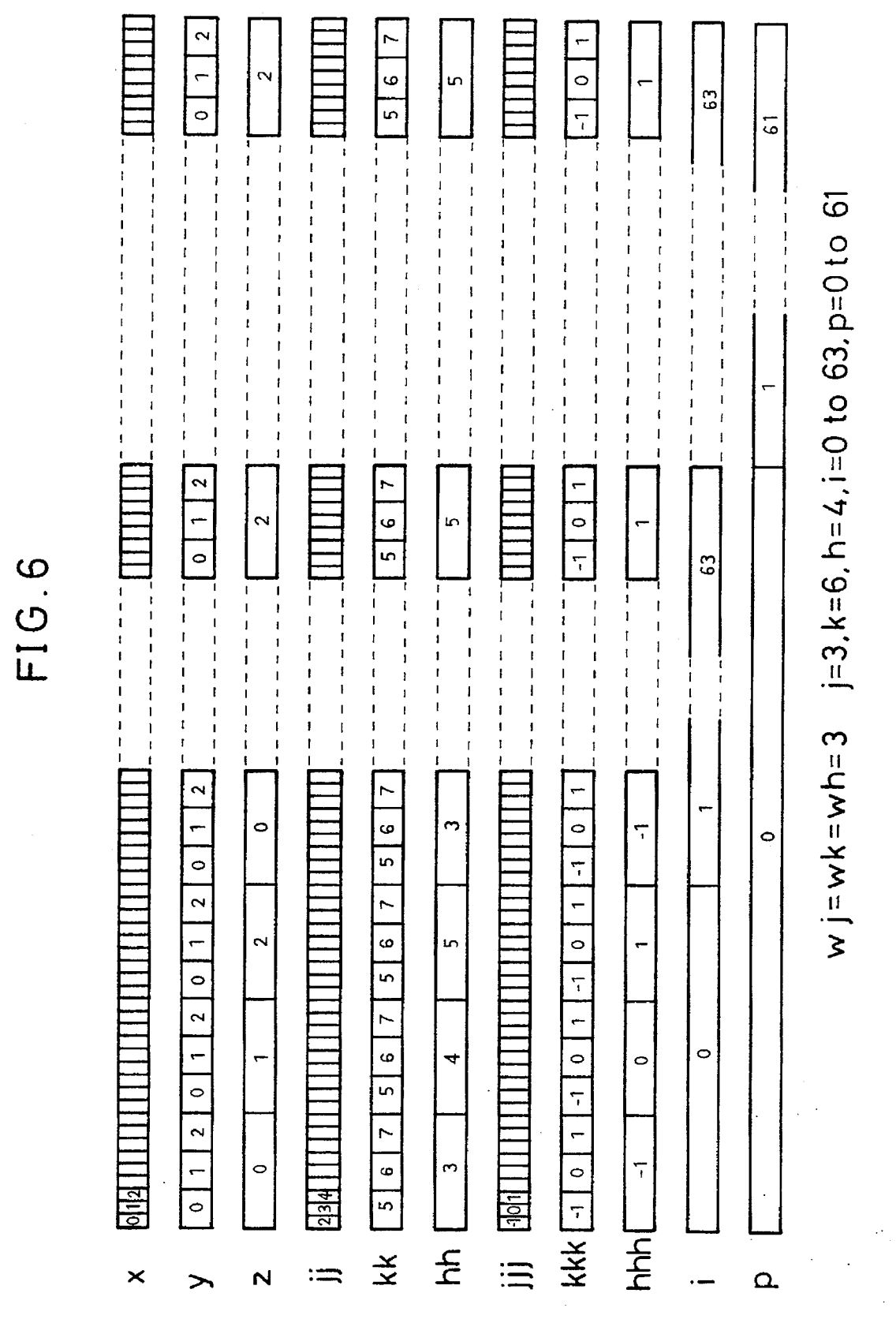

As shown in FIG. 5, the address generator 119 comprises five counters, a first layer counter 120, a second layer counter 121, a third layer counter 122, a characteristic data counter 123 and an output layer counter 124. The first layer counter 120 is supplied with the data count Wj (the number of data having other values other than zero of the coupling coefficient of the first layer) as its count width, and subsequently counts from 0 upward to (the width input value Wj−1) when the carry input is 1. As shown in FIG. 6, the output x of the first layer counter 120 subsequently counts from 0 to 1 to 2 and thereafter again starts counting from 0 to 1 to 2. The second layer counter 121 is supplied with the data count Wk (the number of data having other values other than zero of the coupling coefficient of the second layer) as its count width, and adds 1 every time the output x of the first layer counter 120 is reset. The output y of the second layer counter 121 changes from 0 to (the width input value Wk−1), as shown in FIG. 6. The third layer counter 122 is supplied with the data count Wh (the number of data having other values other than zero of the coupling coefficient of the third layer) as its count width, and adds 1 every time the output y of the second layer counter 121 is reset. The output z of the third layer counter 122 changes from 0 to (the width input value Wh−1). The characteristic data counter 123 is a counter which counts the number of times corresponding to the number of characteristic data (64 characteristic data in FIG. 6), and adds 1 every time the output z of the third layer counter 122 is reset. The output i of the characteristic data counter 123 changes from 0 to (the number of characteristic data−1). Characteristic data j, k and h to be supplied to the layers are read out of the characteristic data memories 107, 108 and 109 by the output i. The output layer counter 124 is a counter which counts the number of times corresponding to the number of neurons of the last layer (for example, 62 neurons), and adds 1 every time the output i of the characteristic data counter 123 is reset. The output p of the output layer counter 124, as shown in FIG. 6, varies from 0 to (the number of output neurons−1).

The address converters 104, 105 and 106 are described below. The address converter 104 is supplied with the characteristic data J of the first layer from the characteristic data memory 107, the output x of the first layer counter 120 of the address generator 119 and the data count Wj (the number of data having other values other than zero of the coupling coefficient of the first layer). Then the address converter 104 converts these inputs into the address jjj of the coefficient memory 104 holding the coupling coefficients of the quantized neurons of the first layer by Formula (4), and into the address jj of the weight memory 118 storing the weights of the neurons of the last layer by Formula (5).

$$jjj = -Wj/2 + x \quad (4)$$

$$jj = j - Wj/2 + x \quad (5)$$

Figure 24:
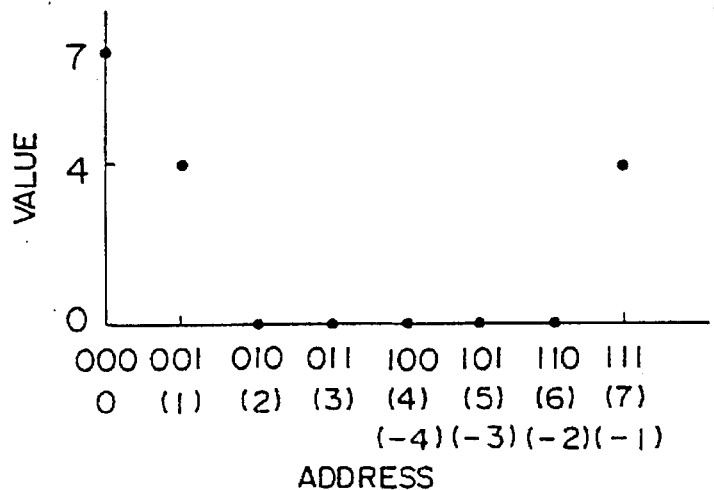
FIG. 24 is an explanatory diagram of a function of $(1-\beta)$
Figure 25:
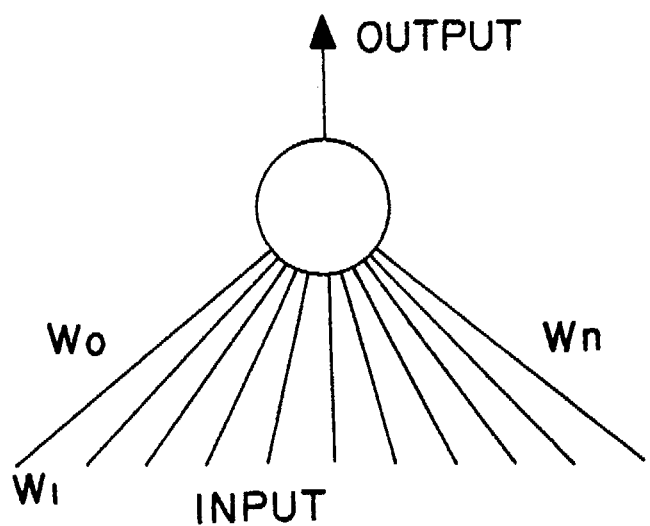
FIG. 25 is an explanatory diagram of a neuron of a last layer of a neural network of quantized neurons.
Figure 26:
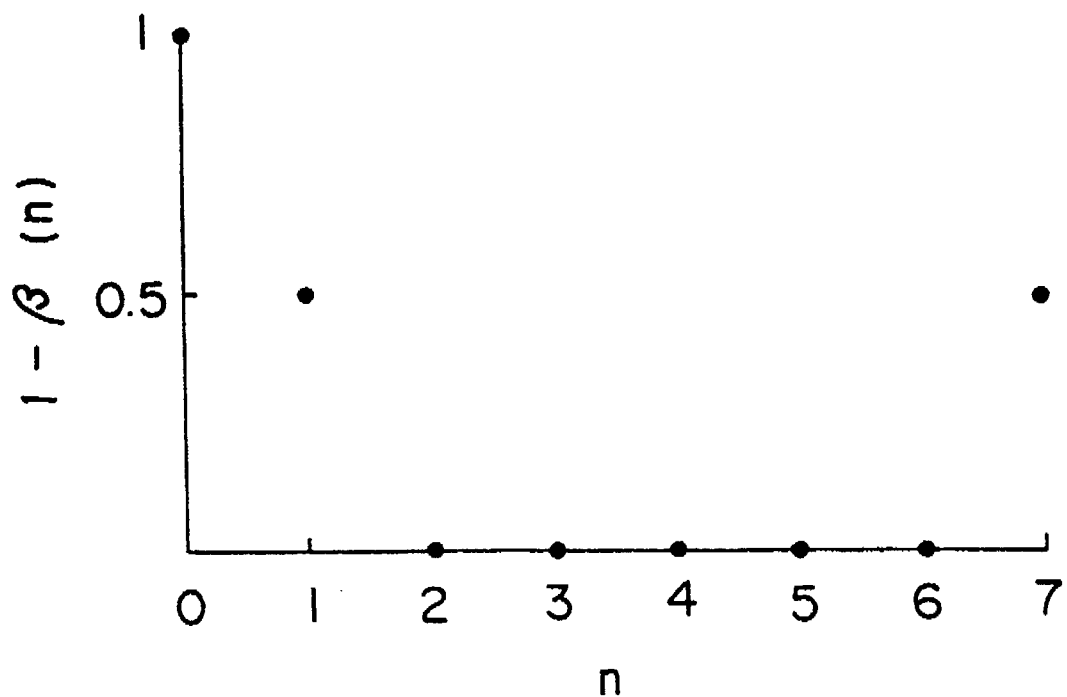
FIG. 26 is an explanatory diagram of a coupling coefficient of a quantized neurons.

If the number of outputs of a quantized neuron is eight and the quantization signal input terminal S has eight input levels from 0 to 7, the variable of the output of the quantized neuron ranges between 0 and 7. Three low-order bits of the results of the jjj and jj are output. In the coupling coefficient of FIG. 24, the data count Wj (the number of data having other values other than zero of the coupling coefficient of the first layer)=3. The output of the address jjj of the address converter 104, as shown in FIG. 6, subsequently counts from jjj=−1 to 0 to 1, and starts shifting one position from at the address where the coupling coefficient first takes other values other than zero to synchronize with the output x of the first layer counter 120. The output of the address jj of the weight memory 118, if the characteristic data j=3, subsequently counts from the absolute address 2 to 3 to 4, and then resets to synchronize with the output x of the first layer counter 120.

Similarly, the address converter 105 is supplied with the characteristic data k of the second layer from the characteristic data memory 108, the output y of the second layer counter 121 of the address generator 119 and the data count Wk (the number of data having other values other than zero of the coupling coefficient of the second layer). Then the address converter 105 converts these inputs into the address kkk of the coefficient memory 102 holding the coupling coefficients of the quantized neurons of the second layer, and into the address kk of the weight memory 118 storing the coefficient of the last layer, and outputs these two addresses. As shown in FIG. 6, the address kkk synchronizes with the output y of the second layer counter 121 and subsequently counts from −1 to 0 to 1. The address kk adds 1 every time the address jj output from the address converter 104 resets, and subsequently counts from 5 to 6 to 7, and then resets to synchronize with the output y of the second layer counter 121, when the characteristic data k supplied from the characteristic memory 108=6.

The address converter 106 is supplied with the characteristic data h of the third layer from the characteristic data memory 109, the output z of the third layer counter 122 of the address generator 119 and the data count Wh (the number of data having other vales other than zero of the coupling coefficient of the third layer). Then the address converter 106 converts these inputs into the address hhh of the coefficient memory 103 holding the coupling coefficient of the quantized neuron of the third layer, and into the address hh of the weight memory 118 storing the coefficient of the last layer, and outputs the addresses. As shown in FIG. 6, the address hhh synchronizes with the output z of the third layer counter 122, subsequently counts from −1 to 0 to 1 and resets. The address hh adds 1 every time the address kk output from the address converter 105 resets, subsequently counts from 3 to 4 to 5 and resets to synchronize with the output z of the second layer counter 122, when the characteristic data h supplied from the characteristic memory 109=4.

Of all coupling coefficients of the quantized neurons of the first to third layers, the coefficient memories 101, 102 and 103 output the coupling coefficients having other values other than 0 and corresponding to the addresses supplied from the address converter 104, 105 and 106. The table memory 112 is supplied with the coupling coefficients output from the coefficient memories 101, 102 and 103 and multiplies the supplied coupling coefficients one another to, obtain the output of the quantized neuron of the third layer. The weight memory 118, which holds the weights of the neurons of the last layer of the quantized neuron network, is supplied with the address signals from the address converters 104, 105 and 106, the output i of the characteristic data counter 123 and the output p of the output layer counter 124 of the characteristic generator 123 so that it outputs the weight data of the output neuron corresponding to the output data (i.e., the output of the quantized neuron of the third layer) of the table memory 112. The cumulative operation unit 113 multiplies the output of the table memory 112 by the output of the weight memory 118, and accumulates the results. The foregoing operations are carried out as the address generator 119 counts upward. When the output p of the output layer counter 124 of the address generator 119 varies, the value of the cumulative operation unit 113 is written to at the address of an output memory 114. The value of the cumulative operation unit 113 goes to 0.

When the address generator 119 finishes counting, the arithmetical operations of image recognition are completed as well. The solution outputs of the quantized neuron network are obtained at the output memory 114.

In the present invention, the arithmetical operations are carried out only on the non-zero portions of a coupling coefficient of a quantized neuron, whereas in the prior art they are performed on every portion including an insignificant portion with a value of 0. Therefore, the present invention compares favorably with the prior art in that processing speed is much improved.

THIRD EMBODIMENT

Figure 7:
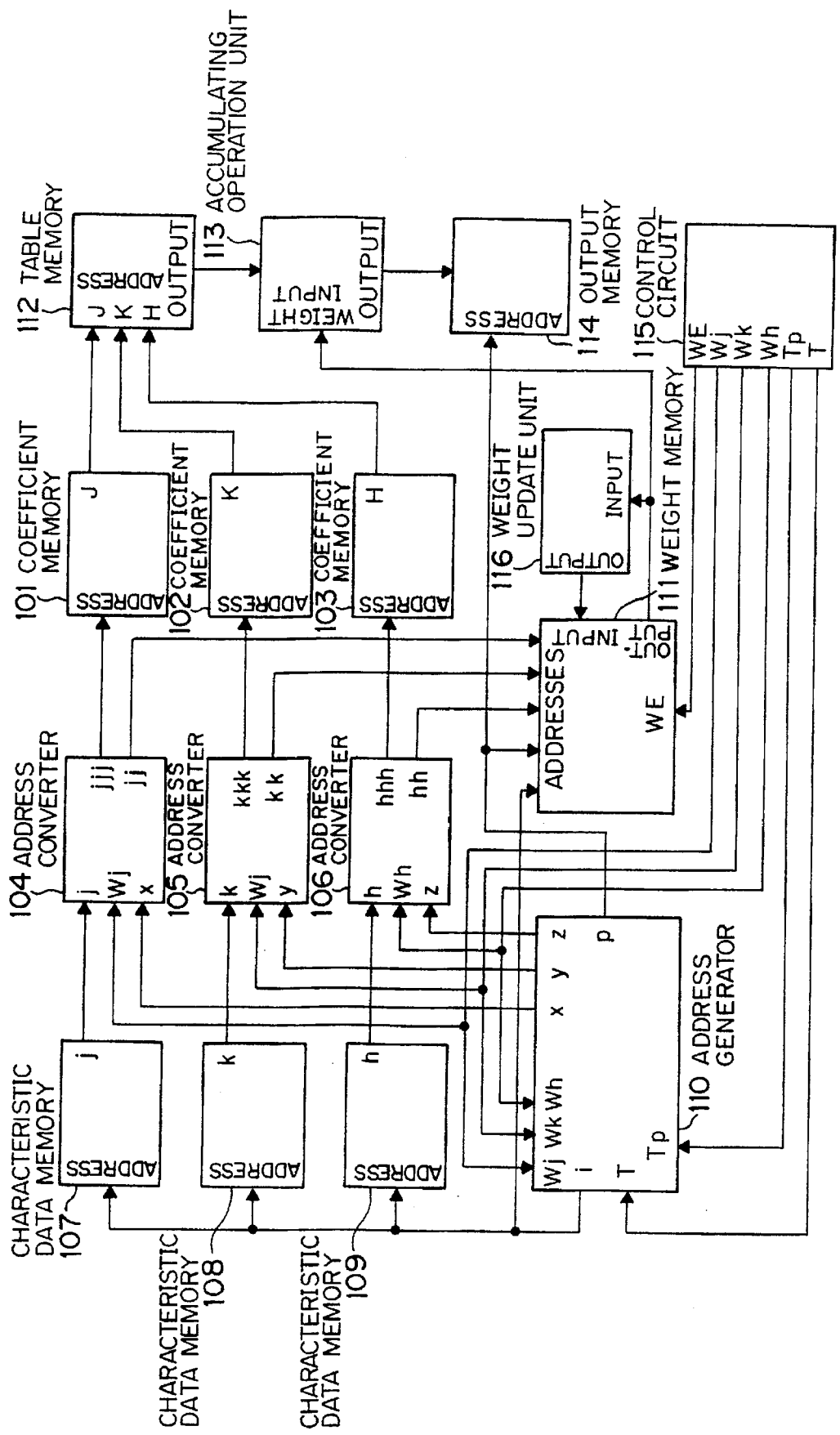
FIG. 7 is a diagram showing the organization of a neural network circuit of a third embodiment of the invention having recognition and learning abilities.

FIG. 7 shows a third embodiment of the invention. The third embodiment is directed to a circuit that recognizes characteristic data fed to the characteristic data memories 107, 108 and 109 while at the same time learning the data, and, more particularly it pertains to a circuit that updates the weight value of the last layer with the characteristic data and performs network arithmetical operations. The learning of the quantized neuron network is done in such a way that, during the supervisor input (that is, the input of a learning neuron of a specified output layer), the weight of the input having other input data values other than 0 is updated to make it heavier. In other words, when the fourth layer has other values other than 0 (or, the third layer outputs other values other than 0), the learning is done by making the weight of a synapse of a learning neuron of the output layer heavier. For example, the update of weight is carried out by adding 1 to the original weight, according to which the learning of the characteristic data input is carried out.

Elements common to those of FIG. 4 are assigned the same reference numerals.

As seen from FIG. 7, a weight update unit 116 is further included. The weight update unit 116 is supplied with weight data from a weight memory 111, and adds 1 to the weight data to update it. Then the weight data thus updated is supplied to the weight memory 111. A control circuit 115 sends out to the weight memory 111 the write control signal WE requiring the write of the updated data output from the weight update unit 116. In addition, the control circuit 115 outputs the learning control signal T (instruction signal) for the learning control of the weight data and the neuron number Tp of the learning neuron of the last layer.

Figure 8:
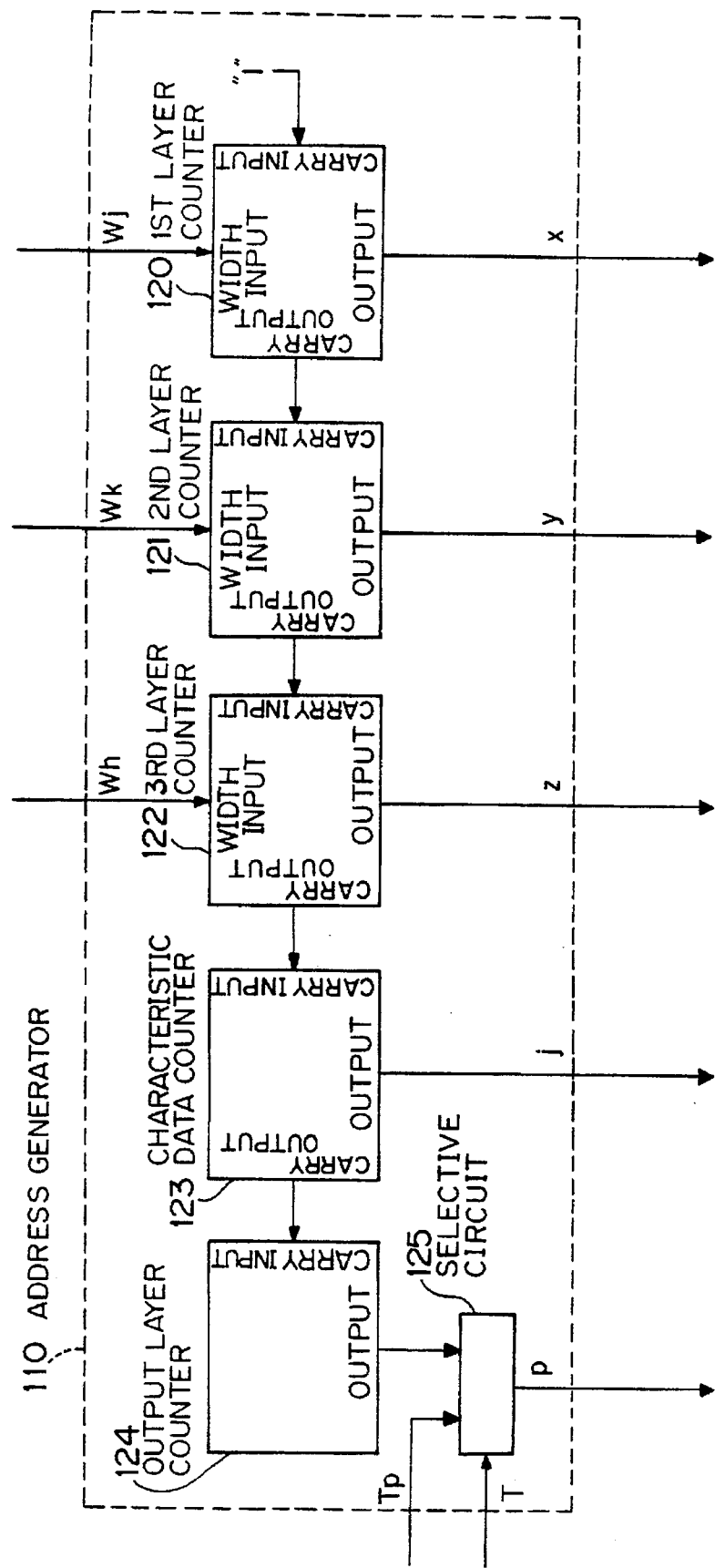
FIG. 8 is a diagram showing the organization of an address generator of the third embodiment.

An address generator 110 of FIG. 8 has the counters 120, 121, 122, 123 and 124, and further includes a selective circuits 125. The selective circuit 125 selects the neuron number Tp during the learning period (that is, when the learning control signal T is provided from the control circuit 115). On the other hand, during the recognition process (when no learning control signals T are provided), the output of the output layer counter 124 is selected.

Apart from the above, this embodiment has the same structure as the second embodiment. The characteristic data memories 107, 108 and 109 hold the data to be supplied to the quantization signal input terminals S of the quantized neurons of the first, second and third layers. The coefficient memories 101, 102 and 103 hold the coupling coefficients of the quantized neurons of the first, second and third layers. The table memory 112 is supplied with the outputs of the coefficient memories 101, 102 and 103, and outputs a product obtained by multiplying the outputs one another. The weight memory 111 holds the weights of the neurons of the last layer. The cumulative operation unit 113 is supplied with the output of the table memory 112 (i.e., the total coupling coefficient) and with the weight output from the weight memory 111. Then cumulative operation unit 113 performs cumulative additions of the product obtained by multiplying the above two outputs from the table memory 112 and the weight memory 111. The control circuit 115 sends to the address generator 110 and the address converters 104, 105 and 106 the data counts Wj, Wk and Wh (the numbers of data having other values other than zero of the coupling coefficients of the first, second and third layers). The address converters 104, 105 and 106 receive the data from the address generator 110 and from the corresponding characteristic data memories 107, 108 and 109, and convert the data into the addresses of the coefficient memories 101 to 103 and the weight memory 111.

As shown in FIG. 8, the first to third layer counters 120, 121 and 122 of the address generator 110 count from 0 upward to (the width input value−1) when the carry input is 1. The characteristic data counter 123 counts the number of times corresponding to the number of characteristic data. The output layer counter 124 counts the number of times corresponding to the number of output neurons.

The operations of the third embodiment of the invention are described below.

First, the recognition of the characteristic data is described. The same operations as the second embodiment are performed. The characteristic data of an image to be recognized are written into the characteristic data memories 107, 108 and 109 of the layers.

The characteristic data j, k and h of the layers are read out from the characteristic data memories 107, 108 and 109 respectively by the output t of the characteristic data counter 123 of the address generator 110.

The address converter 104 is supplied with the characteristic data j of the first layer, the output x of the first layer counter 120 of the address generator 110 and the data count Wj (the number of data having other values other than zero of the coupling coefficient of the first layer). The address convertor 104 converts the above outputs into the address of the coefficient memory 101 holding the coupling coefficients of the quantized neurons of the first layer and into one of the addresses of the weight memory 111 storing the weights of the neurons of the last layer.

The output jjj to the address of the coefficient memory 101 is given by Formula (4). The output jj to the address of the weight memory 111 is given by Formula (5). If the number of outputs of a quantized neuron is eight and the quantization signal input terminal S has eight input levels from 0 to 7, the variable of the output of the quantized neuron ranges between 0 and 7. Three low-order bits of the results of the jjj and jj are output.

The address converter 105 calculates the address of the coefficient memory 102 holding the coupling coefficients of the quantized neurons of the second layer, and the address of the weight memory 111 storing the weights of the neurons of the last layer, and outputs the results. The address converter 106 calculates the address of the coefficient memory 103 holding the coupling coefficients of the quantized neurons of the third layer, and the address of the weight memory 111, and outputs the results.

The weight memory 111, which holds the weights of the neurons of the last layer of the quantized neuron network, is supplied with the jj, kk and hh of the address converters 104, 105 and 106, the i of the characteristic data counter 123 of the address generator 110 and the p of the output layer counter 124 selected by the selective circuit 125 of the address generator 110. Then the weight memory 111 outputs the weight data of the neuron of the last layer corresponding to the output data (i.e., the output of the quantized neuron of the third layer).

The cumulative operation unit 113 multiplies the output of the table memory 112 by the output of the weight memory 111, and accumulates the resulting products.

The foregoing operations are carried out as the address generator 110 counts upward. When the output of the output layer counter 124 of the address generator 110 varies, the value of the cumulative operation unit 113 is written to at the corresponding address of the output memory 114. The value of the cumulative operation unit 113 goes to 0.

When the address generator 110 finishes counting, the arithmetical operations of recognition are completed as well. The solution outputs of the quantized neuron network are obtained at the output memory 114.

As described above, the same operations as the second embodiment are performed.

The learning of the weight data stored in the weight memory 111 is described.

The characteristic data j, k and h to be fed to the layers are read out from the characteristic data memories 107, 108 and 109 by the output i of the characteristic data counter 123 of the address generator 110. The address converter 104 is supplied with the characteristic data j of the first layer, the output x of the first layer counter 120 of the address generator 110 and the data count Wj (the number of data having other values other than zero of the coupling coefficient of the first layer), and calculates one of the addresses of the weight memory 111 which holds the weights of the neurons of the last layer by the same formula as used in the recognition processing. The output jj to the address of the weight memory 111 is found by Formula (5) of the second embodiment. Similarly, the address converters 105 and 106 calculate the addresses kk and hh of the weight memory 111 and outputs them.

As it is now in the learning mode, the learning control signal T and the signal of the neuron number Tp of the learning neuron of the last layer are output from the control circuit 115. The selective circuit 125 of the address generator 110 selects the neuron number Tp output from the control circuit 115.

The weight memory 111, which holds the weights of the neurons of the last layer of the quantized neuron network, is supplied with the address inputs jj, kk and hh from the address converters 104, 105 and 106, the output i of the characteristic data counter 123 of the address generator 110, and the output value p which is the learning neuron number Tp from the control circuit 115 selected by the selective circuit 125 of the address generator 110. Then the weight memory 111 outputs to the weight update unit 116 the data (i.e., the weight data stored at the corresponding addresses to the above inputs) having other values other than 0 of the outputs of the quantized neurons of the last layer.

The weight data fed from the weight memory 111 is added by 1 by the weight update unit 116, and the resulting value is supplied to the weight memory 111, as the update data. The weight memory 111 writes, with the help of the write signal WE from the control circuit 115, the update data fed from the weight update unit 116 to at the same address as one from which the weight data is read out to the weight update unit 116. As a result, the weight data is updated. The foregoing operations are carried out as the address generator 110 counts upward. Upon the completion of the counts of the first layer counter 120 to the characteristic data counter 123 of the address generator 110, the learning is finished. As a result, all of the weights of the inputs having other input data values other than 0 of the learning neurons of the output layer are made heavier.

FOURTH EMBODIMENT

Figure 9:
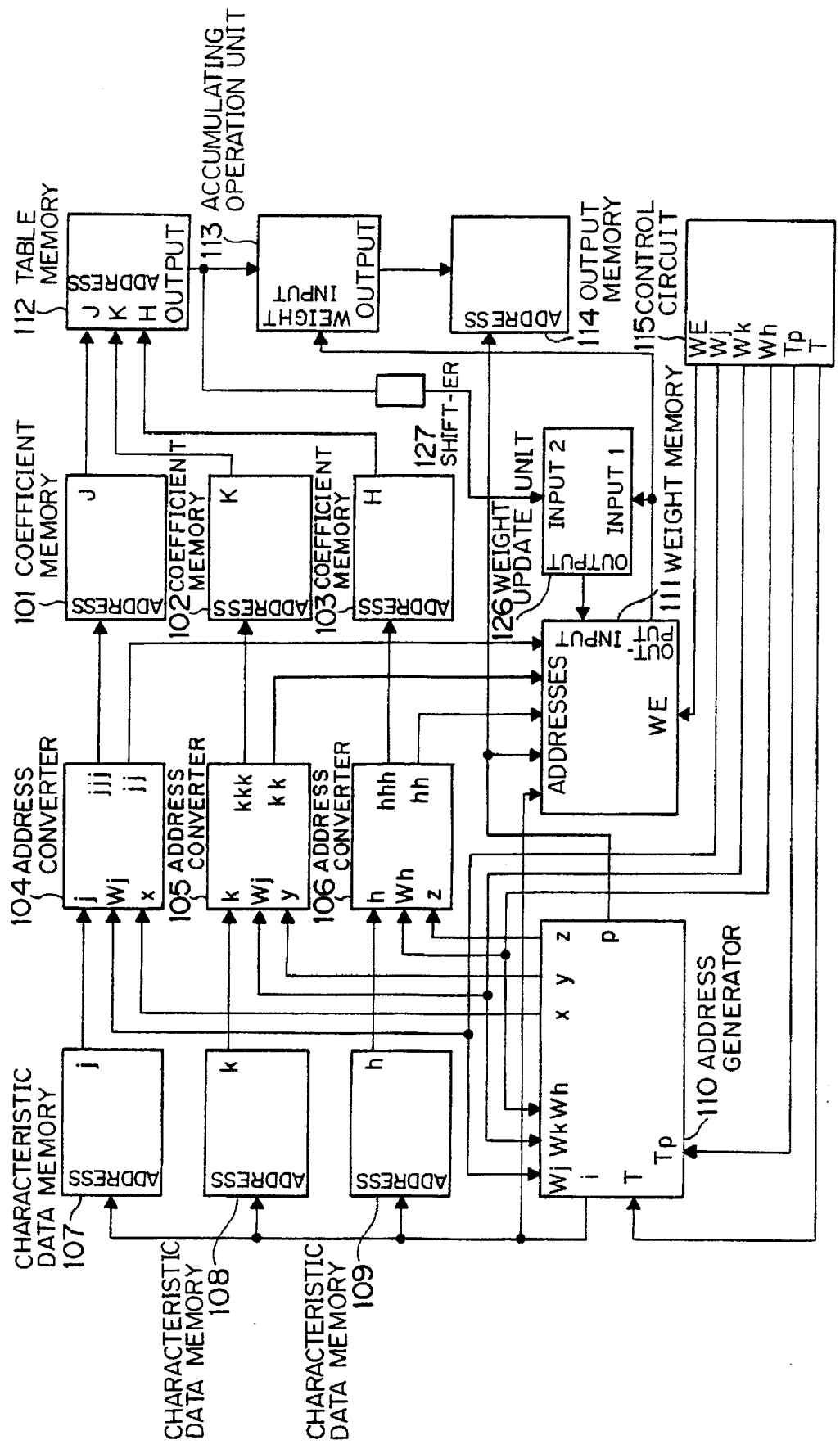
FIG. 9 is a diagram showing the organization of a neural network circuit of a fourth embodiment of the invention having recognition and learning abilities.

FIG. 9 shows a fourth embodiment of the invention. Like the foregoing embodiment of FIG. 7, the fourth embodiment is a circuit which has the learning and recognizing capabilities of characteristic data. However, the weight value of the last layer is modified in a different way. In other words, the weight value is modified according to the output size of the quantized neuron of the third layer, that is, the weight value is modified much heavier for a network that has shown a strong reaction, whereas the weight value is modified less heavier for another network that has not shown a noticeable reaction.

The embodiment of FIG. 9 further includes a shifter 127 in addition to a weight update unit 126. The shifter 127 is supplied with the output of the quantized neuron of the third layer (that is, the output of the table memory 112, or the amount of fire of the quantized neuron network of the third layer).

Based on the output of the table memory 112, the shifter 127 calculates the amount of weight update. For example, the value of the table memory 112 is 8 bits (00 to FF) (hexadecimal notation), the value of the weight memory 111 also is 8 bits, and the shifter 127 is a 4-bits-to-the-right shifter. The value of the table memory 112 is shifted four bits to the right (for example, if the value of the table memory 112 is a maximum value FF, it is right-shifted four bits to become 0F) so that the amount of weight update produced by the shifter 127 is made lower than the weight value of the weight memory 111.

Figure 10:
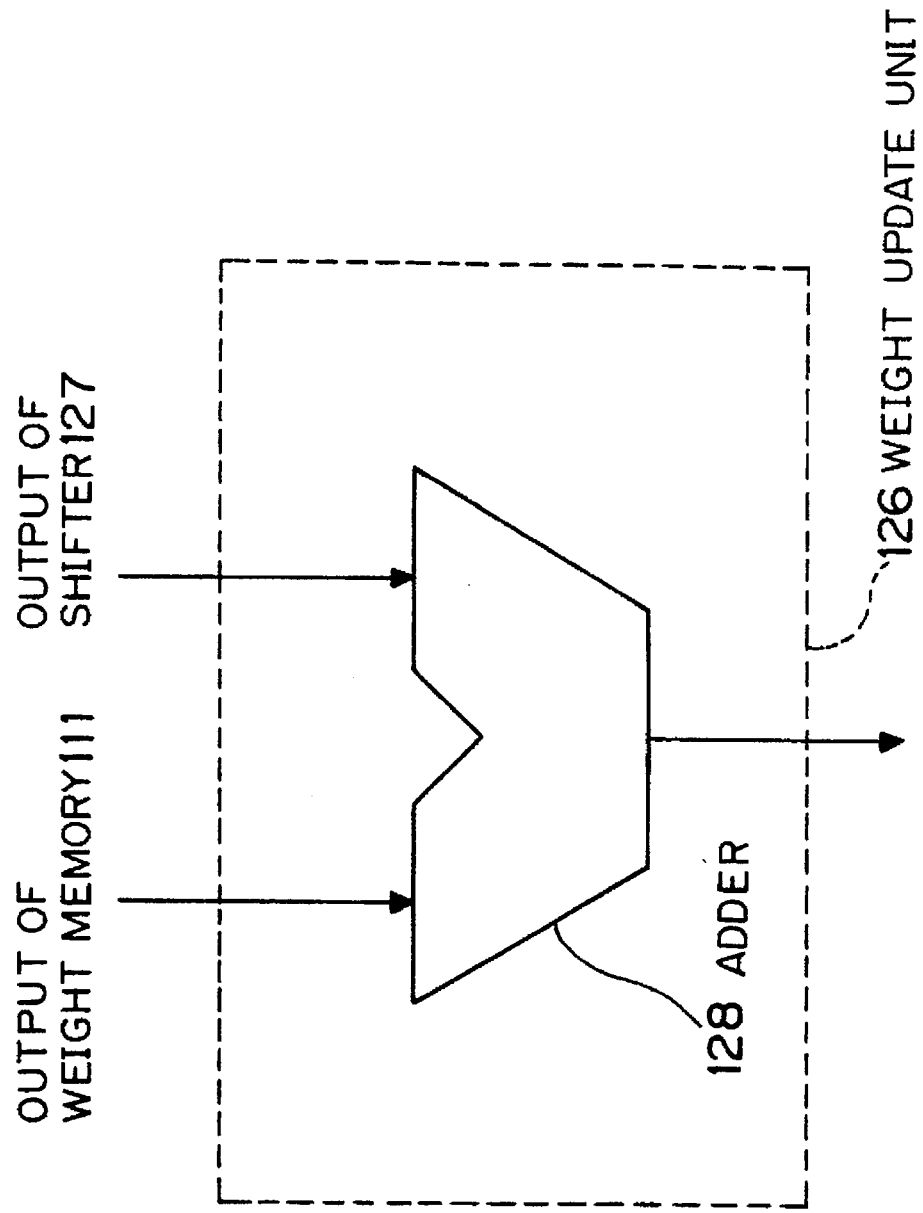
FIG. 10 is a diagram showing the organization of a weight update unit of the fourth embodiment.

The amount of weight update of the shifter 127 is supplied to the weight update unit 126. As shown in FIG. 10, the weight update unit 126 is realized by means of an adder 128 that performs an addition of the weight data output from the weight memory 111 and the amount of weight update output from the shifter 127 thereby calculating the weight update value. The amount of weight update output from the adder 128 is output to the weight memory 111.

Other elements other than the elements described above are the same as the third embodiment. As in the third embodiment, the characteristic data memories 107, 108 and 109 retain the data being supplied to the quantization signal input terminals S of the quantized neurons of the first, second and third layers. The coefficient memories 101, 102 and 103 hold the coupling coefficients of the quantized neurons of the first to third layers. The table memory 112 is supplied with the outputs of the coefficient memories 101, 102 and 103, and outputs the values obtained by multiplying the outputs one another. The weight memory 111 holds the weights of the neurons of the last layer of the quantized neuron network. The cumulative operation unit 113 is supplied with the output of the table memory 112 and with the output of the weight memory 111, and carries out cumulative additions of the product of the total coupling coefficient times the weight. The control circuit 115 sends out the write control signal WE, the learning control signal T together with the neuron number Tp of the learning neuron of the last layer, and the data counts Wj, Wk and Wh (the numbers of data having other values other than zero of the coupling coefficients of the first, second and third layers) to the weight memory 111, to the address generator 110, and to the address generator 110 and the address converters 104, 105 and 106, respectively. The address converters 104, 105 and 106 receive the data from the address generator 110 as well as from the corresponding the characteristic data memories 107, 108 and 109 thereby converting the data received into the addresses of the coefficient memories 101, 102 and 103 as well as Into one of the addresses of the weight memory 111.

The operations of the fourth embodiment of the invention are described below.

In the first place, the recognition of the characteristic data is described. The same operations as the second embodiment are performed. The characteristic data of an image to be recognized are written into the characteristic data memories 107, 108 and 109 of the layers.

The characteristic data j, k and h of the layers are read out from the characteristic data memories 107, 108 and 109 respectively by the output i of the characteristic data counter 123 of the address generator 110.

The address converter 104 is supplied with the characteristic data j of the first layer, the output x of the first layer counter 120 of the address generator 110 and the data count Wj (the number of data having other values other than zero of the coupling coefficient of the first layer). The address convertor 104 calculates these inputs and converts them into the address of the coefficient memory 101 holding the coupling coefficients of the quantized neurons of the first layer as well as into one of the addresses of the weight memory 111 storing the weights of the neurons of the last layer.

The output jjj supplied to the address of the coefficient memory 101 is given by Formula (4), while the output jj supplied to the address of the weight memory 111 is given by Formula (5). If the number of outputs of a quantized neuron is eight and the quantization signal input terminal S has eight input levels from 0 to 7, the variable of the output of the quantized neuron ranges between 0 and 7. Three low-order bits of the results of the jjj and jj are output.

The address converter 105 calculates the address of the coefficient memory 102 holding the coupling coefficients of the quantized neurons of the second layer, and the address of the weight memory 111 storing the weights of the neurons of the last layer, and outputs the addresses calculated. The address converter 106 calculates the address of the coefficient memory 103, and the address of the weight memory 111 and output the addresses calculated.

The weight memory 111, which holds the weights of the neurons of the last layer of the quantized neuron network. Is supplied with the jj, kk and hh output from the address converters 104, 105 and 106, the i output from the characteristic data counter 123 of the address generator 110 and the p output from the output layer counter 124 selected by the selective circuit 125 of the address generator 110. Then the weight memory 111 outputs the weight data of the neuron of the last layer corresponding to the output data (i.e., the output of the quantized neuron of the third layer).

The cumulative operation unit 113 multiplies the output of the table memory 112 by the output of the weight memory 111 and accumulates the resulting products.

The foregoing operations are carried out as the address generator 110 counts upward. When the output of the output layer counter 124 of the address generator 110 varies, the value of the cumulative operation unit 113 is written to at the address of the output memory 114. The value of the cumulative operation unit 113 returns to zero.

When the address generator 110 finishes counting, the arithmetical operations of recognition are completed as well. The solution outputs of the quantized neuron network are obtained at the output memory 114.

As described above, the same operations as the second embodiment are performed.

The learning of the weight data stored in the weight memory 111 is described.

The characteristic data j, k and h to be fed to the layers are read out from the characteristic data memories 107, 108 and 109 by the output i of the characteristic data counter 123 of the address generator 110. The address converter 104 is supplied with the characteristic data j of the first layer, the output x of the first layer counter 120 of the address generator 110 and the data count Wj (the number of data having other values other than zero of the coupling coefficients of the first layer). Then the address convertor 104 calculates one of the addresses of the weight memory 111 which holds the weights of the neurons of the last layer by the same formula as used in the recognition processing. The output jj to the address of the weight memory 111 is found by Formula (5) of the second embodiment. Similarly, the address converters 105 and 106 calculate the addresses kk and hh respectively and output them.

As it is now in the learning mode, the learning control signal T and the signal of the neuron number Tp of the learning neuron of the last layer are sent out from the control circuit 115. The selective circuit 125 of the address generator 110 selects the neuron number Tp.

The weight memory 111, which holds the weights of the neurons of the last layer of the quantized neuron network, is supplied with the address inputs jj, kk and hh from the address converters 104, 105 and 106, the output i of the characteristic data counter 123 of the address generator 110, and the output value p which represents the learning neuron number Tp of the control circuit 115 selected by the selective circuit 125 of the address generator 110. Then the weight memory 111 outputs, to the weight update unit 116, the data (i.e., the weight data stored at the corresponding addresses to the above inputs) having other values other than zero of the outputs of the quantized neurons of the last layer.

On the other hand, in the shifter 127, the amount of weight update of the value corresponding to the output value of the table memory 112 is calculated. The weight update unit 126 carries out an addition of the weight data supplied from the weight memory 111 plus the amount of weight update supplied from the shifter 127, and outputs the result (i.e., the weight update value) to the weight memory 111. The weight memory 111 receives from the control circuit 115 the write signal WE, thereby writing the weight update value to at the same address from which the data to the weight update unit 126 is read out. Accordingly, the weight of a network having neurons with a great amount of fire (i.e., neurons show a strong reaction) is made much heavier, while the weight of another network having neurons with a small amount of fire (i.e., neurons show a weak reaction) are made less heavier. Since the "modification concentration" of the weight will vary depending upon the size of the operation results which represents the strength of reaction of the network, early learning effects can be obtained.

The foregoing operations are carried out as the address generator 110 counts upward. Upon the completion of the counts of the first layer counter 120 to the characteristic data counter 123 of the address generator 110, the learning of weight is done. As a result, all of the weights of the inputs having other input data values other than zero of the learning neurons of the output layer are modified.

Fifth Embodiment

Figure 11:
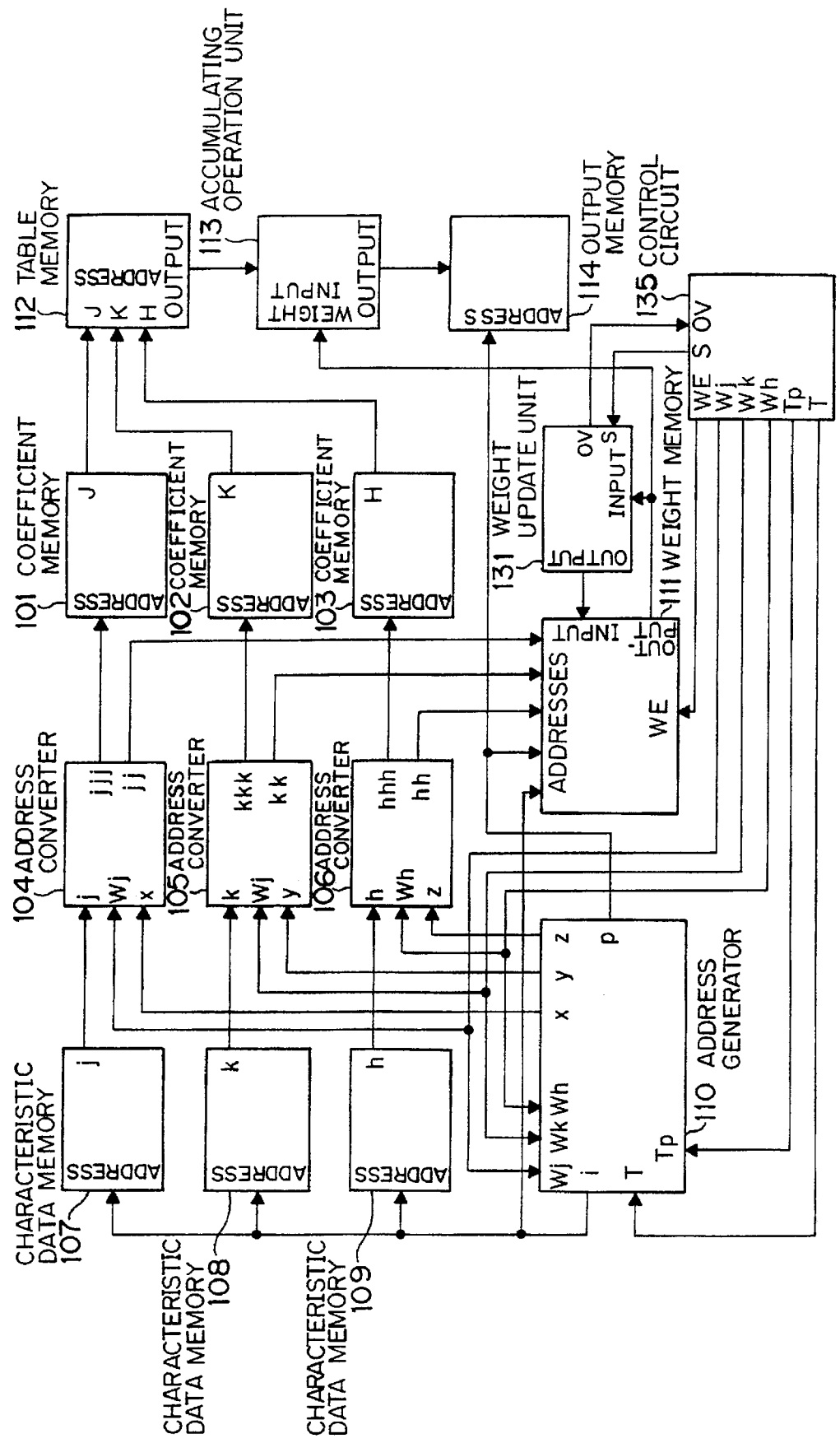
FIG. 11 is a diagram showing the organization of a neural network circuit of a fifth embodiment of the invention having recognition and learning abilities.

FIG. 11 shows a fifth embodiment of the present invention. The fifth embodiment as shown in FIG. 11 pertains to a circuit which learns and recognizes characteristic data and updates the value of weight of the last layer. Additionally, the circuit in accordance with this embodiment is designed to allow for possible overflow due to the fact that the weight value is made excessively heavy.

Figure 12:
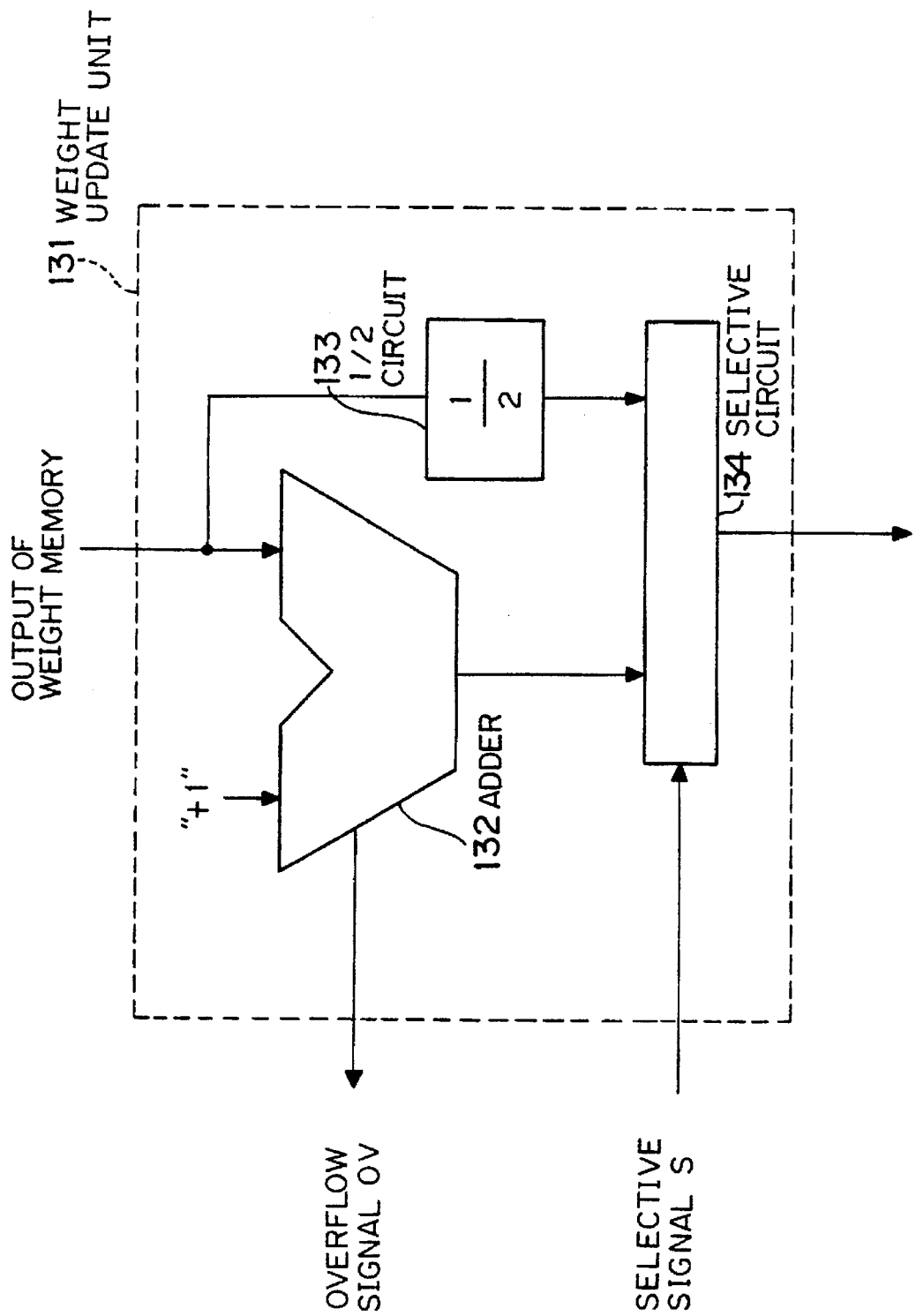
FIG. 12 is a diagram showing the organization of a weight update unit in accordance with the fifth embodiment.

As shown in FIGS. 11 and 12, a weight update unit 131 includes an adder 132 by means of which the weight data of the weight memory 111 Is added by 1, and a ½ circuit 133 by means of which the weight data of the weight memory 111 is reduced by half. The adder 132 outputs the overflow signal OV to a control circuit 135 when the addition of 1 to the weight data causes the resultant weight update value to overflow (for example, supposing that the data width of the weight memory 111 is 8 bits, such overflow may occur when the addition of 1 to FF (hexadecimal notation) becomes 00 although it should become 100 (hexadecimal notation)).

The control circuit 135 outputs no write signals WE if the adder 132 of the weight update unit 131 sends out the overflow signal 0 V. The control circuit 135 further outputs the selective signal S to the weight update unit 131, modifying all of the weights of the inputs of the learning neurons of the output layer as the learning advances. Thereafter, the control circuit 135 changes the contents of the selective signal S, that is, from the contents to select the output of the adder 132 to the contents to select the output of the ½ circuit 133. In addition, the circuit 135 is provided with a function to reset the data counts WJ, Wk and Wh (that is, the numbers of data having other values other than zero of the coupling coefficients of the first to third layers) to be supplied to the address generator 110, to their maximum values, for example, 8 in this embodiment.

The weight update unit 131 is provided with a selective circuit 134, as shown in FIG. 12. Based on the contents of the selective signal S output from the control circuit 135, the selective circuit 134 selects either the output of the adder 132 or the output of the ½ circuit 133.

Other elements other than the elements described above are the same as the third embodiments. As in the third embodiment, the characteristic data memories 107, 108 and 109 hold the data being supplied to the quantization signal input terminals S of the quantized neurons of the first, second and third layers. The coefficient memories 101, 102 and 103 hold the coupling coefficients of the quantized neurons of the first to third layers. The table memory 112 is supplied with the outputs of the coefficient memories 101, 102 and 103, and outputs the product obtained by multiplying the outputs one another. The weight memory 111 holds the weights of the neurons of the last layer of the quantized neuron network. The cumulative operation unit 113 is supplied with the output of the table memory 112 and the output of the weight memory 111, and carries out cumulative additions of the product obtained by multiplying the total coupling coefficient by the weight. The control circuit 135 outputs the write control signal WE, the learning control signal T together with the neuron number Tp of the learning neuron of the last layer, and the data counts Wj, Wk and Wh, to the weight memory 111, to the address generator 110, and to the address converters 104, 105 and 106, respectively. The address converters 104, 105 and 106 receive the data from the address generator 110 as well as from the corresponding the characteristic data memories 107, 108 and 109 thereby converting these data received into the addresses of the coefficient memories 101, 102 and 103 as well as into one of the addresses of the weight memory 111.

The operations of the fifth embodiment of the invention are described below.

First, the recognition of the characteristic data is described. The same operations as the second embodiment are performed. The characteristic data of an image to be recognized are written into the characteristic data memories 107, 108 and 109 of the layers.

The characteristic data j, k and h of the layers are read out from the characteristic data memories 107, 108 and 109 respectively by the output i of the characteristic data counter 123 of the address generator 110.

The address converter 104 is supplied with the characteristic data j of the first layer, the output x of the first layer counter 120 of the address generator 110 and the data count Wj. The address convertor 104 calculates the address of the coefficient memory 101 holding the coupling coefficients of the quantized neurons of the first layer, and one of the addresses of the weight memory 111 storing the weights of the neurons of the last layer.

The output jjj to the address of the coefficient memory 101 is given by Formula (4). The output jj to the address of the weight memory 111 is given by Formula (5). If the number of outputs of a quantized neuron is eight and the quantization signal input terminal S has eight input levels from 0 to 7, the variable of the output of the quantized neuron ranges between 0 and 7. Three low-order bits of the results of the jjj and jj are output.

The address converter 105 calculates the address of the coefficient memory 102 holding the coupling coefficients of the quantized neurons of the second layer,and one of the addresses of the weight memory 111 storing the weights of the neurons of the last layer and outputs the addresses calculated. The address converter 106, on the other hand, calculates the address of the coefficient memory 103, and one of the addresses of the weight memory 111 and outputs the addresses calculated.

The weight memory 111, which holds the weights of the neurons of the last layer of the quantized neuron network, is supplied with the jj, kk and hh output from the address converters 104, 105 and 106, the i output from the characteristic data counter 123 of the address generator 110 and the p output from the output layer counter 124 selected by the selective circuit 125 of the address generator 110. Then the weight memory 111 outputs the weight data of the neuron of the last layer corresponding to the output data (i.e., the output of the quantized neuron of the third layer).

The cumulative operation unit 113 multiplies the output of the table memory 112 by the output of the weight memory 111 and accumulates the results.

The foregoing operations are carried out as the address generator 110 counts upward. When the output of the output layer counter 124 of the address generator 110 varies, the value of the cumulative operation unit 113 is written to at the responding address of the output memory 114. The value of the cumulative operation unit 113 returns to zero.

When the address generator 110 finishes counting, the arithmetical operations of recognition are completed as well. The output memory 114 is supplied with the solution outputs of the quantized neuron network.

As described above, the same operations as the second embodiment are performed.

Next, the learning of the weight data stored in the weight memory 111 is described.

The characteristic data j, k and h to be fed to the respective layers are read out from the characteristic data memories 107, 108 and 109 by the output i of the characteristic data counter 123 of the address generator 110. The address converter 104 is supplied with the characteristic data j of the first layer, the output x of the first layer counter 120 of the address generator 110 and the data count Wj. Then the address convertor 104 calculates one of the addresses of the weight memory 111 which holds the weights of the neurons of the last layer by the same formula as used in the recognition processing, Formula (4). The output jj to the address of the weight memory 111 is found by Formula (5). Similarly, the address converters 105 and 106 calculate the addresses kk and hh and output them.

As it is now in the learning mode, the learning control signal T and the neuron number Tp of the learning neuron of the last layer are output from the control circuit 135. The selective circuit 134 of the address generator 110 selects the neuron number Tp of the learning neuron from the control circuit 135.

The weight memory 111, which holds the weights of the neurons of the last layer of the quantized neuron network, is supplied with the address inputs jj, kk and hh from the address converters 104, 105 and 106 and the output i of the characteristic data counter 123 of the address generator 110.

Figure 13:
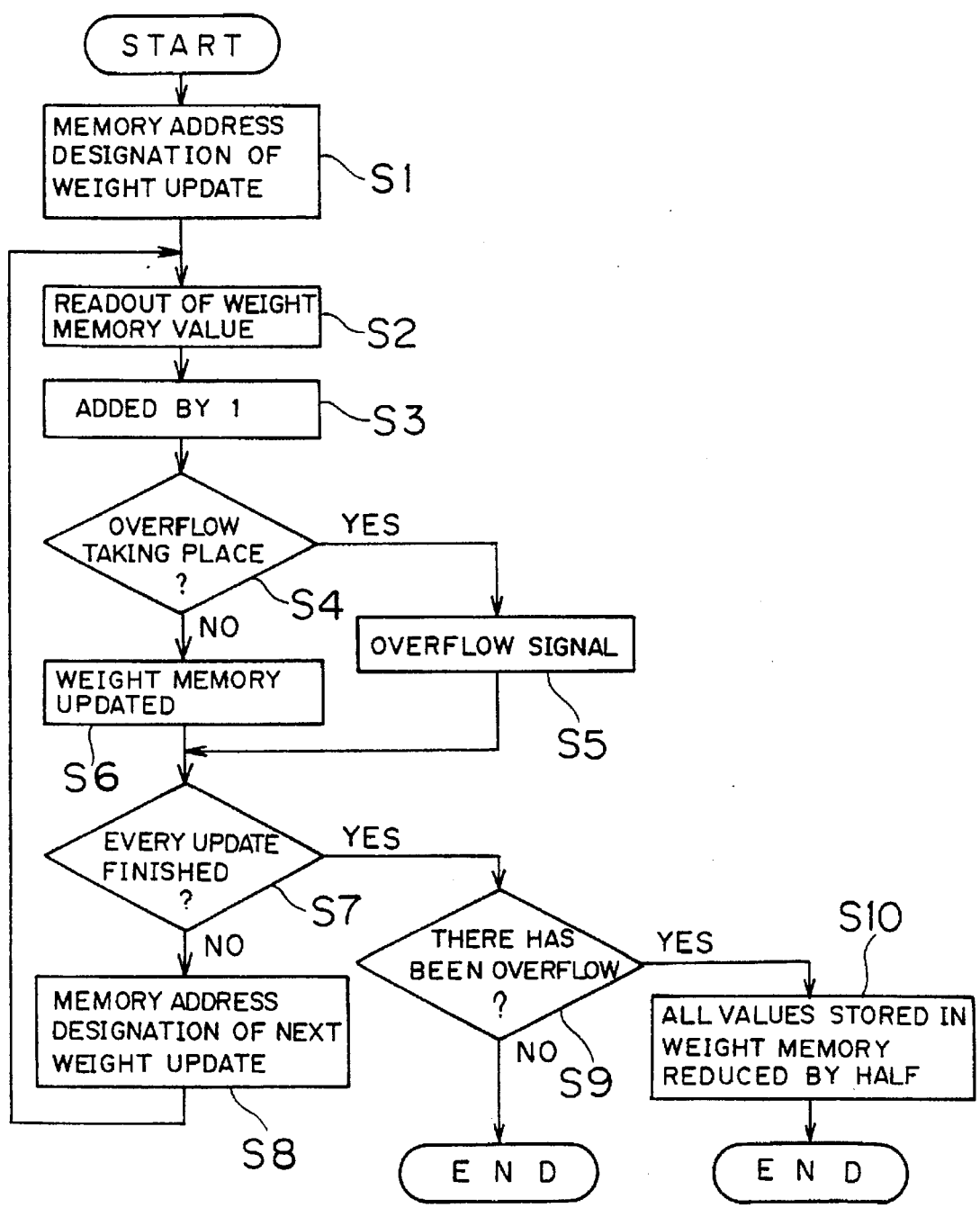
FIG. 13 is a flow chart showing the order of weight update in the fifth embodiment.

The weight memory 111 is supplied with the value p of the output of the learning neuron number Tp from the control circuit 135 selected by the selective circuit 134 of the address generator 110, so that the addresses to be updated are designated among from all addresses at which the weight data of the outputs of the quantized neurons of the third layer having other values other than zero are stored. Then the weight data at the address thus designated is read out and supplied to the weight update unit 131 (Steps 1 and 2 of the flow chart of FIG. 13).

In the weight update unit 131, the selective circuit 134 selects the output of the adder 132 on the basis of the contents of the selective signal S from the control circuit 135. The adder 132 of the weight update unit 131 adds 1 to the weight data fed from the weight update unit 131 (Step 3). At Step 4, a check for the presence of overflow of the updated weight data is carried out. If overflow is taking place, the adder 132 sends out the overflow signal OV to the control circuit 135 (Step 5). The control circuit 135 outputs no write signals WE to the weight memory 111 when the overflow occurs. During the overflow, the weight data, having the same address from which the data to the weight update unit 131 is read, is not updated. On the other hand, when there is no overflow, the selective circuit 134 feeds the weight data added by 1 to the weight memory 111. Receiving the write signal WE from the control circuit 135, the weight memory 111 writes the update result of the weight data to at the same address through which the data is read out from the weight update unit 131 (see Step 6). Thus, the weight data is updated. At Step 7, the check for whether every weight data update is completed or not is carried out. If there remain other weight data to be updated (that is, the counts of the first layer counter 120 to the characteristic data counter 123 have not been finished when the above operations are carried out by the count-up of the address generator 110), the addresses to be updated next are designated from among the addresses of the weight memory 111 (Step 8). The procedure starts again with Step 2.

When the learning of the weight data advances and is completed, the weights of the inputs having other input data values other than zero of the learning neurons of the output layer are all modified. At this time, if no overflow signals OV have been output, the procedure is over (see Step 9). However, in the event that the overflow signal OV have been output, the contents of the selective signal S from the control circuit 135 are changed. As a result, the selective circuit 134 of the weight update unit 131 selects the output of the ½ circuit 113, and the data counts Wj, Wk and Wh to be supplied from the control circuit 135 to the address generator 110 are reset to the maximum value, 8 respectively. Accordingly, by counting upward the address generator 110 to access every address of the weight memory 111, the weight values of the addresses accessed are all rewritten and reduced at the same rate (i.e., are reduced by half) in the ½ circuit 133 (Step 10). At the time that the rewriting of all weight values is finished, the contents of the selective signal S are changed, allowing the selective circuit 134 to select the output of the adder 132 again. Then the selective circuit 134 returns to its normal state.

With the above arrangements, the learning of the characteristic data is effectively performed by limited hardware.

Sixth Embodiment

Figure 14:
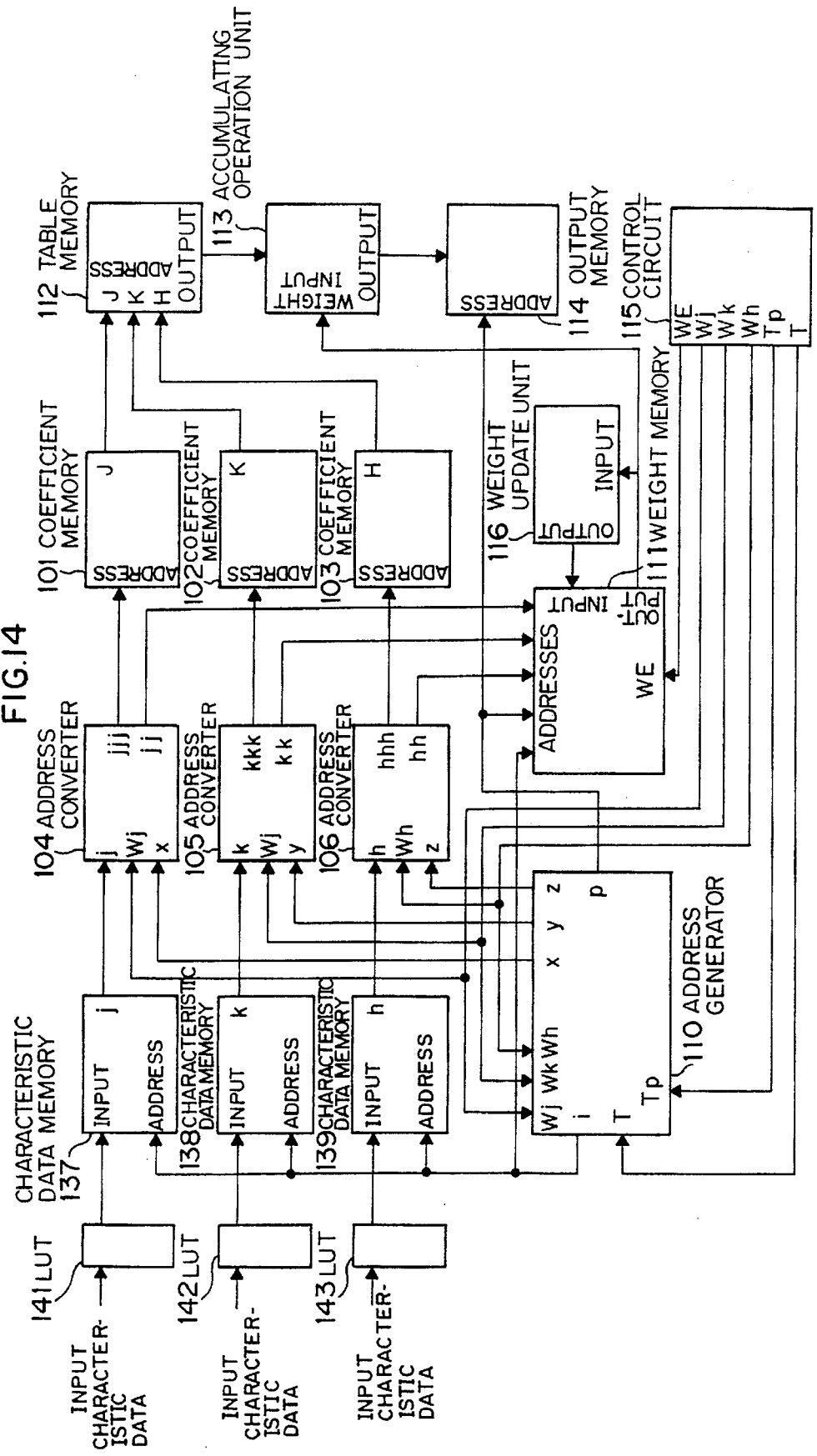
FIG. 14 is a diagram showing the organization of a neural network circuit of a sixth embodiment of the invention having recognition and learning abilities.

FIG. 14 shows a sixth embodiment of the invention. To obtain a high rate of recognition between images that are monotonous in tone and poor in distinction, the characteristic data are converted to expand the difference between the characteristic data. After the expansion, the characteristic data converted are supplied to the characteristic data memories 137, 138 and 139. The update of the weight values of the last layer is carried out with the characteristic data, and the characteristic data are recognized by performing network operations. The corresponding elements to those of FIG. 4 are given the same reference numerals.

This embodiment further includes look-up tables 141, 142 and 143. Based on its contents, each look-up table, taking the characteristic data as an address, performs the non-linear conversion (such as exponential expansion and logarithm expansion) of the characteristic data. The characteristic data converted are fed to the characteristic data memories 137, 138 and 139.

Other elements other than the elements described above are the same as the third embodiments. As in the third embodiment, the characteristic data memories 137, 138 and 139 hold the data being supplied to the quantization signal input terminals S of the quantized neurons of the first, second and third layers. The coefficient memories 101, 102 and 103 hold the coupling coefficients of the quantized neurons of the first to third layers. The table memory 112 is supplied with the outputs of the coefficient memories 101, 102 and 103, and outputs the values obtained by multiplying the outputs one another. The weight memory 111 holds the weights of the neurons of the last layer of the quantized neuron network. The cumulative operation unit 113 is supplied with the output of the table memory 112 and the output of the weight memory 111, and carries out cumulative additions of the multiplication results of the total coupling coefficient times the weight.

The weight update unit 116 is supplied with the weight data output from the weight memory 111. Then the weight update unit 116 adds 1 to the weight data input so as to calculate the update data that is fed back to the weight memory 111. The control circuit 115 outputs the write control signal WE, the learning control signal T together with the neuron number Tp of the learning neuron of the last layer, and the data counts Wj, Wk and Wh (the numbers of data having other values other than zero of the coupling coefficients of the quantized neurons of the first to third layers), to the weight memory 111, to the address generator 110, and to the address generator 110 and the address converters 104, 105 and 106, respectively. The address converters 104, 105 and 106 receive the data from the address generator 110 as well as from the corresponding characteristic data memories 107, 108 and 109, and converts the data received into the addresses of the coefficient memories 101, 102 and 103 as well as into one of the addresses of the weight memory 111. As shown in FIG. 8, the address generator 110 comprises five counters and a selective circuit. If the value of the carry input is 1, the first to third layer counters 120, 121 and 122 count from 0 upward to (the value of the width input−1). For example, if the value of the width input is 3, the counters 120, 121 and 122 count from 0 to characteristic data counter 123 is a counter which counts the number (corresponding to the number of characteristic data) of times. The output layer counter 124 is a counter which counts the number (corresponding to the number of output neurons) of times. The selective circuit 125 selects either the neuron number Tp of the learning neuron of the last layer output from the control circuit 115 or the output of the output layer counter 124, with the learning control signal T. As the selective circuit 125 receives the learning control signal T (that is, during the learning period), it selects the neuron number Tp, whereas the output of the output layer counter 124 is selected when no learning control signals T are received (that is, during the recognition period).

The operations of the sixth embodiment of the present invention are described below.

In the first place, each layer is supplied with characteristic data. Based on the contents of each of the look-up tables 141, 142 and 143, the characteristic data undergo non-linear conversion such as exponential expansion and logarithm expansion. The characteristic data converted are held in the characteristic data memories 137, 138 and 139.

The way of recognizing the characteristic data which is being held in the characteristic data memories is described below. In this data recognition, the same operations as the second embodiment are carried out. The characteristic data of an image to be recognized are written to the characteristic data memories 137, 138 and 139 of the respective layers.

The characteristic data j, k and h of the layers are read out from the characteristic data memories 137, 138 and 139 respectively by the output i of the characteristic data counter 123 of the address generator 110.

The address converter 104 is supplied with the characteristic data j of the first layer, the output x of the first layer counter 120 of the address generator 110 and the data count Wj (the number of data having other values other than zero of the coupling coefficient of the quantized neuron of the first layer). The address convertor 104 calculates the address of the coefficient memory 101 holding the coupling coefficients of the quantized neurons of the first layer, and one of the addresses of the weight memory 111 storing the weights of the neurons of the last layer.

The output jjj to the address of the coefficient memory 101 is given by Formula (4), while the output jj to one of the addresses of the weight memory 111 is given by Formula (5). If the number of outputs of a quantized neuron is eight and the quantization signal input terminal S has eight input levels from 0 to 7, the variable of the output of the quantized neuron ranges between 0 and 7. Three low-order bits of the results of the jjj and jj are output.

The address converter 105 calculates the address of the coefficient memory 102 holding the coupling coefficients of the quantized neurons of the second layer, and one of the addresses of the weight memory 111 storing the weights of the neurons of the last layer, and outputs the addresses. The address converter 106 calculates the address of the coefficient memory 103, and one of the addresses of the weight memory 111, and outputs them.

The weight memory 111, which holds the weights of the neurons of the last layer of the quantized neuron network, is supplied with the jj, kk and hh of the address converters 104, 105 and 106, the i of the characteristic data counter 123 of the address generator 110 and the value p of the output layer counter 124 selected by the selective circuit 125 of the address generator 110. Then the weight memory 111 outputs the weight data of the neuron of the last layer corresponding to the output data (i.e., the output of the quantized neuron of the third layer).

The cumulative operation unit 113 multiplies the output of the table memory 112 by the output of the weight memory 111, and accumulates the results.

The foregoing operations are carried out as the address generator 110 counts upward. When the output of the output layer counter 124 of the address generator 110 varies, the value of the cumulative operation unit 113 is written to at the address of the output memory 114. The value of the cumulative operation unit 113 returns to zero.

When the address generator 119 finishes counting, the arithmetical operations of recognition are completed as well. At the output memory 114 the solution outputs of the quantized neuron network are obtained.

As described above, the same operations as the second embodiment are performed.

Next, the learning of the weight data stored in the weight memory 111 is described.

The characteristic data j, k and h to be fed to the layers are read out from the characteristic data memories 137, 138 and 139 by the output i of the characteristic data counter 123 of the address generator 110. The address converter 104 is supplied with the characteristic data j of the first layer, the output x of the first layer counter 120 of the address generator 110 and the data count Wj. Then the address convertor 104 calculates one of the addresses of the weight memory 111 which holds the weights of the neurons of the last layer by Formula (5) which is used also in the recognition processing. The output jj to the address of the weight memory 111 is found by Formula (5). Similarly, the address converters 105 and 106 calculate the addresses kk and hh to output them.

As it is now in the learning mode, the learning control signal T and the signal of the neuron number Tp of the learning neuron of the last layer are output from the control circuit 115. The selective circuit 125 of the address generator 110 selects the neuron number Tp of the learning neuron from the control circuit 115.

The weight memory 111, which holds the weights of the neurons of the last layer of the quantized neuron network, is supplied with the address inputs jj, kk and hh from the address converters 104, 105 and 106, the output i of the characteristic data counter 123 of the address generator 110, and the output value p which represents the learning neuron number TP of the control circuit 115 selected by the selective circuit 125 of the address generator 110. Then the weight memory 110 outputs, to the weight update unit 116, the data (i.e., the weight data stored at the corresponding addresses to the above inputs) having other values other than zero of the outputs of the quantized neurons of the last layer.

The weight update 116 adds 1 to the weight data input, and outputs the sum to the weight memory 111. Receiving the write signal WE from the control circuit 115, the weight memory 111 writes the weight update value fed from the weight update unit 116 to at the same address from which the data is read out to the weight update unit 116.

The above operations are carried out with the count-up of the address generator 110. Upon the completion of the counts of the first layer counter 120 to the characteristic data counter 123 of the address generator 110, the learning is done. As a result, the weights of the inputs having other input data values other than zero of the learning neurons of the output layer are all changed.

Therefore, even if the clear difference between images is unlikely to appear in the characteristic data when the image is not only monotonous in tone but also subtle in distinct, and the pixel value, lateral differential value and the vertical differential value are low, this embodiment makes it possible to achieve a high image recognition rate because the characteristic data are nonlinear converted through the look-up tables 141, 142 and 143 to expand the difference between the characteristic data. After the expansion, the data are supplied to the characteristic data memories 137, 138 and 139.

Seventh Embodiment

Figure 15:
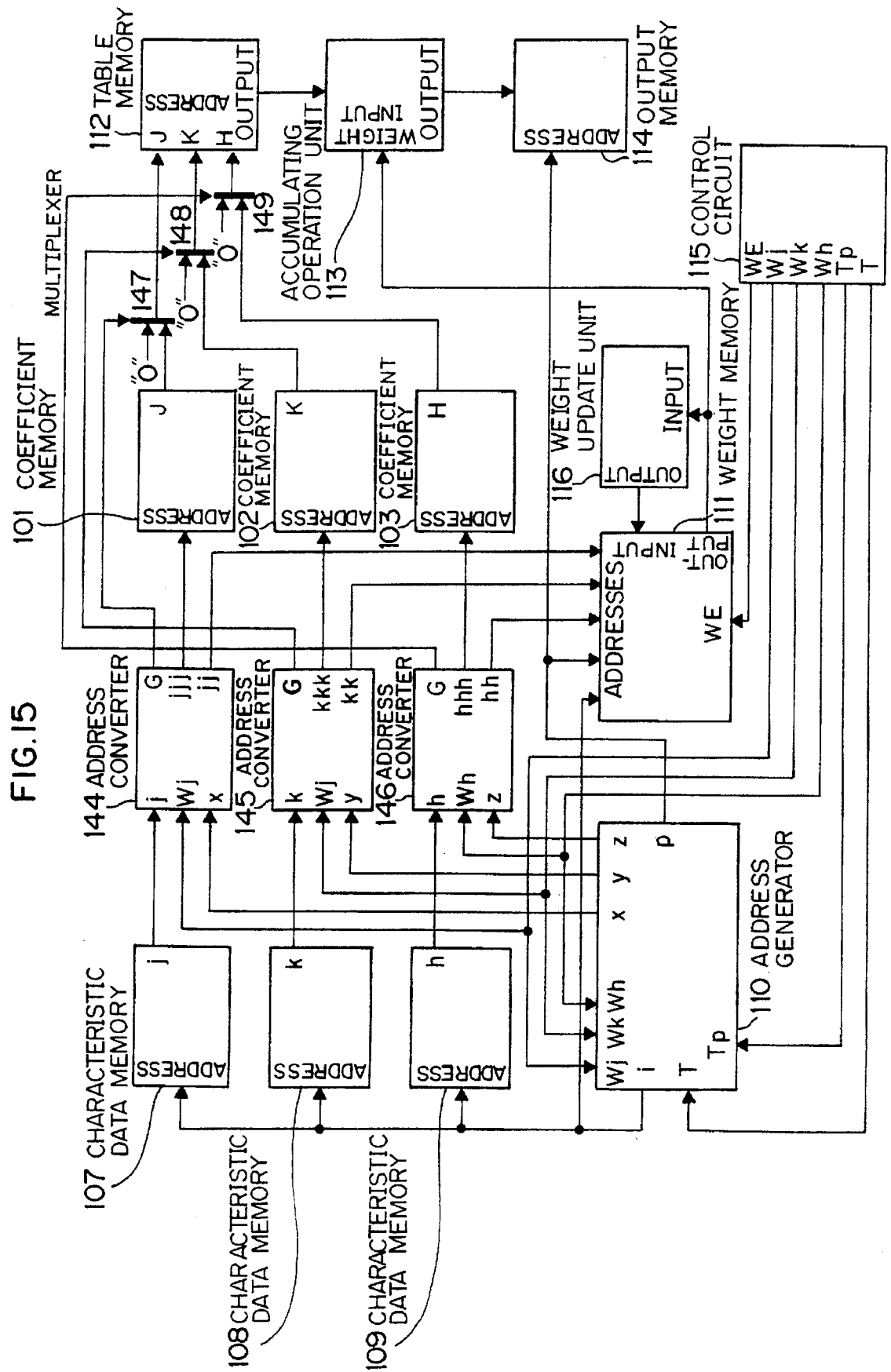
FIG. 15 is a diagram showing the organization of a neural network circuit of a seventh embodiment of the invention having recognition and learning abilities.
Figure 23A:
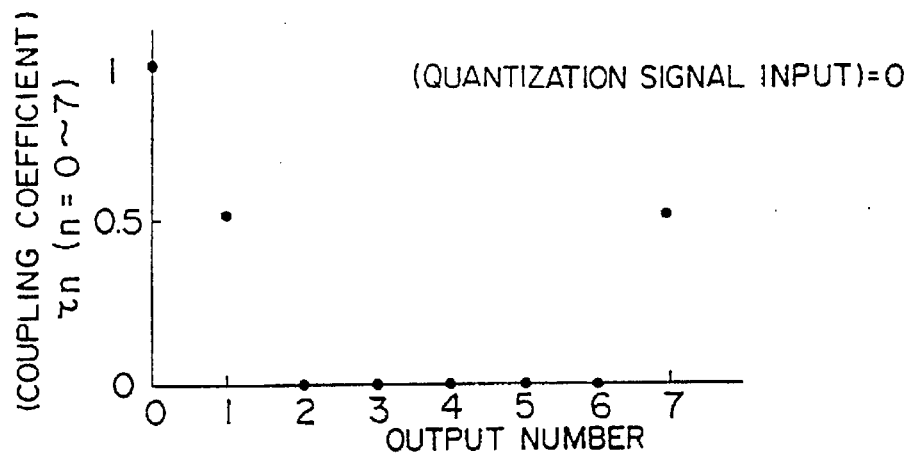
FIG. 23 comprised of (a) and (b) is an explanatory diagram of coupling coefficients.
Figure 23B:
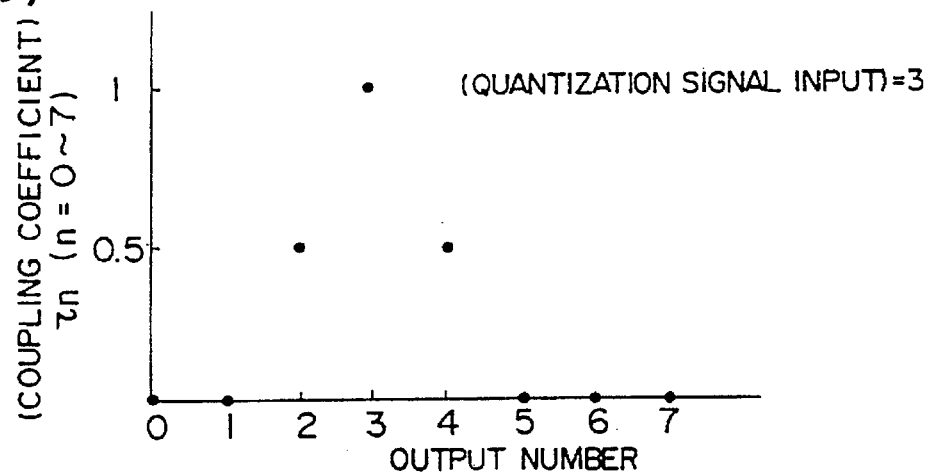

FIG. 15 shows a seventh embodiment of the present invention. With this embodiment, a high image recognition rate can be achieved. As seen from FIG. 23(a), when the quantization signal input=0, the coupling coefficients at the output numbers 0, 1 and 7 take other values other than zero. However, since there is a considerable distance between the value at the output number 7 and the value at the output number 0 (that is, a portion that takes a greatest coupling coefficient), this lowers the image recognition rate. This is explained by the fact that the left side of an image and the right side thereof are not in series. In other words, the right side of a particular pixel has a consecutive relationship with the left side of a next pixel on the right but not with the left side of the particular pixel. Accordingly, for the coupling coefficients as shown in FIG. 23(a), for example, by changing the value of the coupling coefficient at the output number 7 to a value of zero, the image recognition rate can be improved.

In the seventh embodiment of FIG. 15, elements common to those of FIG. 4 are assigned the same reference numerals.

The address converter 144, 146 and 147 of the first, second and third layers output the control signals G. The outputs jjj, kkk and hhh being fed to the addresses of the coefficient memories 101, 102 and 103 are calculated by Formula (4) of the second embodiment, and if jjj<0 or jjj>7, kkk<0 or kkk>7 and hhh<0 or hhh>7, the control signals G are output from the address converter 144, 146 and 147.

In this embodiment, multiplexers 147, 148 and 149 are further included. The multiplexers 147, 148 and 149 are supplied with zero address signals and with the address signals J, K and H from the corresponding coefficient memories 101, 102 and 103. If the multiplexers 147, 148 and 149 receive the control signals G, as a control signal, from the corresponding address converters 144, 145 and 146, the multiplexers select "0's" and supply them to the corresponding addresses J, K and H of the table memory 112.

Other elements other than the elements described above are the same as the third embodiments. In the circuit of FIG. 15, the characteristic data memories 107, 108 and 109 retain the characteristic data being supplied to the quantization signal input terminals S of the quantized neurons of the first, second and third layers. The coefficient memories 101, 102 and 103 hold the coupling coefficients of the quantized neurons of the first to third layers. The table memory 112 is supplied with the outputs of the coefficient memories 101, 102 and 103, and outputs the values obtained by multiplying the outputs one another. The weight memory 111 holds the weights of the neurons of the last layer of the quantized neuron network. The cumulative operation unit 113 is supplied with the output of the table memory 112 and the output of the weight memory 111, and carries out cumulative additions of the product obtained by multiplying the one output by the other.

The weight update unit 116 is supplied with the weights output from the weight memory 111. Then the weight update unit 116 outputs the updated weights as update data. The control circuit 115 outputs the write control signal WE, the learning control signal T together with the neuron number Tp of the learning neuron of the last layer, and the data counts Wj, Wk and Wh (the numbers of data having other values other than zero of the coupling coefficients of the quantized neurons of the first to third layers), to the weight memory 111, to the address generator 110, and to the address generator 110 and the address converters 144, 145 and 146, respectively. The address converters 144, 145 and 146 receive the data from the address generator 110 as well as from the corresponding the characteristic data memories 107, 108 and 109 thereby converting the data received into the addresses of the coefficient memories 101, 102 and 103 as well as into the addresses of the weight memory 111.

In the address generator 110 as shown in FIG. 8, if the value of the carry input is 1, the first to third layer counters 120, 121 and 122 count from 0 upward to (the width input value−1). The characteristic data counter 123 is a counter which counts the number (corresponding to the number of characteristic data) of times. The output layer counter 124 is a counter which counts the number (corresponding to the number of output neurons) of times. The selective circuit 125 selects either the neuron number Tp of the learning neuron of the last layer output from the control circuit 115 or the output of the output layer counter 124, with the learning control signal T. As the selective circuit 125 receives the learning control signal T (that is, the learning period), it selects the neuron number Tp of the learning neuron of the last layer, whereas the output of the output layer counter 124 is selected when no learning control signals T are received (that is, the recognition period).

The operations of the seventh embodiment of the invention are described below.

The recognition of the characteristic data is first described. The same operations as the second embodiment are performed. The characteristic data of an image to be recognized are written into the characteristic data memories 107, 108 and 109.

The characteristic data j, k and h of the layers are read out from the characteristic data memories 107, 108 and 109 respectively by the output i of the characteristic data counter 123 of the address generator 110.

The address converter 144 is supplied with the characteristic data j of the first layer, the output x of the first layer counter 120 of the address generator 110 and the data count Wj The address convertor 144 calculates the address of the coefficient memory 101 holding the coupling coefficients of the quantized neurons of the first layer, and the addresses of the weight memory 111 storing the weights of the neurons of the last layer.

The output jjj to the address of the coefficient memory 101 is given by Formula (4), while the output jj to one of the addresses of the weight memory 111 is given by Formula (5). If the number of outputs of a quantized neuron is eight and the quantization signal input terminal S has eight input levels from 0 to 7, the variable of the output of the quantized neuron ranges between 0 and 7. Three low-order bits of the results of the jjj and jj are output. If jjj<0 or jjj>7 in Formula (4), the multiplexer 147 selects a "0" by the control signal G from the corresponding address converter 144. The "0" is supplied to the address J of the table memory 112.

The address converter 14S calculates the address kkk of the coefficient memory 102 holding the coupling coefficients of the quantized neurons of the second layer, and the address kk of the weight memory 111 storing the coefficients of the neurons of the last layer, thereby outputting the results. The address converter 146 calculates the address hhh of the coefficient memory 103 holding the coupling coefficients of the quantized neurons of the third layer, and the address hh of the weight memory 111 storing the coefficients of the neurons of the last layer, thereby outputting the results. As in the first layer, if kkk<0 or kkk>7, the multiplexer 148 selects a "0" by the control signal G from the corresponding address converter 145. The "0" is supplied to the address K of the table memory 112. If hhh<0 or hhh>7, the multiplexer 148 selects a "0" by the control signal G from the corresponding address converter 146. The "0" is supplied to the address H of the table memory 112.

The weight memory 111, which holds the weights of the neurons of the last layer of the quantized neuron network, is supplied with the jj, kk and hh of the address converters 144, 145 and 146, the i of the characteristic data counter 123 of the address generator 110 and the p of the output layer counter 124 selected by the selective circuit 125 of the address generator 110. Then the weight memory 111 outputs the weight data of the neuron of the last layer corresponding to the output data (i.e., the output of the quantized neuron of the third layer) of the table memory 112.

The cumulative operation unit 113 multiplies the output of the table memory 112 by the output of the weight memory 111, and accumulates the results.

The foregoing operations are carried out as the address generator 110 counts upward. When the output of the output layer counter 124 of the address generator 110 varies, the value of the cumulative operation unit 113 is written to at the address of the output memory 114. The value of the cumulative operation unit 113 returns to a 0.

When the address generator 110 finishes counting, the arithmetical operations of recognition are completed as well. In the output memory 114 the solution outputs of the quantized neuron network are obtained.

As described above, the same operations as the second embodiment are performed.

The learning in this embodiment is described below.

The characteristic data j, k and h to be fed to the layers are read out from the characteristic data memories 107, 108 and 109 by the output i of the characteristic data counter 123 of the address generator 110. The address converter 144 is supplied with the characteristic data J of the first layer, the output x of the first layer counter 120 of the address generator 110, and the data count Wj (the number of data having other values other than zero of the coupling coefficient of the quantized neurons of the first layer) from the control circuit 115. Then the address converter calculates one of the addresses of the weight memory 111 storing the weights of the neurons of the last layer by the same formula as used in the recognition processing, Formula (5). The output jj to the address of the weight memory 111 is found by the formula (5) in the second embodiment. Similarly, the address converters 145 and 146 calculate the addresses kk and hh of the weight memory 111 respectively, and output them.

As it is now in the learning mode, the learning control signal T and the signal of the neuron number Tp of the learning neuron of the last layer are output from the control circuit 115. The selective circuit 125 of the address generator 110 selects the neuron number Tp of the learning neuron output from the control circuit 115.

The weight memory 111, which holds the weights of the neurons of the last layer of the quantized neuron network, is supplied with the address inputs jj, kk and hh from the address converters 144, 145 and 146, the output i of the characteristic data counter 123 of the address generator 110, and the value p which represents the learning neuron number Tp output from the control circuit 115 selected by the selective circuit 125 of the address generator 110. Then the weight memory 111 outputs to the weight update unit 116 the data (i.e., the weight data stored at the corresponding addresses to the above inputs) having other values other than zero of the outputs of the quantized neurons of the last layer.

The weight data input is added by 1 by the weight update unit 116, and the resulting value is supplied to the weight memory 111 as update data. The weight memory 111 writes, with the write signal WE from the control circuit 115, the update data fed from the weight update unit 116, to at the same address from which the weight data is read out to the weight update unit 116. As a result, the weight data is updated. The foregoing operations are carried out as the address generator 110 counts upward. Upon the completion of the counts of the layers from the first layer counter 120 to the characteristic data counter 123 of the address generator 110, the learning is finished. As a result, all of the weights of the inputs having other input data values other than zero of the learning neurons of the output layer are changed and become heavier.

If jjj<0 or jjj>7, kkk<0 or kkk>7 and hhh<0 or hhh >7 (as in FIG. 23(a)), the coupling coefficients J, K and H all having non-zero values are output from the corresponding coefficient memories 101, 102 and 103. However, the control signals G are output from the corresponding address converters 144, 145 and 146. As a result, the corresponding multiplexer 147, 148 and 149 select the coupling coefficients having a value of 0 and input them as the corresponding addresses J, K and H to the table memory 112. This prevents the right side of a pixel from being consecutive with the left side of the pixel. Thus, it is possible to achieve a high characteristic data recognition rate.

Eighth Embodiment

Figure 16:
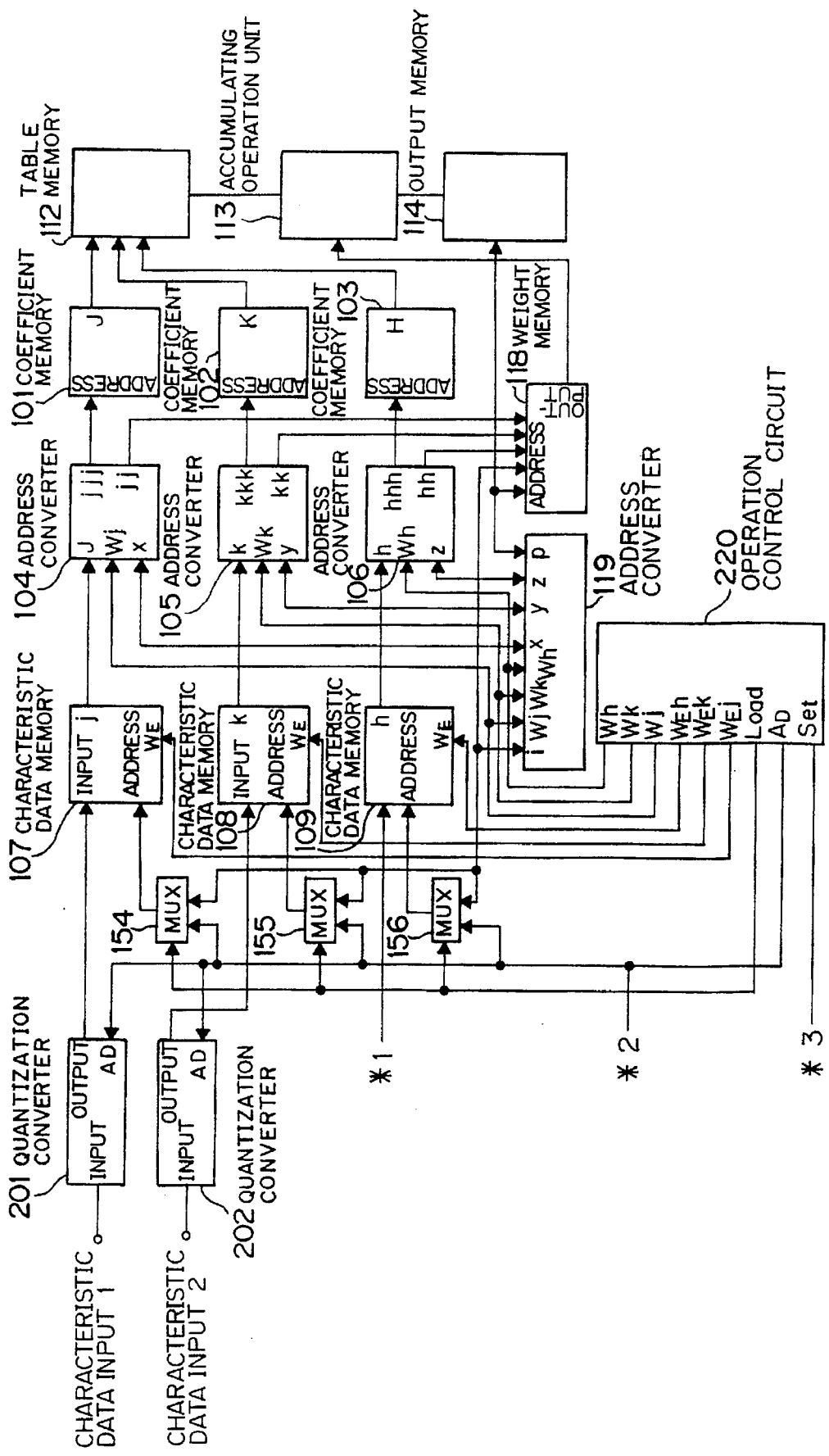
FIG. 16 is a diagram showing partially the organization of a neural network circuit of an eighth embodiment of the invention.
Figure 17:
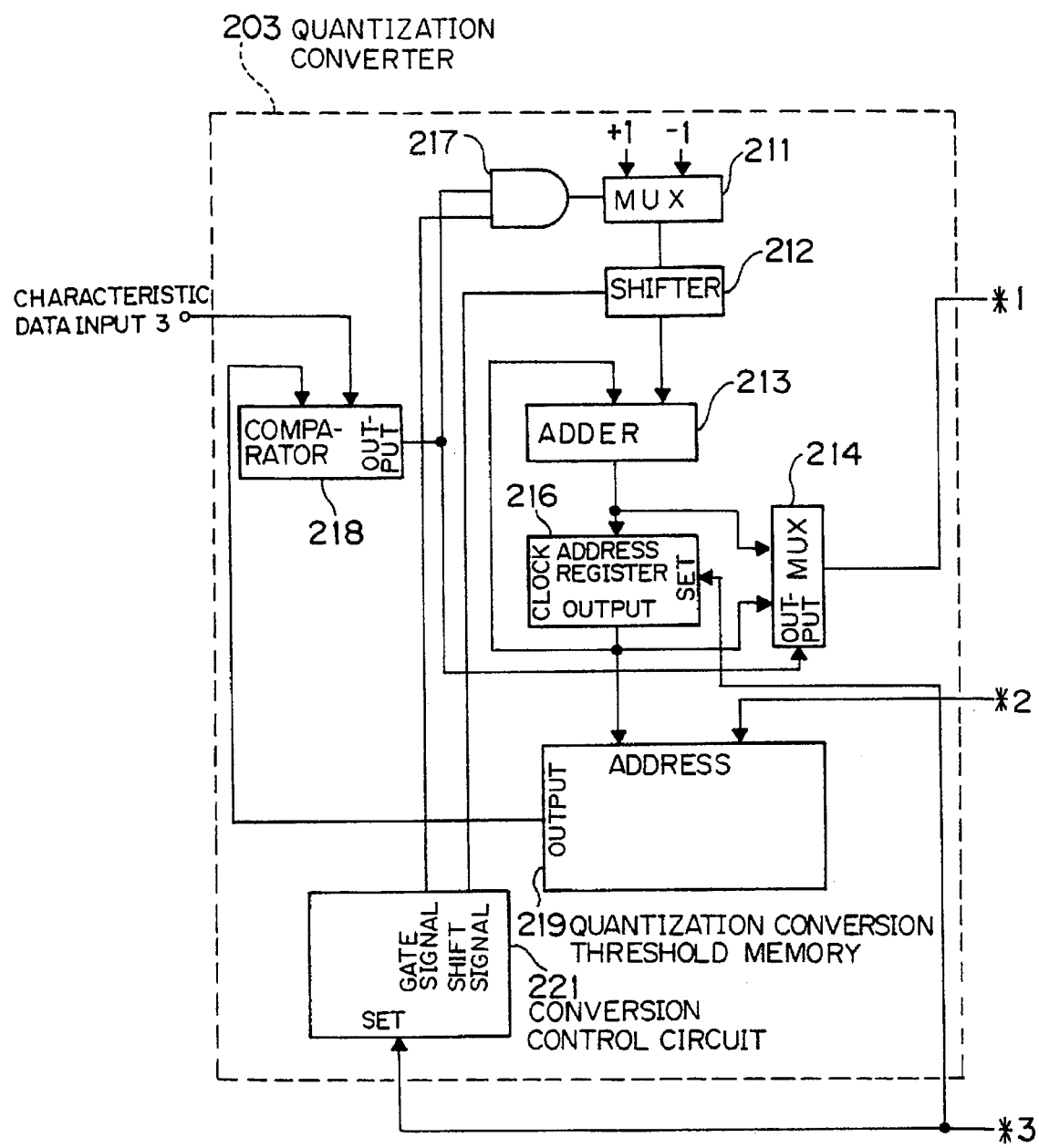
FIG. 17 is another diagram showing partially the organization of the neural network of the eighth embodiment.

FIGS. 16 and 17 shows an eighth embodiment of the present invention. In this embodiment, characteristic data are quantization converted which are stored in the characteristic data memories 107, 108 and 109. With these characteristic data, the neural network circuit of this embodiment carries out recognition work. In other words, the network arithmetical operations are performed with the converted characteristic data.

In this embodiment, the number of quantization conversion memories is lessened in order that the neural network circuit with a high image recognition rate can be made up of small-scale hardware. Before the description of the circuit of this embodiment, a neural network made by the inventors is described below (FIG. 18).

Figure 18:
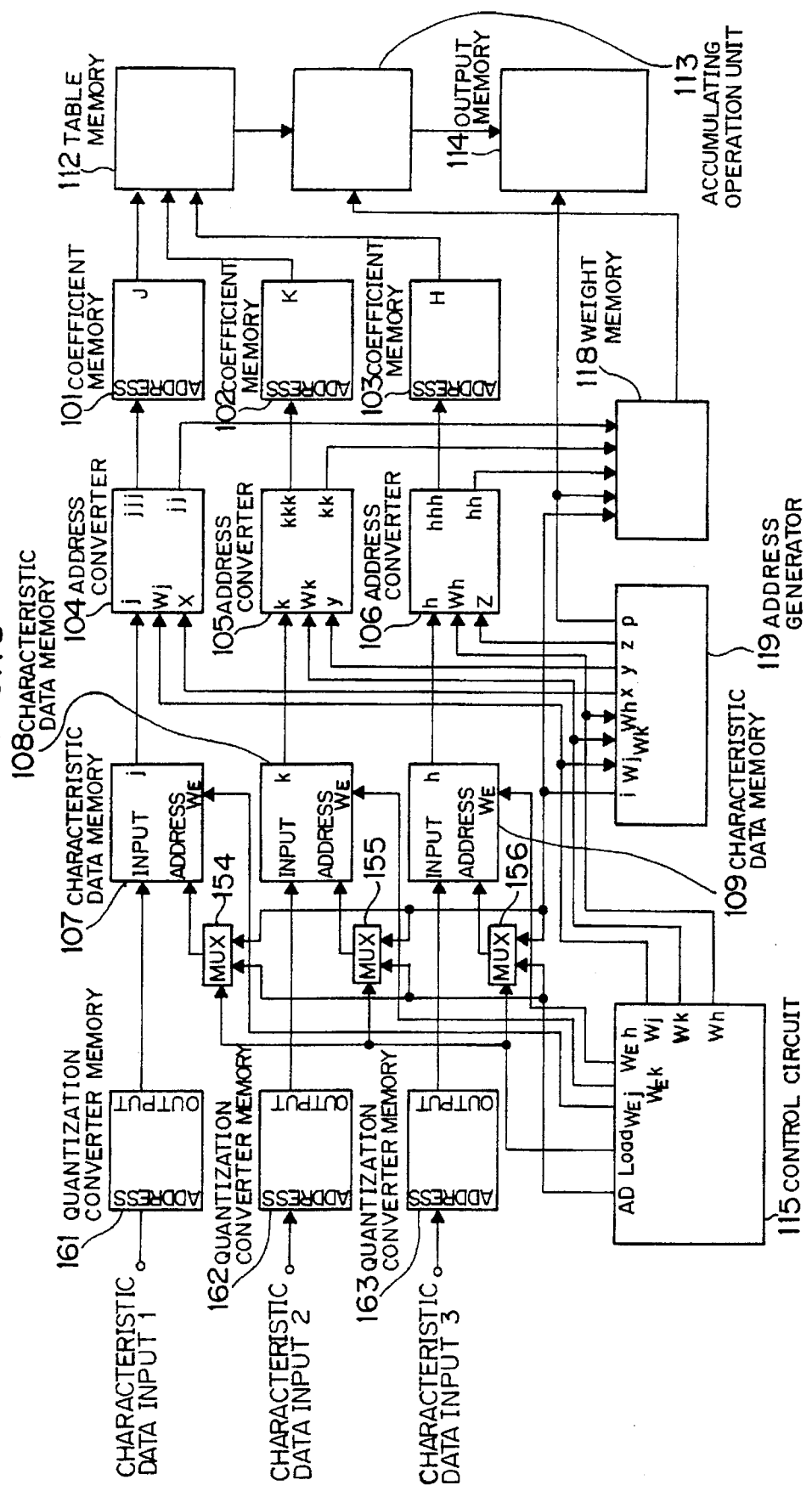
FIG. 18 is a diagram showing the organization of the neural network circuit in which a quantization conversion memory which stores a quantization conversion table is arranged for every layer in the eighth embodiment.

In the neural network circuit as shown in FIG. 18, quantization conversion memories 161, 162 and 163 are provided in advance with quantization conversion tables for optimizing the quantization of characteristic data supplied from outside.

The control circuit 115 sends out the AD signal showing the load address of the characteristic data and the load signal of the characteristic data. When receiving the load signals from the control circuit 115, the multiplexers 154, 155 and 156 feed the AD signals to the address inputs of the characteristic data memories 107, 108 and 109. First characteristic data of the respective layers supplied from outside are fed to the corresponding quantization conversion memories 161, 162 and 163 for quantization conversion, and then are supplied to the characteristic data memories 107, 108 and 109. Thereafter, by the write enable signals WEh, WEj and WEk, the characteristic data are written to inside.

The value of the AD signal of the control circuit 115 is counted upward by 1, and the second characteristic data are fed into the corresponding quantization conversion memories 161, 162 and 163. The same processes as the above are repeatedly performed on all characteristic data supplied from outside so that they are all quantized by the quantization conversion memories 161, 162 and 163. The quantized values thereof are stored in the corresponding characteristic data memories 107, 108 and 109.

For example, for an eight-leveled quantized neuron, an item of characteristic data is converted into eight different values.

Other circuit elements of FIG. 18 other than the above are the same as those of FIG. 3. In the circuit of FIG. 18, the characteristic data memories 107, 108 and 109 hold the characteristic data being supplied to the quantization signal input terminals S of the quantized neurons of the first, second and third layers. The coefficient memories 101, 102 and 103 hold the coupling coefficients of the quantized neurons of the first to third layers. The table memory 112 is supplied with the outputs of the coefficient memories 101, 102 and 103, and outputs the products obtained by multiplying the outputs one another. The weight memory 111 holds the weights of the neurons of the last layer of the quantized neuron network. The cumulative operation unit 113 is supplied with the output of the table memory 112 and the output of the weight memory 111, and carries out cumulative additions of the product obtained by multiplying the one output by the other. The control circuit 115 outputs the data counts Wj, Wk and Wh (the numbers of data having other values other than zero of the coupling coefficients of the quantized neurons of the first, second and third layers), to both the address generator 119 and the address converters 104, 105 and 106. The address converters 104, 105 and 106 receive the data from both the address generator 119 and the characteristic data memories 107, 108 and 109, and calculate the addresses of the coefficient memories 101, 102 and 103 and the addresses of the weight memory 118.

In the address generator 119 as shown in FIG. 5, if the value of the carry input is 1, the first to third layer counters 120, 121 and 122 count from zero upward to (the width input value−1). The characteristic data counter 123 is a counter which counts the number of times corresponding to the number of characteristic data. The output layer counter 124 is a counter which counts the number of times corresponding to the number of output neurons.

Next, the execution operations of image recognition in this circuit are described.

First, the characteristic data j, k and h of the layers are read out from the characteristic data memories 107, 108 and 109 respectively by the output i of the characteristic data counter 123 of the address generator 119.

The address converter 104 is supplied with the characteristic data j of the first layer, the output x of the first layer counter 120 of the address generator 119 and the data count Wj (the number of data having other values other than zero of the coupling coefficient of the first layer). The address converter 104 calculates the address of the coefficient memory 101 holding the coupling coefficient of the quantized neuron of the first layer, and one of the addresses of the weight memory 118 storing the weights of the neurons of the last layer.

The output jjj to the address of the coefficient memory 101 is given by Formula (4). The output jj to the address of the weight memory 118 is given by Formula (5). If the number of outputs of a quantized neuron is eight and the quantization signal input terminal S has eight input levels from 0 to 7, the variable of the output of the quantized neuron ranges between 0 and 7. Three low-order bits of the results of the jjj and jj are output.

The address converter 105 calculates the address of the coefficient memory 102 holding the coupling coefficients of the quantized neurons of the second layer, and one of the addresses of the weight memory 118 storing the coefficients of the neurons of the last layer thereby outputting the results. The address converter 106 calculates the address of the coefficient memory 103 holding the coupling coefficients of the quantized neurons of the third layer, and one of the addresses of the weight memory 118 storing the weights of the neurons of the last layer thereby outputting the results.

The weight memory 118, which holds the weights of the neurons of the last layer of the quantized neuron network, is supplied with the inputs jj, kk and hh of the address converters 104, 105 and 106, the output i of the characteristic data counter 123 of the address generator 119 and the value p of the output layer counter 124. Then the weight memory 118 outputs the weight data of the neurons of the last layer corresponding to the output data (i.e., the output of the quantized neuron of the third layer).

The cumulative operation unit 113 multiplies the output of the table memory 112 by the output of the weight memory 118, and accumulates the results.

The foregoing operations are carried out as the address generator 119 counts upward. When the output of the output layer counter 124 of the address generator 119 varies, the value of the cumulative operation unit 113 is written to at the address of the output memory 114. The value of the cumulative operation unit 113 returns to zero.

When the address generator 119 finishes counting upward, the arithmetical operations of recognition are completed as well. The solution outputs of the quantized neuron network are obtained at the output memory 114.

In the neural network circuit of FIG. 18, it is difficult to achieve a high image recognition rate, since there Is provided only one quantization conversion memory per layer. The provision of a quantization conversion memory for every quantized neuron requires extremely large hardware and leads to high costs.

The neural network circuit of the eighth embodiment of the invention is shown in FIGS. 16 and 17.

In this neural network circuit, each of quantization conversion units 201, 202 and 203 comprises a quantization threshold memory 219 within which quantization threshold values are held, a shifter 212 for address calculation, an adder 213, an address register 216, an AND circuit 217, a multiplexer 211, a comparator 218 which compares the characteristic data given from outside with the output of the quantization threshold memory 219, an output multiplexers 214 which selects a value of the output, and a conversion control circuit 221 which controls its corresponding quantization conversion unit.

Figure 19:
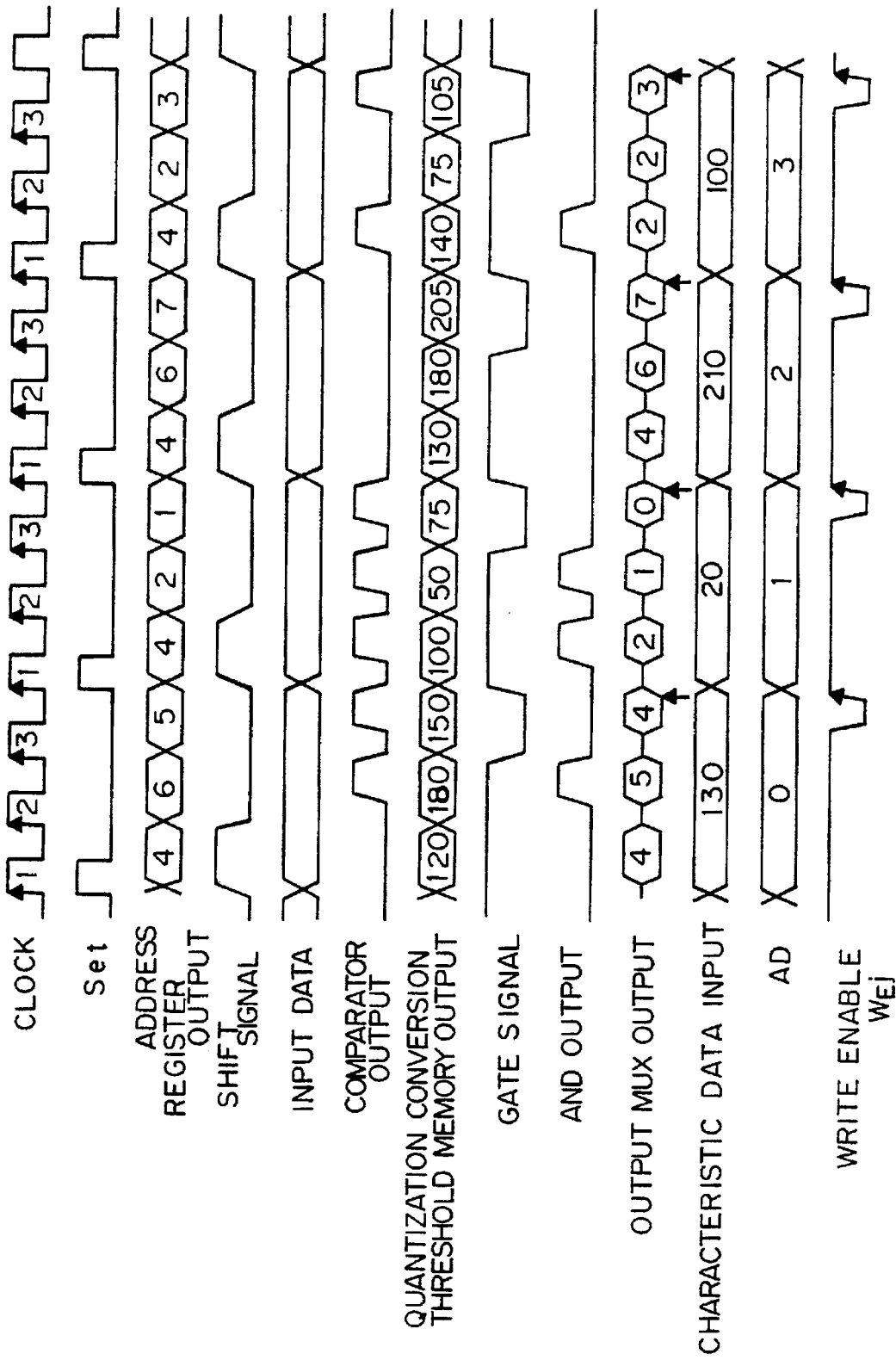
FIG. 19 shows respective waveforms of elements of the neural network of the eighth embodiment.

With reference to FIG. 19 that shows the waveforms of the elements, the operations of the quantization conversion units 201, 202 and 203 are described. In the quantization threshold memory 219, seven thresholds, corresponding to the respective characteristic data, for every eight addresses are arranged in the order of characteristic data. The lowest data of a group of eight addresses is made ineffective. The remaining seven thresholds are stored in ascending order, as shown in FIG. 20, that is, [null, 30, 60, 90, 120, 150, 180, 210], [null, 25, 50, 75, 100,125, 150,175] and so on.

The three low-order bits of the address of the quantization threshold memory 219 are supplied from the address register 216 while the six high-order bits thereof are supplied from the arithmetical operation control circuit 220.

At the time of the loading of characteristic data to the characteristic data memories 107, 108 and 109, the arithmetical operation control circuit 220 sends out the load signals and the set signals, along with the load address signals AD of the characteristic data. Each of the multiplexers 154, 155 and 156 is supplied with the load signal from the arithmetical operation control circuit 220, and selects the load address AD signal of the arithmetical operation control circuit 220.

The set signal from the arithmetical operation control circuit 220 sets the output value of the address register 216 at a value of 4. At the same time, the conversion control circuit 221 receives the set signal from the control circuit 220, shifting to its initial state. Then the conversion control circuit 221 sends out shift signals and gate signals according to clocks. As shown in FIG. 19, the shift signal becomes HIGH at the set signal, and becomes LOW at the second clock. On the other hand, the gate signal becomes HIGH at the set signal, and becomes LOW at the third clock.

The output of the address register 216 is fed to the low-order address of the quantization conversion threshold memory 219. The load address AD of the arithmetical operation control circuit 220 is supplied to the high-order address of the quantization conversion threshold memory 219. In other words, the quantization conversion threshold memory 219 selects a set having seven thresholds for quantization by the load address AD, and reads a fourth threshold, that is, a mid threshold in the set selected by a value, 4 initially given to the low-order address by the set signal. For example, if the value of the load address AD of the arithmetical operation control circuit 220 is zero, the threshold, 120 is read out.

The fourth threshold, read out from the quantization conversion threshold memory 219, is output to the comparator 218. The comparator 218 compares the input characteristic data with the fourth threshold. The comparator 218 outputs a LOW if the value of the characteristic data is greater than the threshold read out from the quantization conversion threshold memory 219, while it outputs a HIGH if the value is lower than the threshold. For example, if the value of the first input characteristic data is 130, it is compared with 120 (i.e., the value read out from the quantization conversion threshold memory 219). The comparator 218 outputs a LOW.

The output signal of the comparator 218 and the gate signal of the conversion control circuit 221 are fed to the AND circuit 217. Both the signals are ANDed by the AND circuit 217. The multiplexer 211 is controlled by the AND circuit 217. The multiplexer 211 selects either a "−1" input if the AND circuit 217 outputs a HIGH or a "+1" input if the AND circuit 217 outputs a LOW. The output of the multiplexer 211 is dependent on the output of the comparator 218 at the first and second clocks. The multiplexer 211 selects a "−1" input at the third clock, as shown in FIG. 19.

The output of the multiplexer 211 is fed to the shifter 212. The shifter 212 carries out a 0-bit or a 1-bit calculation right-shift. In other words, the shifter 212 shifts the input data to the right only at the first clock.

The output of the shifter 212 is added to the value of the address register 216 by the adder 213 so that a next address of the quantization conversion threshold memory 219 is calculated. At the first clock, a mid-threshold is read out from the quantization conversion threshold memory 219 to be compared with the input characteristic data. According to the results of such comparison, the address of a threshold two positions upward or downward from the mid-threshold is calculated. For example, the value of the first characteristic data (=130) is compared with the value (=120) read out from the quantization conversion threshold memory 219. Then, the multiplexer 211 selects a +1, and the +1 selected is shifted one bit to the right by the shifter 212. Thus the output value of the shifter 212 becomes 2. The adder 213 carries out an addition of the value of 4 of the address register 216 plus the output value of 2 of the shifter 212, thereby outputting the address 6 at which a next threshold is stored.

At the second clock, the address register 216 takes the output of the adder 213, and feeds to the quantization conversion threshold memory 219 the address 6.

The comparator 218 again compares the first characteristic data value, 130 with the next threshold, 180 read out from the quantization conversion threshold memory 219. The output of the comparator 218 becomes HIGH. The multiplexer 211 selects −1. Then selected −1 is shifted 0 bit to the right so that the output of the shifter 212 becomes −1. The adder 213 performs an addition of the value of 6 of the address register 216 plus the output value of −1 of the shifter 212, and outputs the address 5 where a next threshold is stored.

At the third clock, the address register 216 takes the output of the adder 213, and feeds to the quantization conversion threshold memory 219 the address 5. Once again, the comparator 218 compares the first characteristic data value, 130 with the next threshold, 150 read out from the quantization conversion threshold memory 219. In this case, at the third clock, the multiplexer 211 always selects −1, and the output of the shifter 212 always becomes −1, accordingly. The adder 213 adds the value of 5 of the address register 216 to the output value of −1 of the shifter 212 thereby outputting 4. At this time, the input value of the address register 216 is lower than the output value thereof by 1.

According to the output of the comparator 218, the output multiplexer 214 selects either the input value or the output value of the address register 216. For example, the output of the comparator 218 is HIGH, the output multiplexer 214 selects the input of the address register 216, and if the output of the comparator 218 is LOW, the multiplexer 214 selects the output of the address register 216. In other words, since, at the third clock, the input value of the characteristic data is 130 and the value read out from the quantization conversion threshold memory 219 is 150, the output of the comparator 218 becomes HIGH, and the output multiplexer 214 selects the input of the address register 216 thereby outputting 4.

As described above, at the third clock, the quantization results of the input characteristic data are found which are sent through the corresponding multiplexer 156 to the characteristic data memory 109, and are written thereto by the write enable signal WEh output from the arithmetical operation control circuit 220.

Thereafter, the load address AD of the arithmetical operation control circuit 220 is counted upwardly. The arithmetical operation control circuit 220 sends out the set signal to the quantization conversion unit 203. The same control as the above is carried out.

As the foregoing operations are repeated, the quantization conversion of all of the characteristic data is carried out. Through the multiplexer 156, all of the quantized characteristic data are loaded to the characteristic data memory 104.

The quantization conversion units 201, 202 and 203, provided for the first, second and third layers respectively, are capable of quantizing the corresponding characteristic data by different seven quantization conversion thresholds for every quantized neuron. This eliminates the need to provide a quantization conversion memory for every quantized neuron. Accordingly, a neural network which is small in size and achieves low costs as well as a high image recognition rate is realized.

After all of the characteristic data which are quantization converted are written to the characteristic data memories 107, 108 and 109, the contents of the load signal of the arithmetical operation control circuit 220 are switched. Based on the load signal, the multiplexers 154, 155 and 156 select, as their inputs, the output i of the address generator 119, respectively. Network arithmetical operations are carried out on the characteristic data stored in the characteristic data memories 107, 108 and 109.

The execution of image recognition by network operation is the same as the prior art.

As described above, the post-quantization characteristic data of the first, second and third layers are written to the characteristic data memories 107, 108 and 109 respectively. The readout of the characteristic data j, k and h supplied to the respective layers from the characteristic data memories 107, 108 and 109 is done by the output i of the characteristic data counter 123 of the address generator 119.

The address converter 104 is supplied with the characteristic data j, the output x of the first layer counter 120 of the address generator 119 and the data count Wj (the number of data having other values other than zero of the coupling coefficient of the first layer), whereby calculating the address of the coefficient memory 101 holding the coupling coefficients of the quantized neurons of the first layer, and one of the addresses of the weight memory 111 storing the weights of the neurons of the last layer.

The output jjj to the address of the coefficient memory 101 is given by Formula (4). The output jj to the address of the weight memory 111 is found by Formula (5). If the number of outputs of a quantized neuron is eight and the quantization signal input terminal S has eight input levels from 0 to 7, the variable of the output of the quantized neuron ranges between 0 and 7. Three low-order bits of the results of the jjj and jj are output.

Similarly, the address converter 105 calculates the address of the coefficient memory 102 holding the coupling coefficients of the quantized neurons of the second layer, and one of the addresses of the weight memory 111 storing the coefficients of the neurons of the last layer thereby outputting the results. The address converter 106 calculates the address of the coefficient memory 103 holding the coupling coefficients of the quantized neurons of the third layer, and one of the addresses of the weight memory 111 storing the coefficients of the neurons of the last layer thereby outputting the results.

The weight memory 111, which holds the weights of the neurons of the last layer of the quantized neuron network, is supplied with the inputs jj, kk and hh of the address converters 104, 105 and 106, the output i of the characteristic data counter 123 of the address generator 119 and the value p of the output layer counter 124. Then the weight memory 111 outputs the weight data of the neurons of the last layer corresponding to the output data (i.e., the output of the quantized neuron of the third layer).

The cumulative operation unit 113 multiplies the output of the table memory 112 by the output of the weight memory 111, and accumulates the results.

The foregoing operations are carried out as the address generator 119 counts upward. When the output of the output layer counter 124 of the address generator 119 varies, the value of the cumulative operation unit 113 is written to at the address of the output memory 114. The value of the cumulative operation unit 113 goes to zero.

When the address generator 119 finishes counting upward, the arithmetical operations of recognition are completed as well. The output memory 114 has now the solution outputs of the quantized neuron network.

In the above-described embodiments, the network is made up of three layers each having 64 (8×8) characteristic data, the quantization is carried out at eight levels, and the characteristic data are supplied to the three layers respectively. It, however, is understood that the present invention will not be limited by the above, and may include other modifications.

Ninth Embodiment

Now referring to FIGS. 27 through 30, a ninth embodiment of the present invention is described below. In this embodiment, initial learning characteristic data are prestored in initial learning characteristic data memories. At a preliminary stage prior to actual image recognition, by repeatedly referring to the characteristic data prestored to update weights of neurons of the last layer, the learning of recognition processing is executed.

Figure 21:
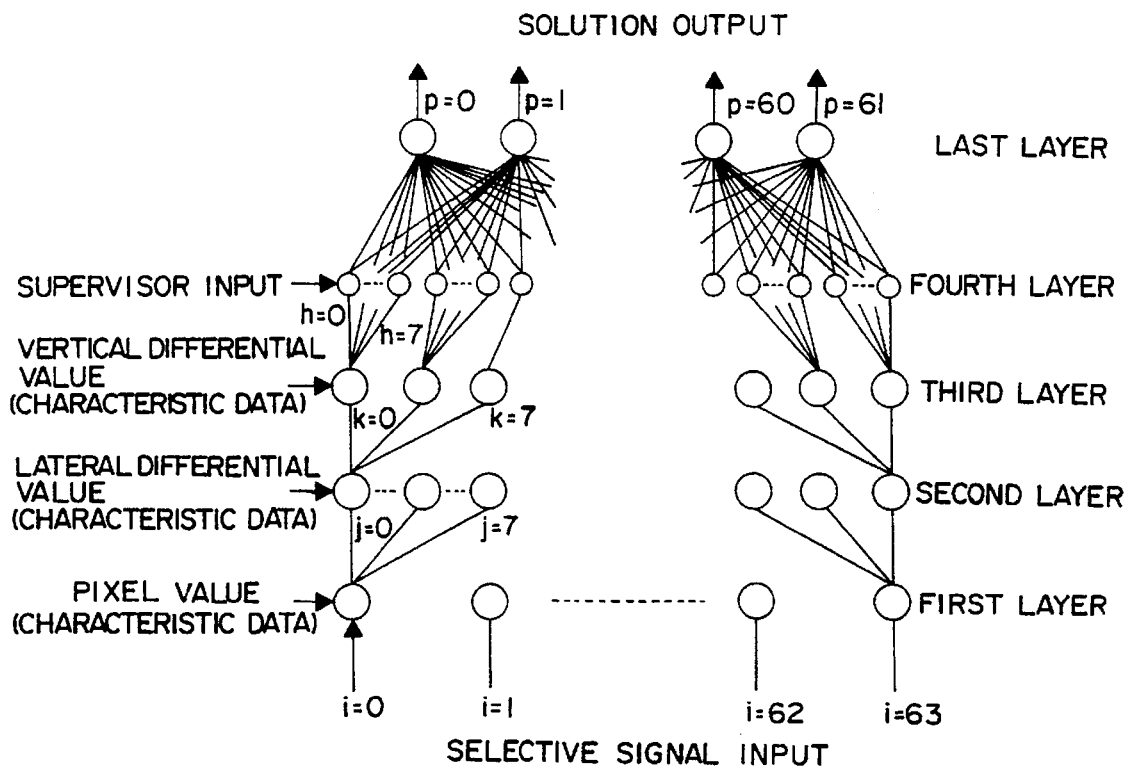
FIG. 21 is a diagram showing the organization of a multi-layered neural network of quantized neurons.
Figure 22:
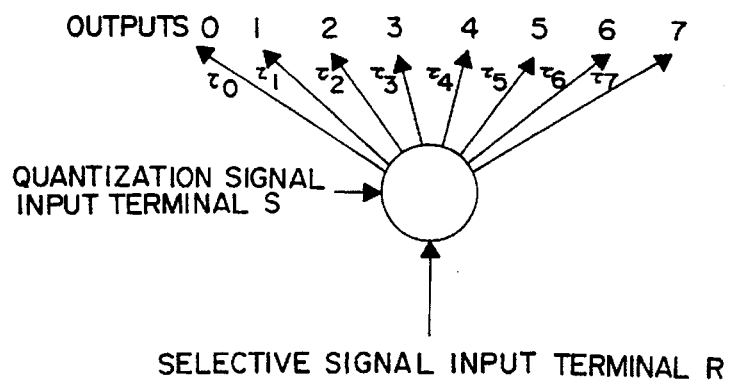
FIG. 22 is a diagram illustrating a quantized neuron.
Figure 27:
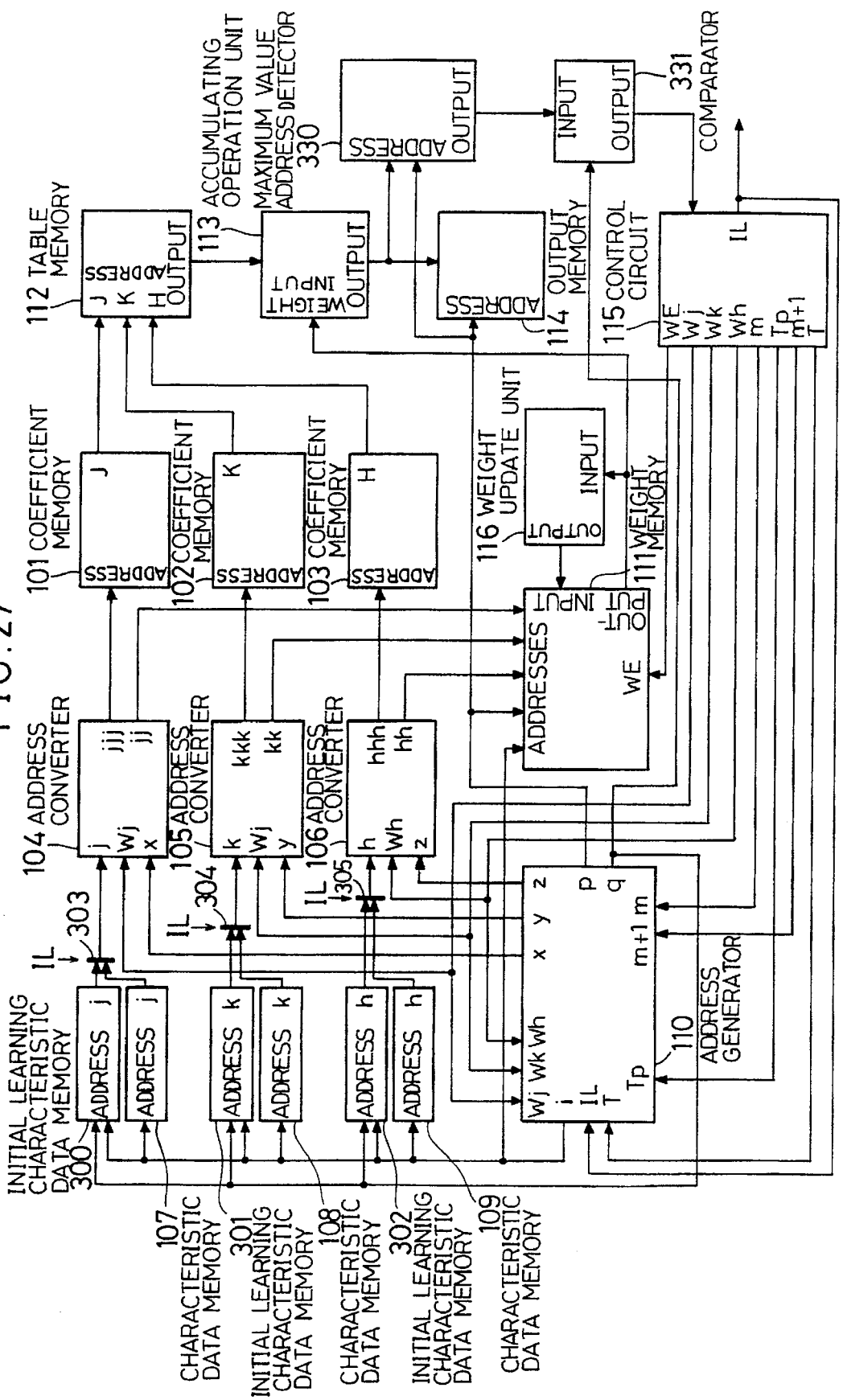
FIG. 27 is a diagram showing the organization of a neural network circuit of a ninth embodiment of the invention having recognition and learning abilities.
Figure 28:
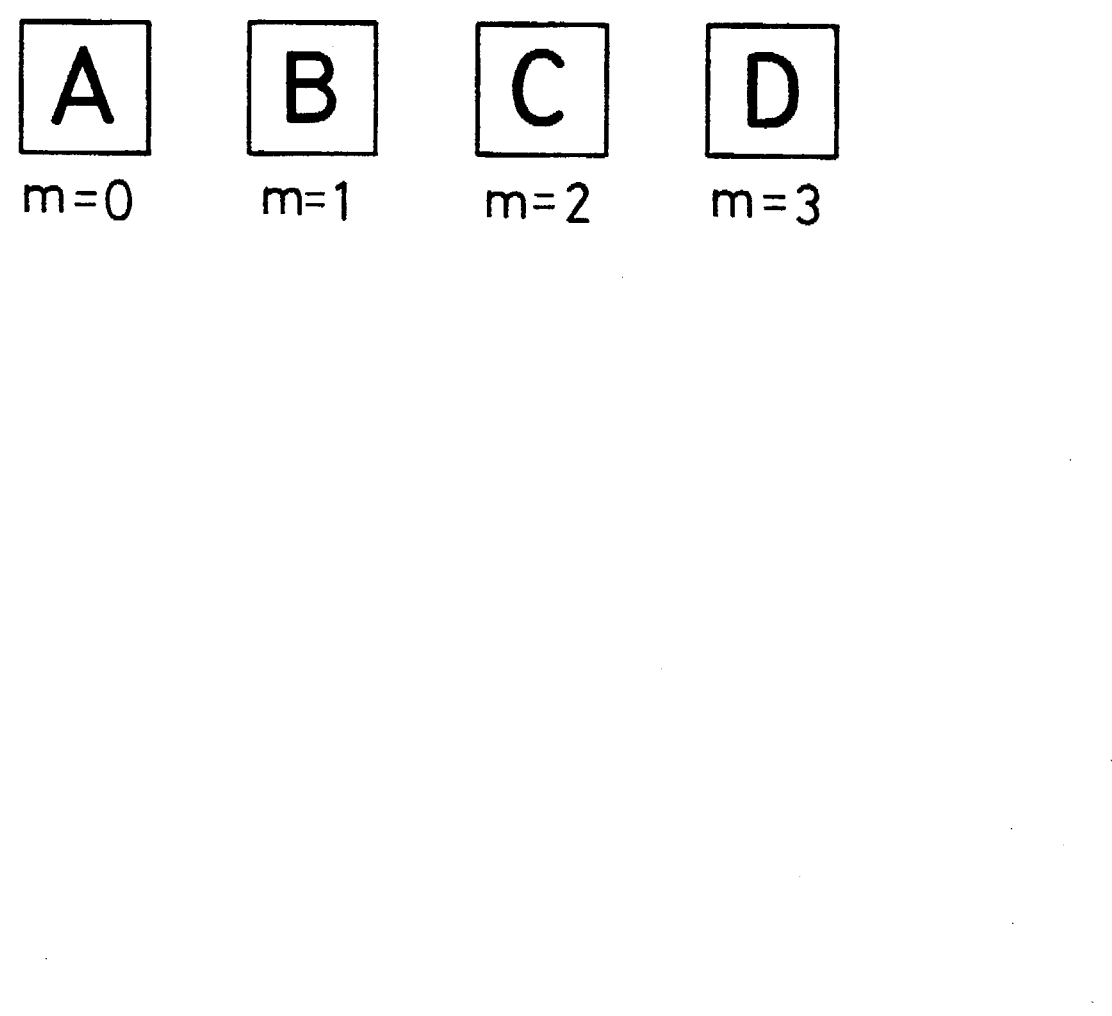

As is seen from FIG. 27, this embodiment has the same elements, including the weight memory 111 and the cumulative operation unit 113, as the third embodiment (see FIG. 7) and further includes initial learning characteristic data memories 300, 801 and 302. Prestored in each one of the initial learning characteristic data memories 300, 301 and 302 are four items of the initial characteristic data in the form of characters, such as A, B, C, and D (FIG. 28). Each one of the four items of the initial learning characteristic data is made up of 8×8 pixels. A first (m=0) characteristic data is selected in such a way that, when the same is being recognized, the neuron (p=0) of the last layer outputs the greatest output value compared to the other neurons of the last layer (FIG. 21). Similarly, the second (m=1), third (m=2) and fourth (m=3) characteristic data are so selected that, when they are being recognized, the neuron (p=1), the neuron (p=2), and the neuron (p=3) of the last layer output the respective greatest output values.

With reference to the flow chart of FIG. 29, the initial learning by the characteristic data to be prestored in each one of the initial learning characteristic data memories 300, 301 and 302 is described below. At Step 1, the weight memory 113 is initialized. At Step 2, the plural items of the characteristic data of FIG. 28 are stored in each one of the initial learning characteristic data memories 300, 301 and 302. At Step 3, the counter value m, indicating the number of times the recognition of the characteristic data is carried out, is initialized to m=0, and the learning flag FLAG, which becomes 1 when the learning is performed, is initialized to FLAG=0.

At Step 4, the mode is changed to the initial learning mode. At Step 5, the m-th (m=0 at a first time) characteristic data is read from each one of the initial learning characteristic data memories 300, 301 and 302, and the recognition of the characteristic data thus read is carried out, which is performed by the same arithmetical operations as in the second embodiment.

At Step 6, there is carried a check for agreement between the result of the recognition obtained at Step 5 and the supervisor data. If they agree with each other, there is no need to execute the learning of recognition processing. The process will immediately proceed to Step 8. On the contrary, if they disagree with each other (that is, in the case that there is difficulties in recognizing the characteristic data), the weights of the neurons stored in the weight memory 111 are updated with respect to the characteristic data in disagreement with the supervisor data at Step 7, according to the Hebb learning rule, and the learning flag FLAG is set to FLAG=1.

At Step 8, there is carried out a check if the characteristic data to be recognized is one that is located at the final location in each one of the initial learning characteristic data memories 300, 301 and 302. If not the final one, the counter m is added by 1 (m=m+1) at Step 9, thereafter the process returning to Step 4. Then the recognition on the next characteristic data is performed. If the characteristic data is detected as the final one, the value of the learning flag FLAG is discriminated at Step 10. If FLAG=1 (that is, the presence of learning), the counter m and the learning flag are returned to m=0 and FLAG=0 at Step 11, and the process returns to Step 4 to carry out again the recognition and learning as required starting with the 0th characteristic data. On the other hand, if FLAG=0 (that is, the absence of learning), it is decided that every characteristic data has been recognized properly, then the process is finished.

Figure 29:
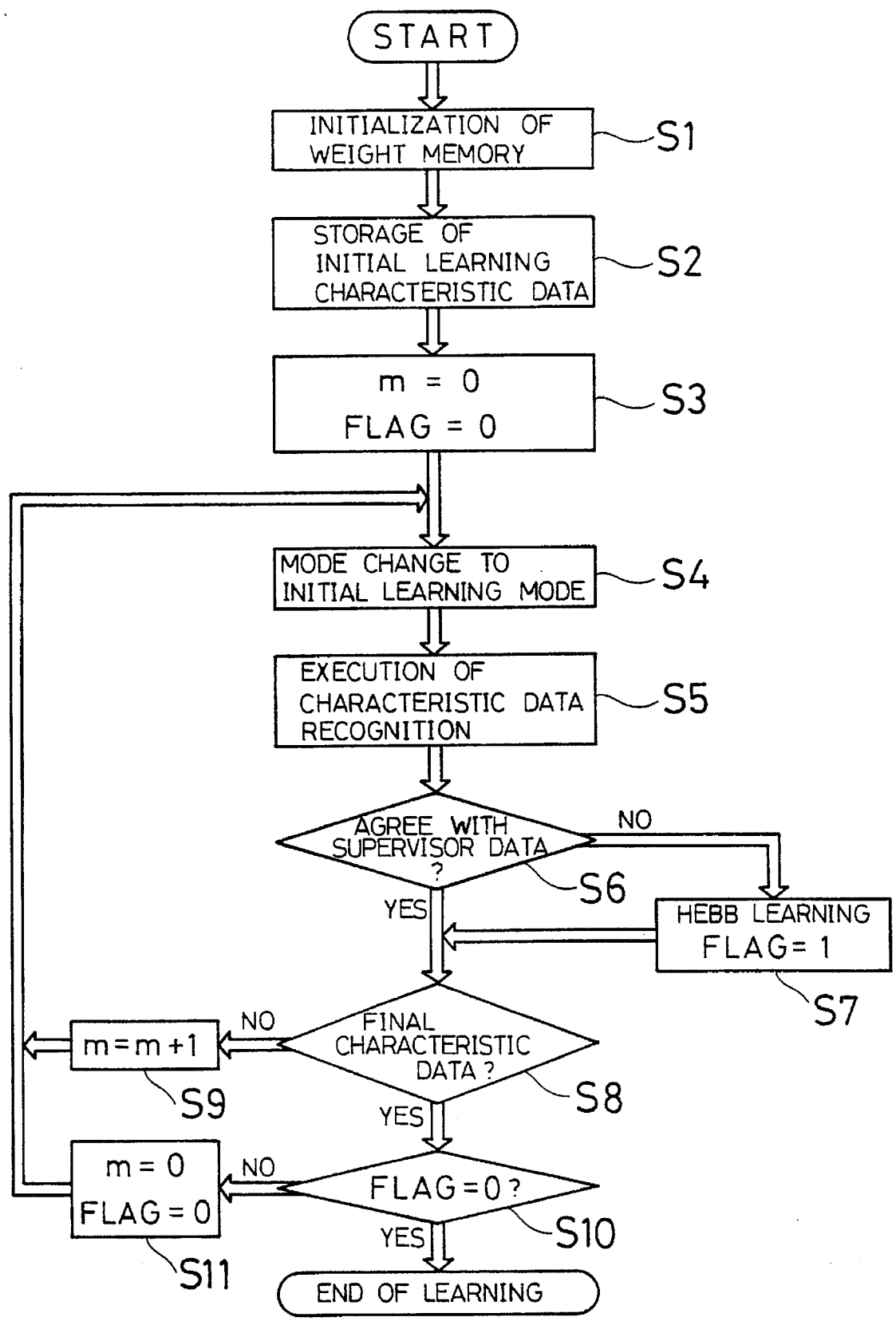
FIG. 29 is a flow chart of initial learning processing.

Reference is now made to FIG. 27 for the purpose of describing the organization of a circuit for the initial learning of recognition processing of the characteristic data as shown in the flow chart of FIG. 29.

FIG. 27 shows multiplexers 303, 804 and 305 for switching between the initial learning characteristic data memories 300, 301 and 302 and the corresponding characteristic data memories 107, 108 and 109. The control circuit 115 sends out the initial learning signals IL to the multiplexers 303, 304 and 305. The multiplexers 303, 304 and 305 receive the initial learning signals IL, and select the initial learning characteristic data memories 300, 301 and 302.

Figure 30:
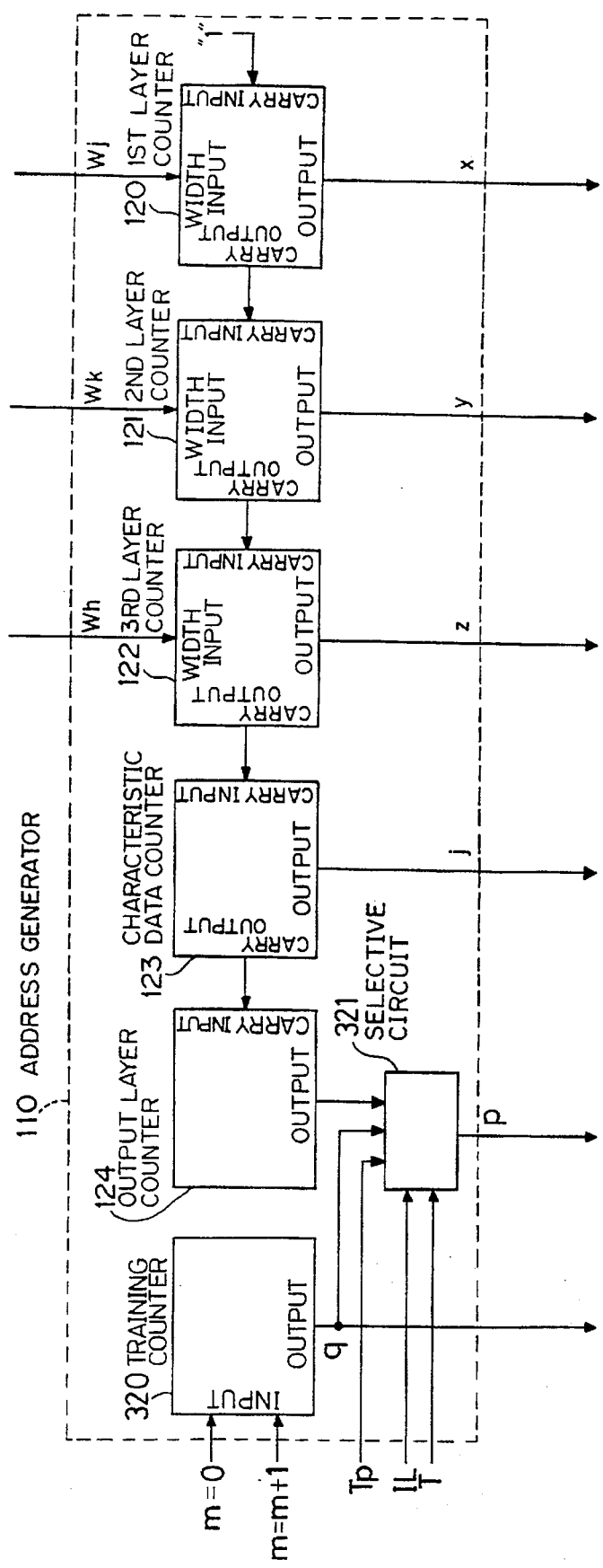
FIG. 30 is a diagram showing the organization of an address generator of the ninth embodiment.

The address generator 110 further contains a training counter 320 and a selective circuit 321 composed of a 3input multiplexer, as shown in FIG. 30. Receiving the initialization signal (m=0) along with the count signal (m=m+1) from the control circuit 115 of FIG. 27, the training counter 320 computes the number of times (i.e., m) the recognition of the characteristic data is carried out. When the control circuit 115 sends out the initial learning signal IL, the learning control signal T, and the signal of the neuron number Tp of the learning neuron of the last layer, the selective circuit 321 receives these signals. In the case that the selective circuit 321 receives the learning control signal T while receiving the initial learning signal IL, it selects the output q of the training counter 320. On the other hand, in the case that the selective circuit 321 receives only the learning signal T (that is, the control circuit sends out no initial learning signals IL), it selects the signal of the neuron number Tp of the learning neuron of the last layer. In other cases other than the above, the selective circuit 321 selects the output of the output layer counter 124.

In FIG. 27, a maximum value address detector 330 receives the output values of the neurons of the last layer (i.e., the arithmetical operation results produced by the cumulative operation unit 113), and the addresses p of such neurons output from the address generator 110, and detects the address of a neuron with a greatest output value.

A comparator 331 is supplied with the address detected by the maximum value address detector 330, and with the output q of the training counter 320 which serves as supervisor data, to compare them. If they agree with each other, the comparator 331 sends out the agreement signal to the control circuit 115. If they disagree with each other, the disagreement signal is supplied to the control circuit 115. In the event that the control circuit 115 receives the disagreement signal from the comparator 331, it begins to carry out the recognition and learning as required, starting with the first (m=0) characteristic data, after the recognition of all of the characteristic data stored in each one of the initial learning characteristic data memories 300, 301 and 302 is completed.

The operation of the above embodiment is described below.

In doing the initial learning of the recognition processing of the characteristic data, the control circuit 115 sends out the initial learning signals IL. The initial learning characteristic data memories 300, 301 and 302 are selected by the multiplexers 303, 304 and 305. The characteristic data stored in the initial learning characteristic data memories 300, 301 and 302 are subsequently recognized from the first (m=0) ones to the last ones, according to the counter values q of the training counter 320. If the address of the neuron of the last layer with a greatest output value disagrees with the out value q of the training counter 320, the weight update of the last layer is carried out by the Hebb learning rule. If the learning has been done on at least one of the items of the characteristic data, the recognition, starting with the first initial learning characteristic data, is repeatedly carried out. If the recognition of all characteristic data is finished without learning, the initial learning is completed as well. The descriptions of the execution of recognition and of the learning of weights have been detailed in the third embodiment.

Although the reference to the plural items of the initial learning characteristic data is repeatedly made a plural number of times (for example, ten times per data) until the initial learning on the recognition processing of the characteristic data has been completed, there is no need to load the same initial learning characteristic data for every reference because such plural items of the data are prestored in each one of the initial learning characteristic data memories 300, 301 and 302. Thus the initial learning of the plural items of the characteristic data can be performed at high speed.

We claim:

1. A multilayer neural network circuit having a plurality of neurons each having a memory for storing a coupling coefficient, said multilayer neural network circuit further comprising:

a control circuit which outputs the total number of non-zero coupling coefficients per layer;

an address generator which subsequently counts the total number of non-zero coupling coefficients per layer, by the output of the control circuit;

a plurality of characteristic data memories which store characteristic data, and subsequently read the characteristic data as the address generator counts;

a weight memory which stores weights of neurons of the last layer;

a plurality of coefficient memories which store coupling coefficients of the layers other than the last layer;

a plurality of address convertors which calculate only addresses of a coefficient memory corresponding to a neuron having a non-zero coupling coefficient value between adjacent layers of the neural network circuit on the basis of the outputs of the address generator, the characteristic data memories and the control circuit, the plurality of address converters also supplying the addresses thus calculated to the coefficient memories while at the same time calculating addresses to be output to the weight memory;

a table memory which takes the coupling coefficients read out from the coefficient memories corresponding to the addresses output from the address converter and outputs total coupling coefficients obtained by multiplying the coupling coefficients of the layers corresponding to the addresses;

a cumulative operation unit which performs cumulative additions of the product of the output of the table memory multiplied by the output of the weight memory; and an output memory which holds results produced by the cumulative operation unit at the addresses output from the address generator, whereby the cumulative addition is performed only on particular neurons interconnected between adjacent layers having a non-zero coupling coefficient value.

2. The neural network circuit of claim 1, further including a weight update unit which receives as an input the weight of the neuron of the last layer output from the weight memory to assign a predetermined set update value to the weight, whereby the learning of recognition and processing of the characteristic data is done by updating the weight of the neuron of the last layer.

3. The neural network circuit of claim 1, further including: a shifter which receives as an input the total coupling coefficient output from the table memory, and outputs an update value according to the total coupling coefficient; and a weight update unit which receives as an input the update value output from the shifter and with the weight of the neuron of the last layer output from the weight memory, and updates the weight by adding the update value thereto, whereby the learning of recognition and processing of the characteristic data is done by updating the weight of the neuron of the last layer using a value according to the output of the neuron.

4. The neural network circuit of claim 1, further including a weight update unit which updates the value of the weight of the neuron of the last layer output from the weight memory so as to temporarily determine a new value of the weight of the neuron, the weight update unit reduces all values of the weights stored in the weight memory at the same ratio if the updated value of the weight of the neuron of the last layer results in the generation of an overflow signal.

5. The neural network circuit of claim 1, further including a look-up table which non-linearly converts and stores the characteristic data in the characteristic data memory, taking the characteristic data as an address, whereby the characteristic data to be supplied to the characteristic data memories are in advance non-linearly converted.

6. The neural network circuit of claim 1, further including a quantization conversion circuit capable of quantizing a plurality of characteristic data, the quantization conversion circuit comprising:

a quantization conversion threshold memory which holds a plurality of quantization conversion thresholds for every characteristic data;

a comparator which compares the characteristic data with the quantization conversion threshold read out from the quantization conversion threshold memory;

an adder which calculates an address of the quantization conversion threshold of the quantization conversion threshold memory to be compared next on the basis of the output of the comparator, the adder receives as an input address the address input in the quantization conversion threshold memory;

a register which holds the output of the adder and supplies the address to the quantization conversion threshold memory; and a 2-input multiplexer which receives as an input both the input and the output of the register, and outputs either the input or the output of the register on the basis of comparison results of the comparator, as a quantization conversion solution, whereby the characteristic data memory stores the characteristic data quantized by the quantization conversion circuit and the input characteristic data are quantization converted with different quantization conversion thresholds.

7. The neural network circuit of claim 1, further including:

a plurality of initial learning characteristic data memories in which plural items of the characteristic data are prestored for initial learning;

a comparator which receives as an input supervisor data and compares recognition results of the characteristic data read out of the initial learning characteristic data memories with the supervisor data; and a weight update unit which receives as an input weights of neurons of the last layer output from the weight memory and updates the weights on the basis of the comparison results produced by the comparator;

whereby the recognition processing learning of the characteristic data by updating the weights of the neurons of the last layer is performed by referring to the plural items of the characteristic data prestored in the initial learning characteristic data memories.

8. A multilayer neural network circuit having a plurality of neurons each having a memory for storing a coupling coefficient, said multilayer neural network circuit further comprising:

a control circuit which outputs the total number of non-zero coupling coefficients per layer;

an address generator which subsequently counts the total number of non-zero coupling coefficients per layer, by the output of the control circuit;

a plurality of characteristic data memories which store the characteristic data, and subsequently read characteristic data as the address generator counts;

a weight memory which stores weights of neurons of the last layer;

a plurality of coefficient memories which store coupling coefficients of the layers other than the last layer;

a plurality of address convertors which calculate only addresses of a coefficient memory corresponding to a neuron having a non-zero coupling coefficient value between adjacent layers of the neural network circuit on the basis of the outputs of the address generator, the characteristic data memories and the control circuit, the plurality of address converters supplying the addresses thus calculated to the coefficient memories while at the same time calculating addresses to be output to the weight memory;

a table memory which takes the coupling coefficients read out from the coefficient memories corresponding to the addresses output from the address converter and outputs total coupling coefficients obtained by multiplying the coupling coefficients of the layers corresponding to the addresses;

a cumulative operation unit which performs cumulative additions of the product of the output of the table memory multiplied by the output of the weight memory; and an output memory which holds results produced by the cumulative operation unit at the addresses output from the address generator, wherein the cumulative addition is performed only on particular neurons interconnected between adjacent layers having a non-zero coupling coefficient value, and the address converter, which outputs a control signal, modifies the contents of the control signal depending upon whether an address of a non-zero coupling coefficient value and an address of a greatest non-zero coupling coefficient are in series, the multilayer neural network circuit further including a multiplexer, which receives as an input the control signal from the address converter, outputs a zero to the table memory when the aforesaid addresses are not in series, or selects and outputs the coupling coefficient from the coefficient memory to the table memory when the addresses are in series.

9. A neural network circuit comprising multiple layers in which:

each said layer except a final layer comprises a plurality of quantized neurons;

each said quantized neuron comprises one quantized signal input terminal which receives characteristic data of the respective layer and a plurality of output terminals, each said quantized neuron further comprising a coupling coefficient which changes in accordance with the value of the characteristic data coupled to said quantized signal input terminal;

said output terminal of each quantized neuron of a given layer being coupled to each quantized neuron of a next upper layer;

said final layer comprising a plurality of multi-input, one output neurons;

said characteristic data input into each layer being calculated by the network having the multi-layered construction and a result is output by said final layer, whereby the given characteristic data is recognized, said neural network circuit comprising:

address generation means, weight memory means, total coupling coefficient memory means and cumulative operation means;

said address generation means memorizing beforehand to the respective layers the number of output terminals having a non-zero coupling coefficient value out of the plural output terminals of quantized neurons of each layer except the final layer, said address generation means memorizing beforehand, according to various characteristic data to be input to respective layers, an address of the first output terminal out of the output terminals having the non-zero coupling coefficient value to output an address of the first output terminal corresponding to one characteristic data to be input or calculates an address of the first output terminal having the non-zero coupling coefficient value, based on a given conversion formula which includes the characteristic data to be input and is obtained beforehand, said address generation means generating as an initial address a combination of addresses of the first output terminal having the non-zero coupling coefficient value of each layer corresponding to the input characteristic data, then sequentially generating combinations of addresses of the output terminals having the non-zero coupling coefficient value in each layer, said weight memory means memorizing beforehand each weight of the multi-input, one-output neurons of the final layer according to the combinations of various addresses which are generated by the address generation means to output a weight of one multi-input, one-output neuron corresponding to one address generated by the address generation means, said total coupling coefficient memory means memorizing beforehand according to the combinations of the various addresses generated by the address generation means, a total coupling coefficient which is obtained by multiplying the non-zero coupling coefficient values of each layer except the final layer to output the total coupling coefficient corresponding to one address generated by the address generation means, and said cumulative operation means multiplies the total coupling coefficient output from the total coupling coefficient memory means and the weight of the multi-input, one-output neuron of the final layer which is output from the weight memory means to accumulate the multiplied results.

10. The neural network circuit of claim 9, wherein the address generation means comprises a function table provided in each layer except the final layer and one address generator;

each function table memorizes beforehand, according to the various characteristic data to be input, the number of output terminals having the non-zero coupling coefficient value out of the plural output terminals of the quantized neurons in the respective layer, an address of the first output terminal out of the output terminals having the non-zero coupling coefficient value, and a coupling coefficient level which is output from the respective output terminals that each quantized neuron has so as to output the number of output terminals which output the non-zero coupling coefficient value and the address of the first output terminal having the non-zero coupling coefficient value according to the characteristic data at every input of the characteristic data;

the address generator inputs, from the function table of each layer, the number of output terminals having the non-zero coupling coefficient value and the address of the first output terminal which outputs the non-zero coupling coefficient value to generate, as an initial address, a combination of addresses of the first output terminals having the input non-zero coupling coefficient value, then to sequentially generate combinations of addresses of each layer of the output terminals which output the non-zero coupling coefficient value; and each function table inputs an address of its own layer out of the combination of addresses of each layer sequentially generated by the address generator to sequentially output to the total coupling coefficient memory means, as addresses, the coupling coefficient level output from the output terminal corresponding to the input addresses.

11. The neural network circuit of claim 9, wherein the address generation means comprises a control circuit, an address generator, an address converter provided in each layer and a coefficient memory provided in each layer;

the control circuit memorizes the number of output terminals having the non-zero coupling coefficient value out of the plural output terminals in the quantized neurons in each layer, and outputs the number of output terminals to each layer;

the address generator inputs the number of output terminals having the non-zero coupling coefficient value in each layer which is output from the control circuit, counts sequentially the number of the output terminals at every layer and generates the thus counted number as an address;

each address converter inputs the characteristic data of its own layer, an address of its own layer which is output from the address generator, and the number, which is output from the control circuit, of the output terminals of its own layer which output the non-zero coupling coefficient value;

each address converter generates a relative address, using a given address conversion formula which is obtained beforehand based on the input number of output terminals having a non-zero coupling coefficient value and the input counted number of the output terminals having a non-zero coupling coefficient value, and calculates an absolute address of the output terminal which outputs the non-zero coupling coefficient value of the quantized neurons of its own layer, using another address conversion formula based on the input characterized data, the input counted number of the output terminals having a non-zero coupling coefficient value and the input number of output terminals having a non-zero coupling coefficient value;

the coefficient memory memorizes beforehand, according to various relative addresses generated by the address converter of its own layer, the non-zero coupling coefficient value that the plural output terminals of each quantized neuron in its own layer have; and the coefficient memory outputs one non-zero coupling coefficient value corresponding to the relative address upon generation of one relative address by the address converter of its own layer.

* * * * *